United States Patent
Ko et al.

(10) Patent No.: US 9,632,653 B2
(45) Date of Patent: Apr. 25, 2017

(54) MOBILE TERMINAL AND METHOD OF CONTROLLING THE MOBILE TERMINAL

(71) Applicant: LG ELECTRONICS INC., Seoul (KR)

(72) Inventors: Eulina Ko, Seoul (KR); Hosoo Kim, Seoul (KR); Chaesung Leem, Seoul (KR); Minjoo Chung, Seoul (KR); Hojae Jung, Seoul (KR); Shinhui Ahn, Seoul (KR); Juhyun Jung, Seoul (KR); Yong Kim, Seoul (KR); Hyoungkeun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 428 days.

(21) Appl. No.: 14/176,487

(22) Filed: Feb. 10, 2014

(65) Prior Publication Data

US 2014/0229888 A1     Aug. 14, 2014

(30) Foreign Application Priority Data

Feb. 14, 2013  (KR) .................. 10-2013-0016068
May 21, 2013  (KR) .................. 10-2013-0057314

(51) Int. Cl.
*G06F 3/048* (2013.01)
*G06F 3/0481* (2013.01)
(Continued)

(52) U.S. Cl.
CPC ........ *G06F 3/0481* (2013.01); *G06F 3/04842* (2013.01); *G06F 3/04886* (2013.01); *G06F 2203/04803* (2013.01)

(58) Field of Classification Search
CPC ......... G06F 2203/04803; G06F 3/0481; G06F 3/041; G06F 3/04817; G06F 3/0486;
(Continued)

(56) References Cited

U.S. PATENT DOCUMENTS 7,362,341 B2 * 4/2008 McGuire ............... G06F 3/0481
                                              345/676
8,448,088 B2 * 5/2013 Kikuchi ................ G06F 3/1454
                                              715/781
(Continued)

FOREIGN PATENT DOCUMENTS

CN    101212752 A    7/2008
CN    102045436 A    5/2011
(Continued)

OTHER PUBLICATIONS

Search Report dated May 26, 2014 of EP Application No. 14152620.2.
(Continued)

*Primary Examiner* — Di Xiao
(74) *Attorney, Agent, or Firm* — KED & Associates LLP

(57) ABSTRACT

Provided is a mobile terminal including a display unit to which multiple divisional screen regions are output, and a control unit that when an input for entering a division mode in which the display unit is divided into the multiple screen regions is received, generates a list region including a list of multiple applications, divides the display unit into first and second screen regions with the list region in between, and executes first and second applications selected from among the multiple applications on the first and second screen regions, respectively, in which the controller executes an application selected from among the multiple applications included in the list on the list region, and in which when an object included in the application being executed on the list region is selected, at least one of the first and second applications uses the selected object.

25 Claims, 44 Drawing Sheets

(51) Int. Cl.
*G06F 3/0484* (2013.01)
*G06F 3/0488* (2013.01)

(58) Field of Classification Search
CPC .. G06F 2200/1637; G06F 9/543; G06F 12/02; G06F 17/30126; G06F 3/04886; G06F 8/443; G06F 8/4442; G06F 17/5045; G06F 21/32
See application file for complete search history.

(56) References Cited

U.S. PATENT DOCUMENTS

| | | | |
|---|---|---|---|
| 2007/0252822 A1* | 11/2007 | Kim | G06F 3/0362 345/173 |
| 2008/0158189 A1 | 7/2008 | Kim | |
| 2010/0248788 A1 | 9/2010 | Yook et al. | |
| 2010/0299597 A1 | 11/2010 | Shin et al. | |
| 2011/0099508 A1 | 4/2011 | Liu | |
| 2011/0175930 A1 | 7/2011 | Hwang et al. | |
| 2011/0252350 A1* | 10/2011 | Chaudhri | G06F 3/04817 715/769 |
| 2011/0252357 A1 | 10/2011 | Chaudhri | |
| 2012/0090004 A1* | 4/2012 | Jeong | H04N 5/44513 725/39 |
| 2012/0290966 A1 | 11/2012 | Chae et al. | |
| 2013/0187861 A1* | 7/2013 | Lavallee | G06F 9/543 345/173 |
| 2013/0346912 A1* | 12/2013 | Buening | G06F 3/0488 715/783 |

FOREIGN PATENT DOCUMENTS

| | | |
|---|---|---|
| CN | 102129345 A | 7/2011 |
| CN | 102365617 A | 2/2012 |

OTHER PUBLICATIONS

Office Action dated Sep. 6, 2015 of China Patent Application No. 201410052052.3.

* cited by examiner

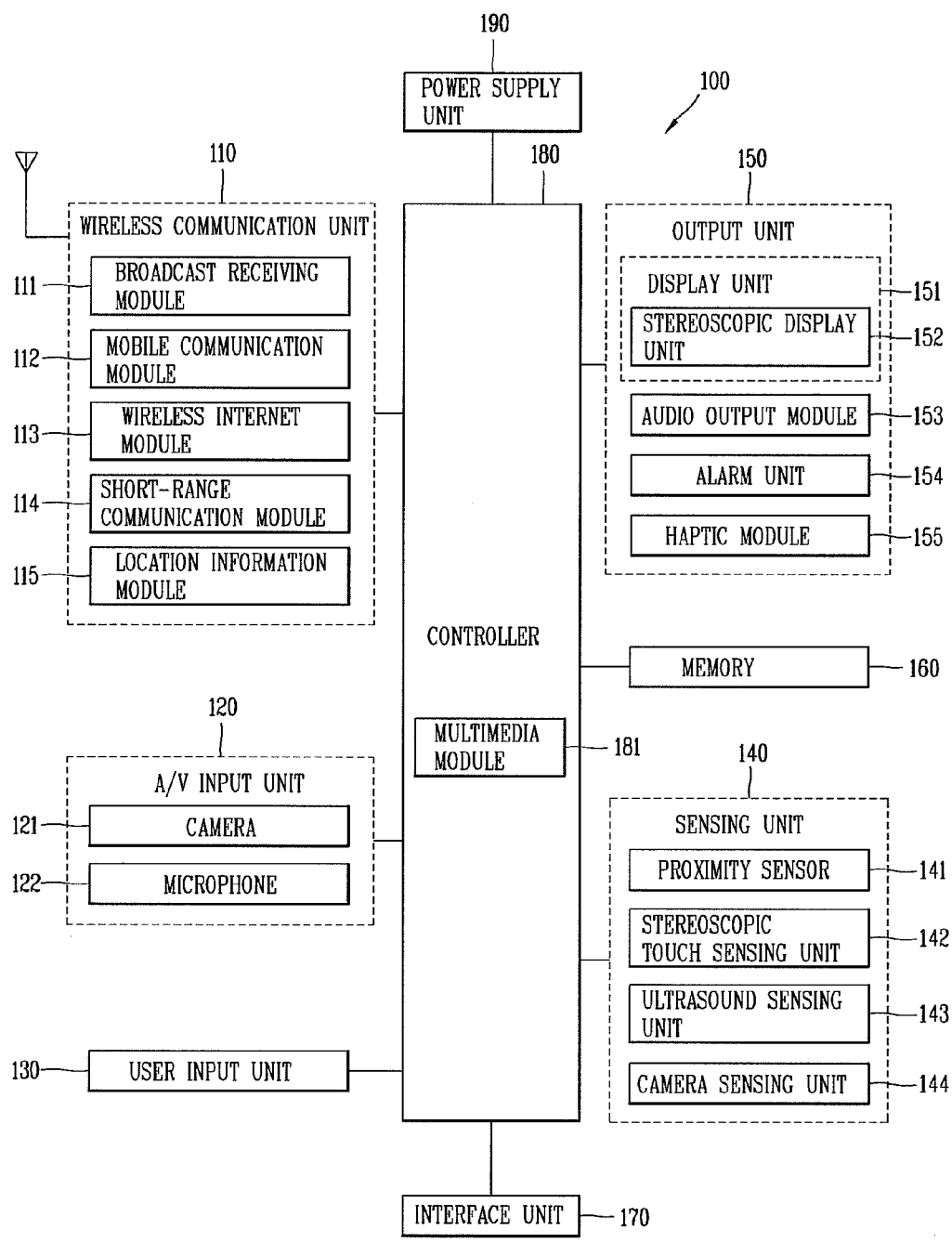

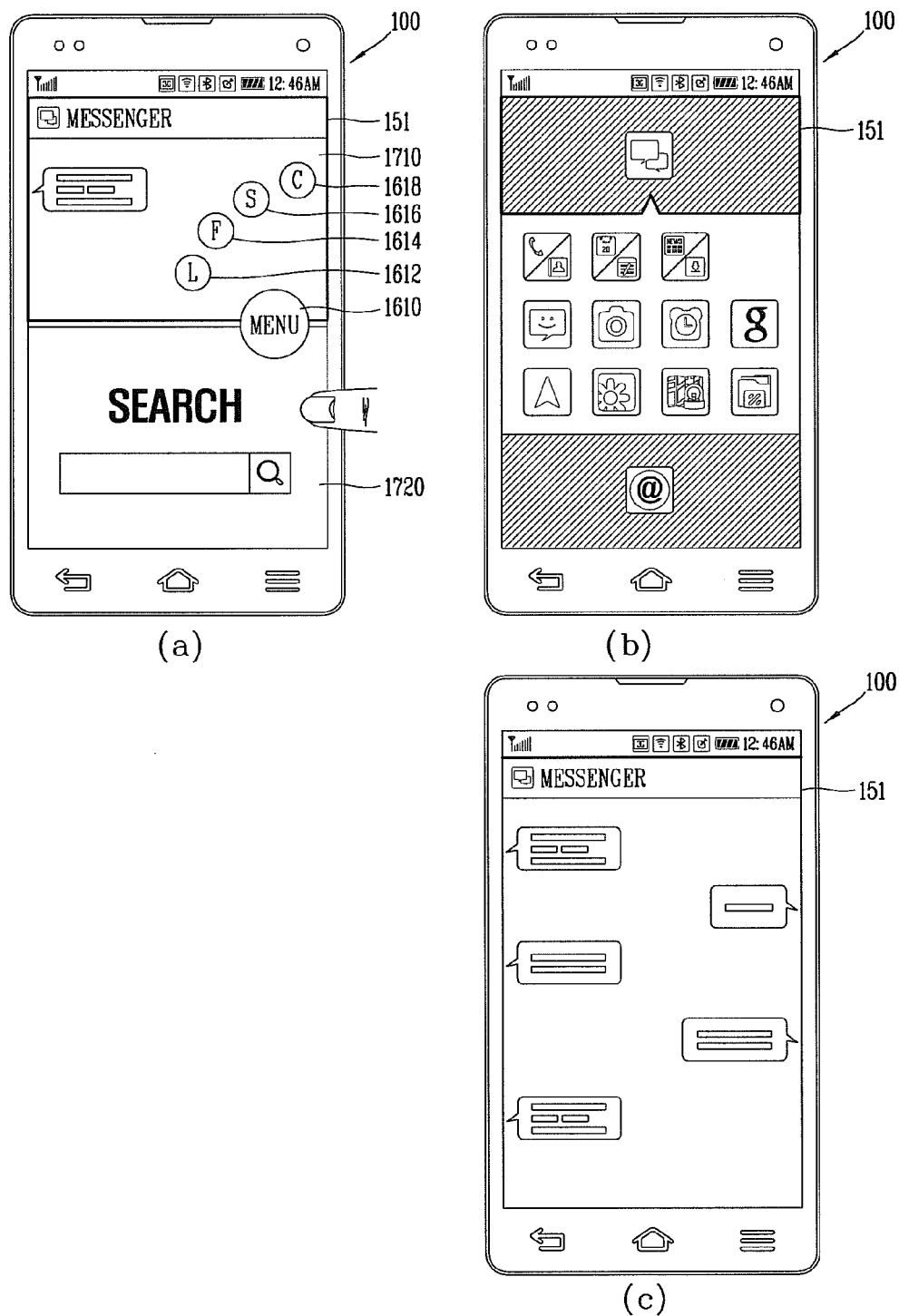

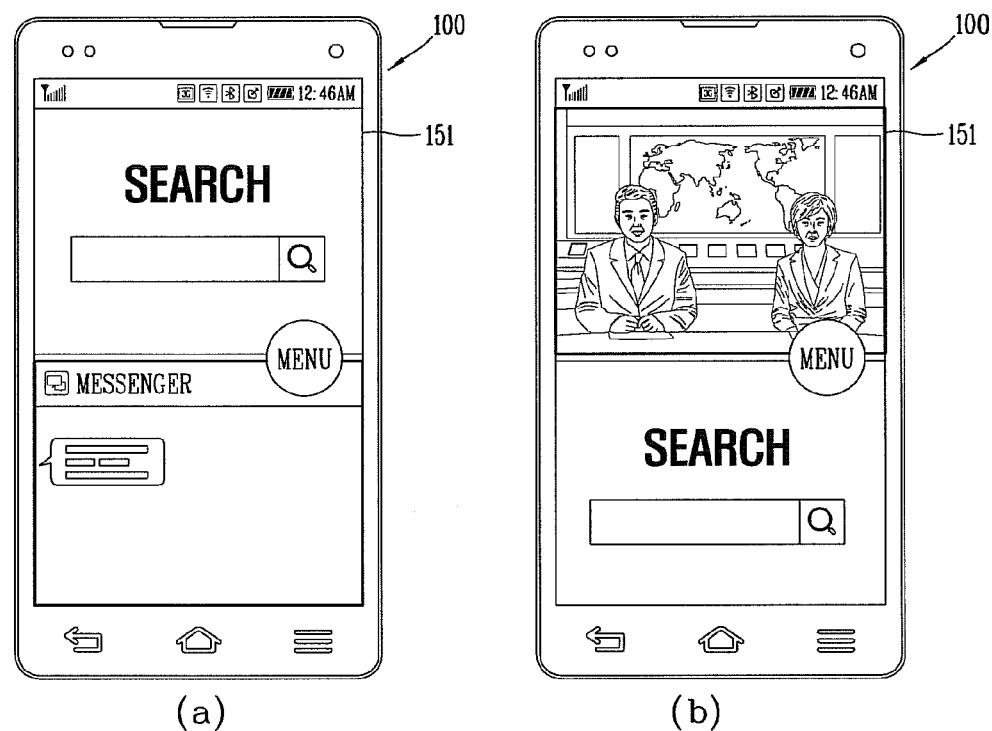

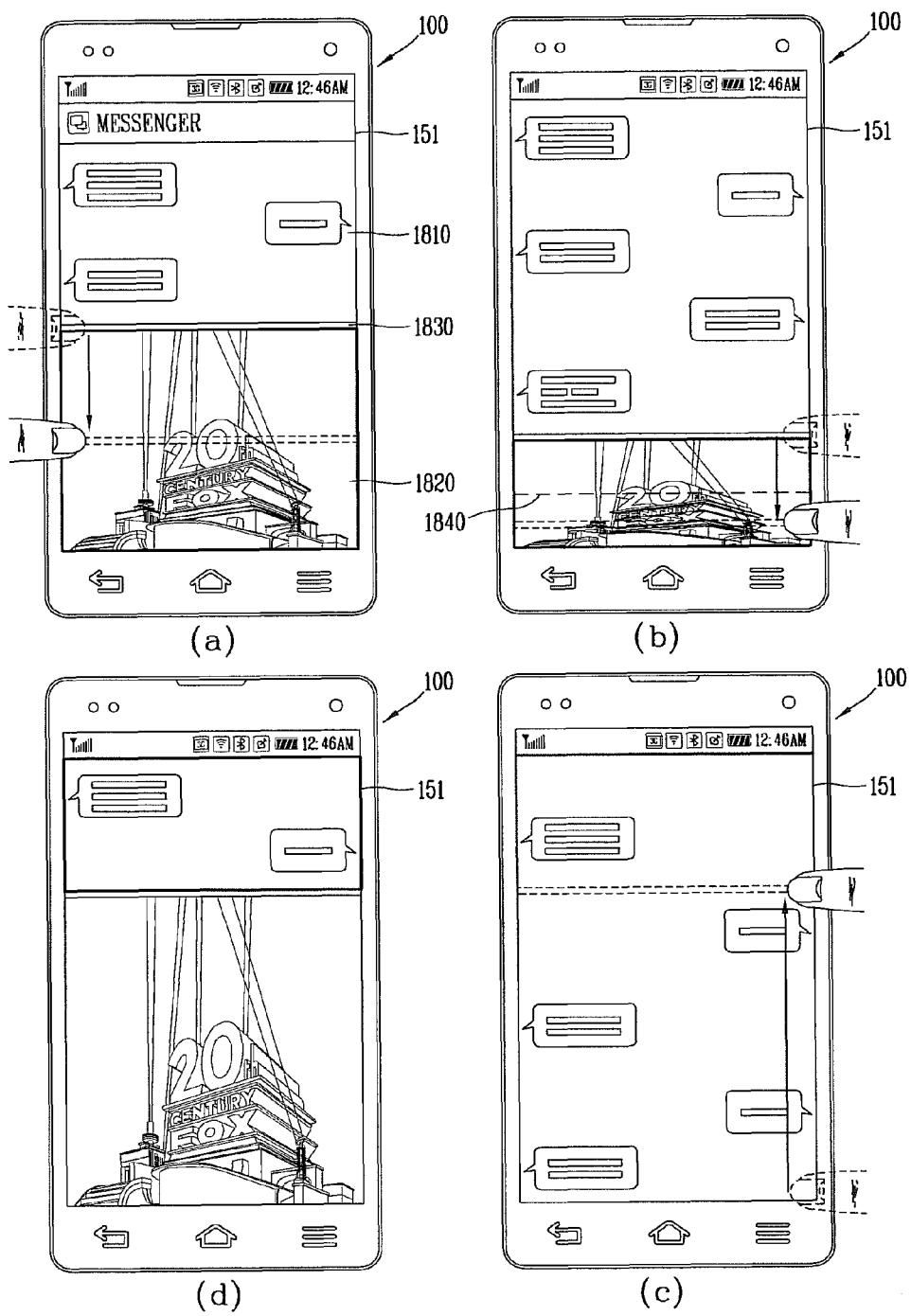

MOBILE TERMINAL AND METHOD OF CONTROLLING THE MOBILE TERMINAL

CROSS-REFERENCE TO RELATED APPLICATION(S)

Pursuant to 35 U.S.C. §119(a), this application claims the benefit of earlier filing date and right of priority to Korean Application No. 10-2013-0016068, filed on Feb. 14, 2013 and Korean Application No. 10-2013-0057314, filed on May 21, 2013 the contents of which is incorporated by reference herein in its entirety.

BACKGROUND

1. Field

The present invention relates to a mobile terminal and more particularly to a mobile terminal that is capable of dividing a screen and a method of controlling the mobile terminal.

2. Background

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player. Many efforts include not only changes and improvement of structural components implementing a mobile terminal but also software improvement to support and improve functions of the terminal.

Thanks to these improvements, various applications have been introduced to the market. There has been an increasing demand for multitasking that allows the multiple applications to be concurrently executed.

In addition, there has been increasing concern over a screen division method for use in the mobile terminal, by which it is ensured during multitasking that processes of executing an application are concurrently performed.

SUMMARY OF THE DISCLOSURE

Therefore, an aspect of the detailed description is to provide a mobile terminal that is capable of concurrently executing multiple applications on divisional screen regions, respectively, to improve user convenience and a method of controlling the mobile terminal.

To achieve these and other advantages and in accordance with the purpose of this specification, as embodied and broadly described herein, there is provided a mobile terminal including a display unit to which multiple divisional screen regions are output, and a control unit that when an input for entering a division mode in which the display unit is divided into the multiple screen regions is received, generates a list region including a list of multiple applications, divides the display unit into first and second screen regions with the list region in between, and executes first and second applications selected from among the multiple applications on the first and second screen regions, respectively, in which the controller executes an application selected from among the multiple applications included in the list on the list region, and in which when an object included in the application being executed on the list region is selected, at least one of the first and second applications uses the selected object.

In the mobile terminal, the controller may select the multiple applications included in the list differently depending on the first and second applications.

In the mobile terminal, the list region may include an indicator indicating one of the first and second screen regions, on which the application included in the list is executed.

In the mobile terminal, the controller may enable the application being executed on the screen region to which the indicator points to use the selected object.

In the mobile terminal, the first and second applications are concurrently selected, the controller may concurrently execute the first and second applications on the first and second screen regions, respectively.

In the mobile terminal, when the list region decreases in size and converts to the shape of a bar, the controller may set sizes of the first and second regions depending on an input for adjusting a position of the bar.

In the mobile terminal, the controller may set icons, through which the first and second screen regions are controlled, respectively, as being output to the display unit.

In the mobile terminal, when in a case where the first application is executed on the entire screen of the display unit and the second application is executed on a floating screen that is output in such a manner as to overlap the entire screen on which the first application is executed, the floating screen is dragged to one region of the entire screen, which is set in advance, the controller may divide the entire screen into the first and second screen regions and may execute the first and second applications on the first and second screen regions, respectively.

In the mobile terminal, when a switching-to-floating-screen icon that is output to the second screen region is selected, the controller may enable the first application to be executed on the entire screen of the display unit and may enable the second application to be executed on the floating screen that is output in such a manner as to overlap the entire screen on which the first application is executed.

In the mobile terminal, the controller may transfer a captured image obtained by capturing wholly or partly capturing an image of the first screen region to the second screen region.

In the mobile terminal, the controller may transfer an object that is output to the first screen region to the second screen region.

To achieve these and other advantages and in accordance with the purpose of this specification, as embodied and broadly described herein, there is provided a method of controlling a mobile terminal including receiving an input for entering a division mode in which a display unit is divided into multiple screen regions, generating a list region including a list of multiple applications and dividing the display unit into first and second screen regions with the list region in between, executing first and second applications selected from among the multiple applications on the first and second screen regions, respectively, executing an application selected from among the multiple application included in the list on the list region, and enabling at least one of the first and second applications to use the selected object when an object included in the application being executed on the list region is selected.

In the method of controlling a mobile terminal, the executing of the application selected from among the multiple application may include selecting the multiple applications included in the list differently depending on the first and second applications.

In the method of controlling a mobile terminal, the list region may include an indicator indicating one of the first and second screen regions, on which the application included in the list is executed.

In the method of controlling a mobile terminal, the enabling of at least one of the first and second applications to use the selected object may include enabling the application being executed on the screen region to which the indicator points to use the selected object.

In the method of controlling a mobile terminal, the executing of first and second applications may include concurrently executing the first and second applications on the first and second screen regions, respectively when the first and second applications are concurrently selected.

The method of controlling a mobile terminal may further include setting sizes of the first and second regions depending on an input for adjusting a position of the bar when the list region decreases in size and converts to the shape of a bar.

The method of controlling a mobile terminal may further include outputting icons through which the first and second screen regions are controlled, respectively, to the display unit.

In the method of controlling a mobile terminal, the executing of the first and second applications may include enabling the first application to be executed on the entire screen of the display unit and enabling the second application to be executed on the floating screen that is output in such a manner as to overlap the entire screen on which the first application is executed, when a switching-to-floating-screen icon that is output to the second screen region is selected.

The method of controlling a mobile terminal may further include transferring a captured image obtained by capturing wholly or partly capturing an image of the first screen region to the second screen region.

The method of controlling a mobile terminal may further include transferring an object that is output to the first screen region to the second screen region.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The embodiments will be described in detail with reference to the following drawings in which like reference numerals refer to like elements wherein:

FIG. 1 is a block diagram illustrating a mobile terminal according to an embodiment of the present invention;

FIGS. 14A and 14B are diagrams illustrating embodiments of the user interface by which the icons corresponding to the applications included in the list region are searched for;

FIGS. 17A(a) to 17A(c) and FIGS. 17B(a) and 17B(b) are diagrams illustrating embodiments of the user interface that relates to the icons that are output to the list region;

FIGS. 18A to 18D are diagrams illustrating an embodiment of the user interface by which a size of a divisional screen region is adjusted;

DETAILED DESCRIPTION

Figure 2A:
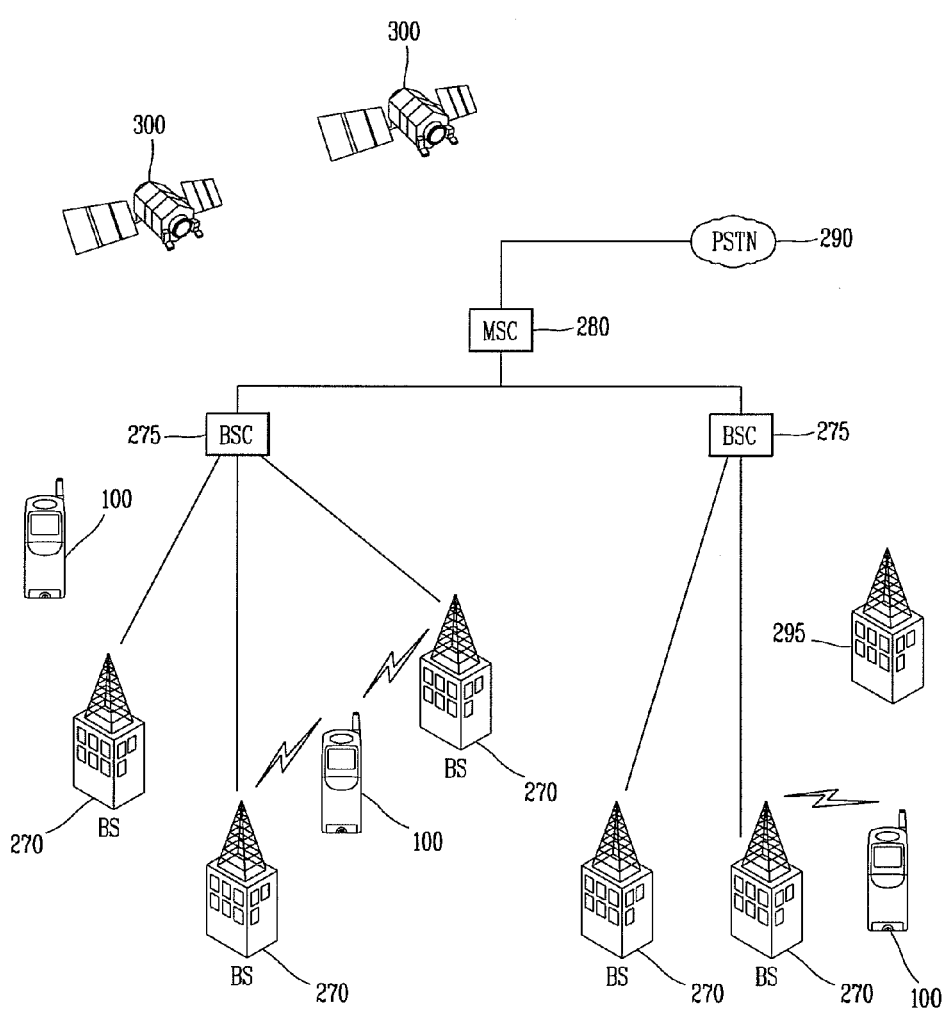
FIGS. 2A and 2B are diagrams illustrating a conceptional framework of a telecommunication system in which the mobile terminal according to the present invention operates.

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the exemplary embodiments of this specification can be applied to stationary terminals such as digital TV, desktop computers and the like excluding a case of being applicable only to the mobile terminals.

FIG. 1 is a block diagram of a mobile terminal 100 in accordance with one exemplary embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component 110 to 190 is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module or a wireless fidelity (WiFi) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, a switchable scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera, a photo sensor, and a laser sensor.

For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

Figure 2B:
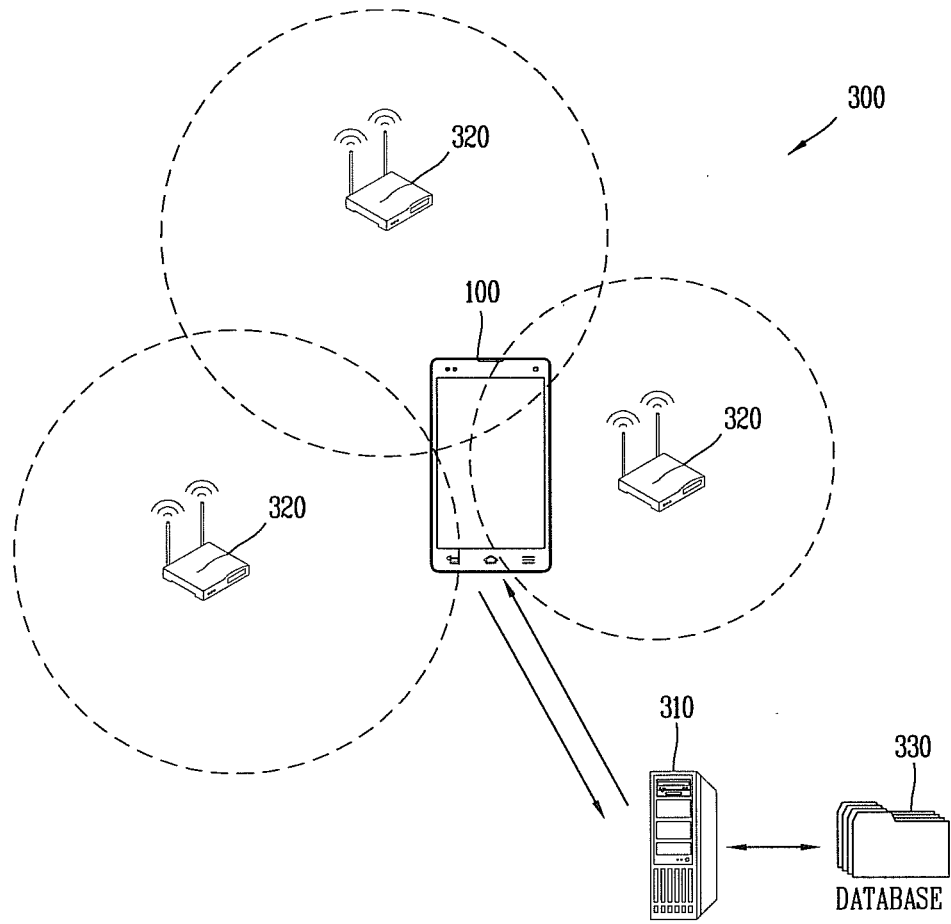

FIGS. 2a and 2b are conceptual views of a communication system operable with a mobile terminal in accordance with the present disclosure.

First, referring to FIG. 2a, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2a, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2a.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2a, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 2a further depicts several Global Positioning System (GPS) satellites 300. Such satellites 300 facilitate locating the position of at least one of plural mobile terminals 100. Two satellites are depicted in FIG. 2a, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2b.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2b, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Hereinafter, a mobile terminal according to an embodiment of the present disclosure as illustrated in FIG. 1 or a mobile terminal disposed with the constituent elements of the mobile terminal or the structure of a mobile terminal will be described.

Figure 3A:
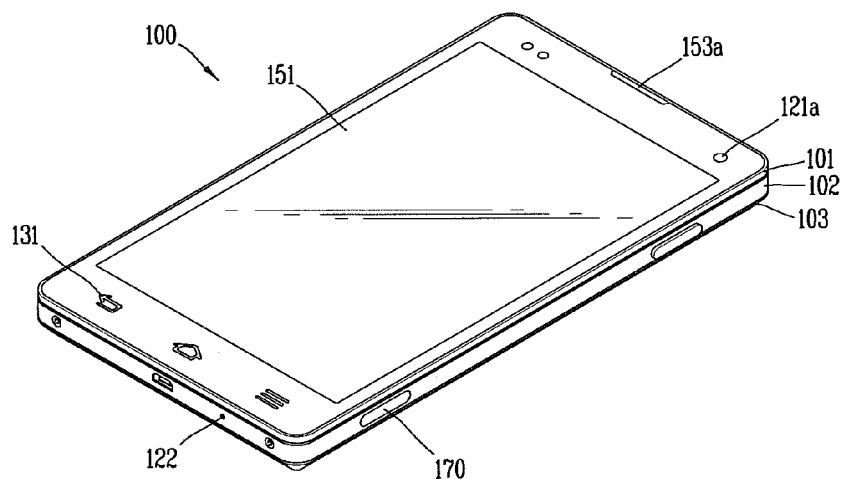
FIG. 3A is a perspective diagram illustrating the mobile terminal according to the embodiment of the present invention when viewed from the front.

FIG. 3a is a front perspective view illustrating an example of the mobile terminal 100 associated with the present disclosure.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3a, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. 3b), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
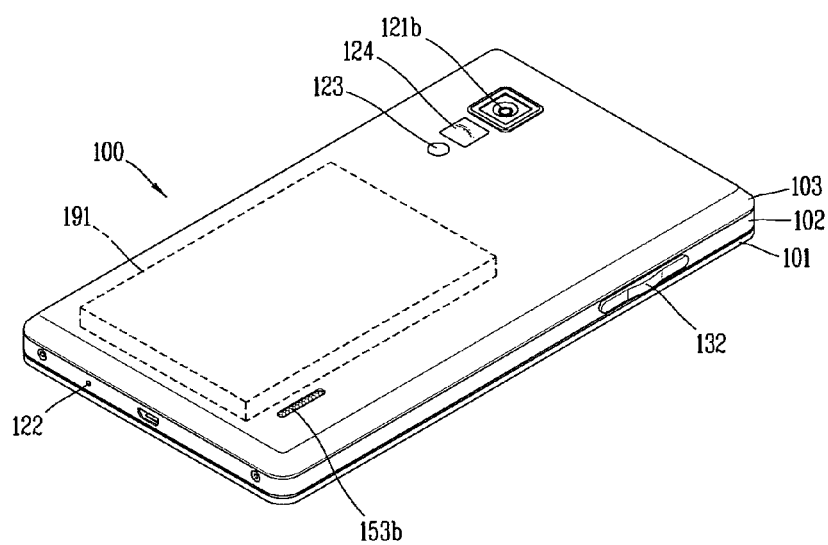
FIG. 3B is a perspective diagram illustrating the mobile terminal in FIG. 3A when viewed from the rear.

FIG. 3b is a rear perspective view illustrating mobile terminal 100 illustrated in FIG. 3a.

Referring to FIG. 3b, a second camera 121b may be additionally mounted at a rear surface of the terminal body, namely, the rear case 102. The second camera 121b has an image capturing direction, which is substantially opposite to the direction of the first camera unit 121a (refer to FIG. 3a), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3a) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

On the other hand, there is an increasing demand for multitasking that enables concurrent execution of various applications. There is also increasing concern for a method of dividing a screen of the mobile terminal that is capable of concurrently ensuring processes of executing the applications during multitasking. Accordingly, the mobile terminal 100 that is capable of dividing the screen for improving user convenience and a method of controlling the mobile terminal are described below referring to the accompanying drawings.

The terms "first," and "second," in the following description are used to describe various constituent elements, but these are not limited to such terms. That is, the terms "first," and "second," are used to distinguish between the same constituent elements.

For example, without deviating from a scope of the present invention, a "first constituent element" can be named a "second constituent element," and similarly, the "first constituent element" can be named the "second constituent element."

Figure 4:
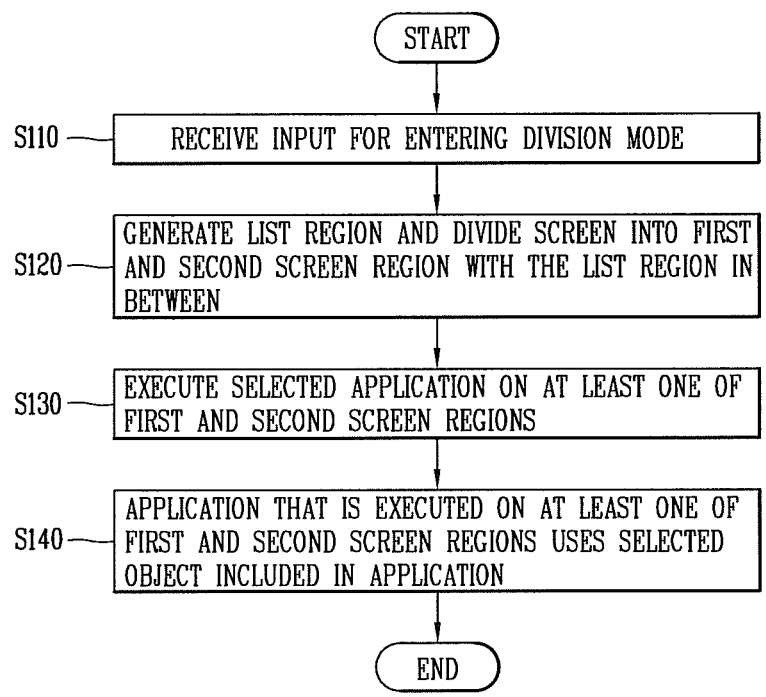
FIG. 4 is a flowchart for describing one embodiment of the mobile terminal according to the present invention.

FIG. 4 is a flowchart for describing one embodiment of the mobile terminal 100 (refer to FIG. 1) according to the present invention. The mobile terminal 100 includes the display unit 151 and the controller 180.

Referring to FIG. 4, first, Steps S110 and S120 proceeds in which an input is received for entering a division mode in which the display unit 151 is divided into multiple divisional screen regions.

At this point, the division mode means a state in which preparation for dividing a screen 151 is in progress or a state in which the screen 151 is divided into the multiple regions.

Specifically, the division mode is entered by pushing on or touching on a specific key or by applying a specific gesture. For example, the division mode is entered by applying a long push to a BACKSPACE key or by applying a gesture of crossing the screen 151 with a finger.

Subsequently, Step S120 proceeds in which a list region including a list of the multiple applications is generated, and the display unit 151 is divided into first and second screen regions with the list region in between the first and second screen regions.

At this point, the multiple applications included in the list region are selected in various ways. For example, the list of the multiple applications may be a list of all applications that can be executed on the mobile terminal 100, or be a list of applications that is set in advance.

Alternatively, the list of the multiple applications may be a list of applications that are frequently used, or be a list of applications that are similar to or relates to the application that is currently used.

Specifically, the list region includes an indicator indicating on which screen region of the first and second screen regions at least one application is to be executed. Such an indicator is displayed as being in the form of a specific icon, a mark, or the like.

Subsequently, Step S130 proceeds in which at least one application selected from among the multiple applications is executed on at least one screen region of the first and second screen regions.

Specifically, the user can select the icon corresponding to at least one application of the multiple applications in various ways, such as touching-on, pushing-on, or dragging.

Next, when an object included in at least one application of the multiple applications is selected, Step 140 proceeds in which the application to be executed on at least one screen region of the first and second regions uses the selected object.

Figure 5A:
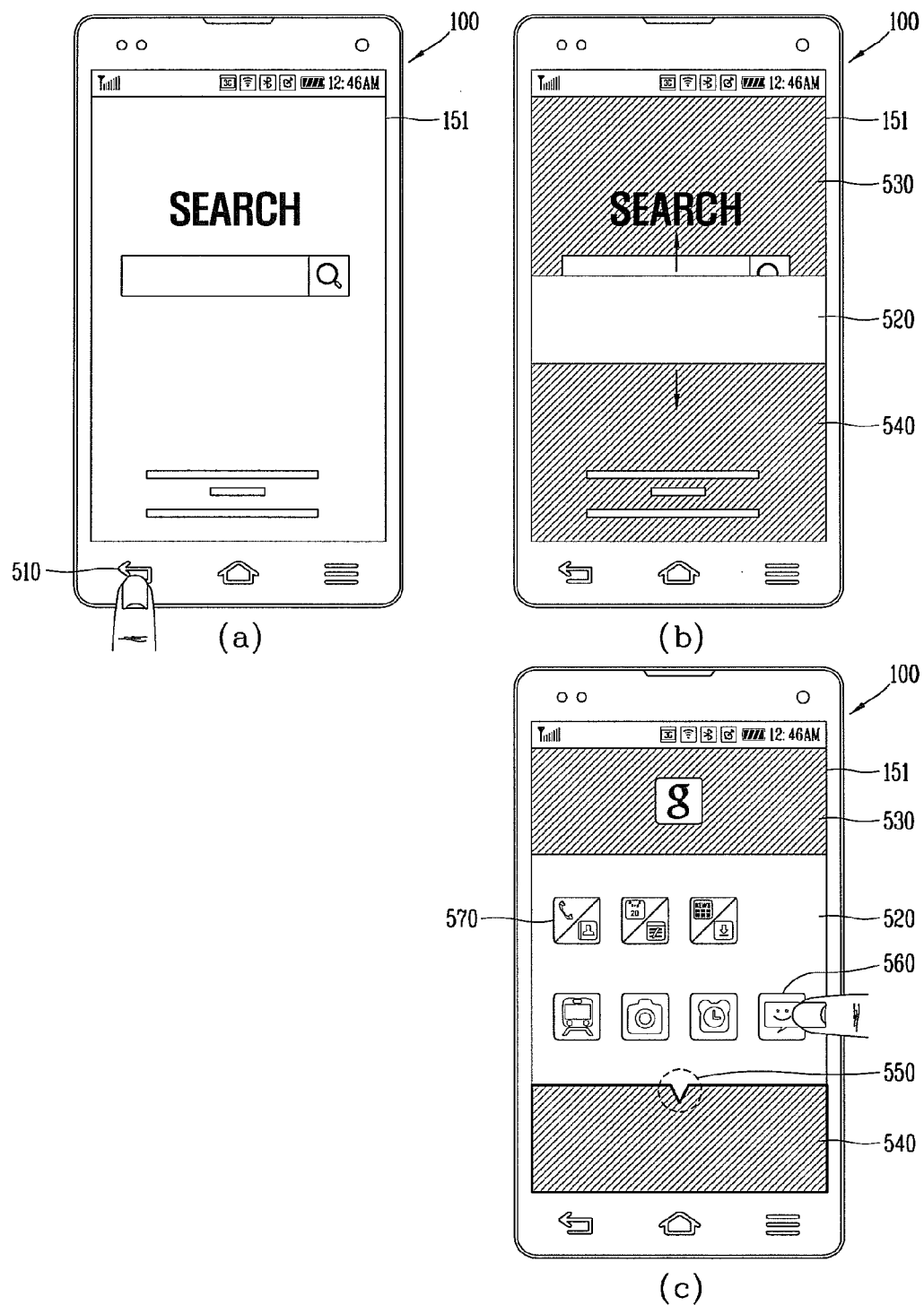
FIGS. 5A(a) to 5D(b) are diagrams illustrating embodiments of a user interface in a division mode.

FIGS. 5A(a) to 5B(b) are diagrams illustrating embodiments of the user interface in the division mode.

Referring to FIG. 5A(a), the user enters the division mode by applying long push to a BACKSPACE key 510 while executing a first application (the Internet).

Referring to FIG. 5A(b), when receiving the input for entering the division mode, the list regions 520 is generated in such a manner as to spread out upward and downward from the middle of the list region 520. In addition, the generation of the list region 520 leads to the generation of first and second screen regions 530 and 540.

At this point, a position in which the list region 520 is generated is not limited to the middle of the display unit, and the list region 520 can be generated in any arbitrary position on the display unit 151. That is, sizes of the first and second screen regions 530 and 540 are adjusted according to the position in which the list region 520 is generated.

Then, application of an animation effect in the process of spreading out the list region 520 leads to natural changes in the screen 151.

As an embodiment, the first application being executed on the entire screen 151 is dimly output, and the list region 520 is generated in such a manner as to overlap the first application and gradually spread out upward and downward.

Referring to FIG. 5A(c), the list region 520 includes the list of the multiple applications and an indicator 550. Then, an icon corresponding to the first application being executed is output to the first screen region 530. Alternatively, the first application being executed is output along with the effect of dimming an image.

At this point, only the effect of dimming an image is output to the second screen region 540. Alternatively, an icon corresponding to an application that is frequently executed along with the first application or relates to the first application.

Specifically, the list of the multiple applications is output as selectable icons that correspond to the multiple applications, respectively. As an embodiment, a second icon 560 corresponding to the second application is included in the list region 520, and the user selects the second application by touching on the second icon 560.

As another embodiment, the list of the multiple applications may be output as a selectable icon corresponding to the multiple applications. That is, an icon 570 corresponding to third and fourth applications is included in the list region 520.

On the other hand, as described above, the indicator 550 indicates one of the first and second screen regions 530 and 540, on which the selected application is to be executed. As an embodiment, the indicator 550 is output as an arrow that points to the second screen region 540.

The screen region to which the indicator 550 points is determined in various ways. As an embodiment, as illustrated in FIG. 5A(c), the indicator 550 is output as an arrow that points to a screen region that is in a state where an application to be executed thereon is not determined.

In addition, the screen region indicated by the indicator 550 may be changed with a user input. As an embodiment, the user changes the arrow-shaped indicator 550 by touching on it in order to make an arrow 550 point to the first screen region 530.

As another embodiment, the user can change the arrow-shaped indicator 550 by applying long touch to it and then dragging it toward the first screen region 530 in order to make the arrow 550 point to the first screen region 530.

Figure 5B:
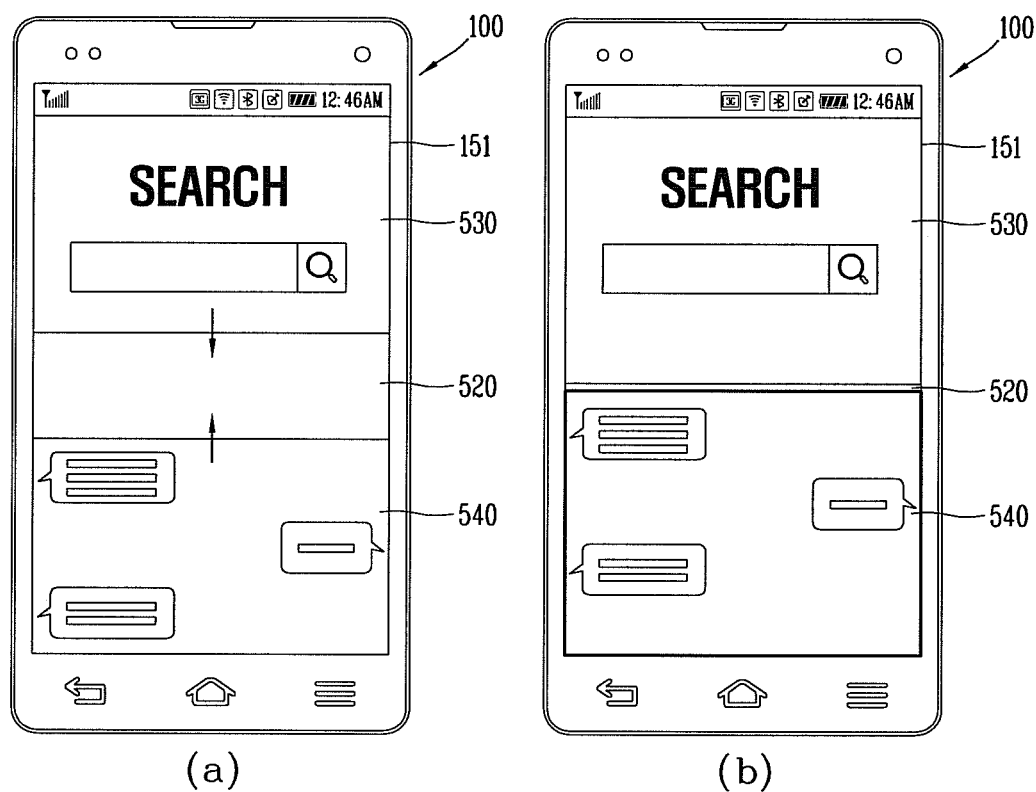

Referring to FIG. 5B(a), the second application selected by the user is executed on the second screen region 540 indicated by the indicator 550.

In addition, the list region 520 gradually decreases in size. At this point, the list region 520 gradually decreases in size as opposed to the process of generating the list region 520 in FIG. 5A(b).

As an embodiment, an application to be executed on each of the screen regions 530 and 540 is output along with the effect of dimming an image.

Alternatively, icons that correspond to the applications to be executed on the screen regions 530 and 540, respectively, are output.

Referring to FIG. 5B(b), the list region 520 gradually decreases in size and converts to the shape of a bar.

In addition, the first and second applications are executed on the first and second screen regions 530 and 540, respectively.

On the other hand, any one of the divisional screen regions is selected as a focus region. The focus region is defined as a screen region on which a user's successive control command (such as a key touch input or a key push input) is executed.

As an embodiment, the screen region to which the indicator points is selected as the focus region. This is because the selected application is executed on the screen region to which the indicator points.

As another embodiment, among the divisional screen regions, the screen region on which the just-previously-selected application is executed is selected as the focus region.

The focus region is highlighted in various ways. For example, the highlighting is performed using a method in which a frame within the focus region is indicated by a bold line or is indicated in a color that distinguishes the focus region from other screen regions or using a method in which the focus region is indicated by a specific icon.

As an embodiment, in FIG. 5A(c) and FIG. 5B(b), the second screen region 540 is selected as the focus region and the frame is indicated by the bold line.

In addition, the screen region selected as the focus region is changed with the user input. For example, a divisional region that is opposite to the screen region selected as the focus region is touched on and thus is changed to the focus region. Alternatively, a focus change icon that is present on the divisional region is touched on, and the divisional region is changed to the focus region.

Referring back to FIG. 5B(b), the second screen region 540 on which the second application that is selected immediately before dividing the screen is executed is selected as the focus region. Accordingly, the highlighting is performed in such a manner that the frame of the second screen region 540 is indicated by the bold line.

Figure 5C:
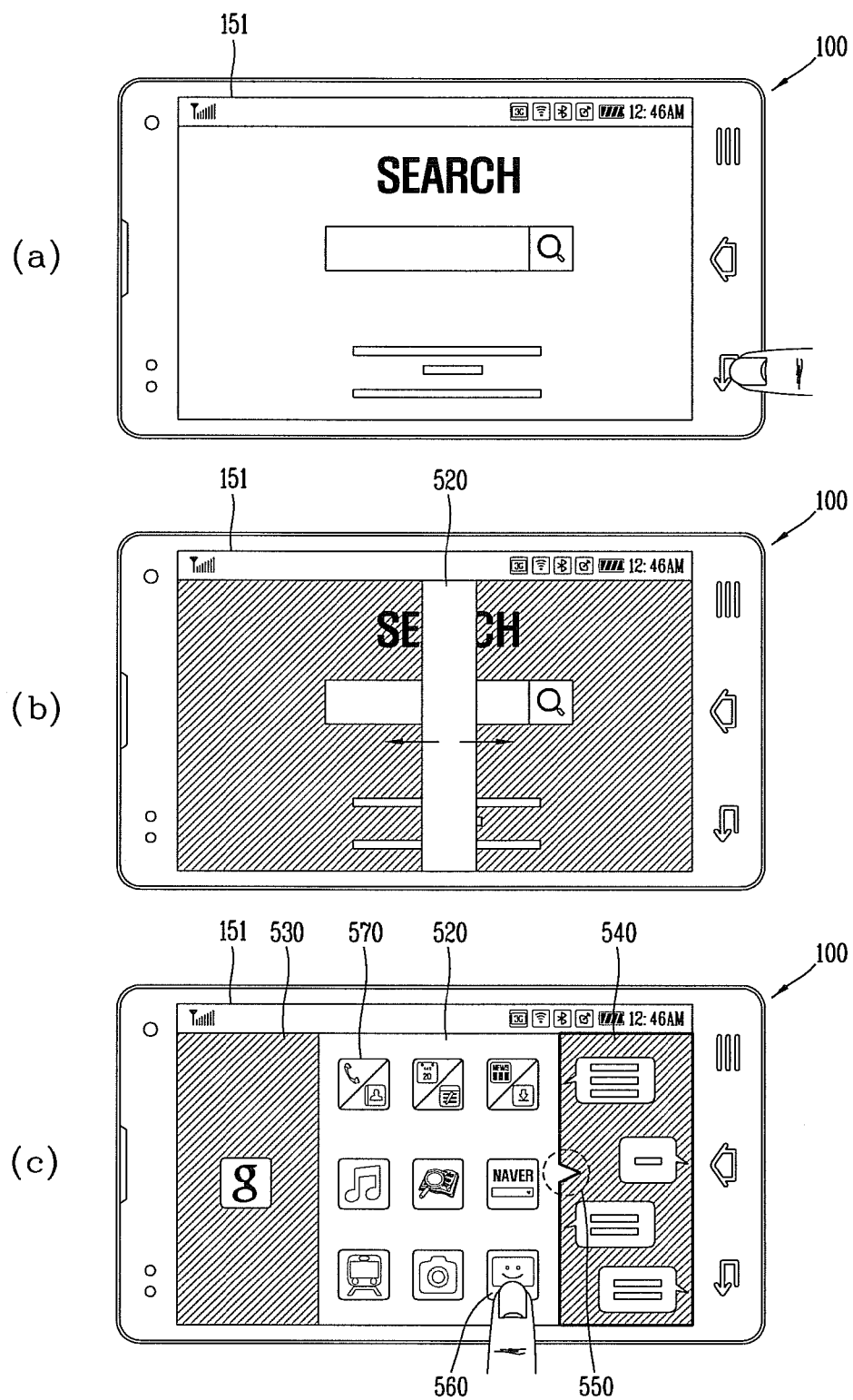
Figure 5D:
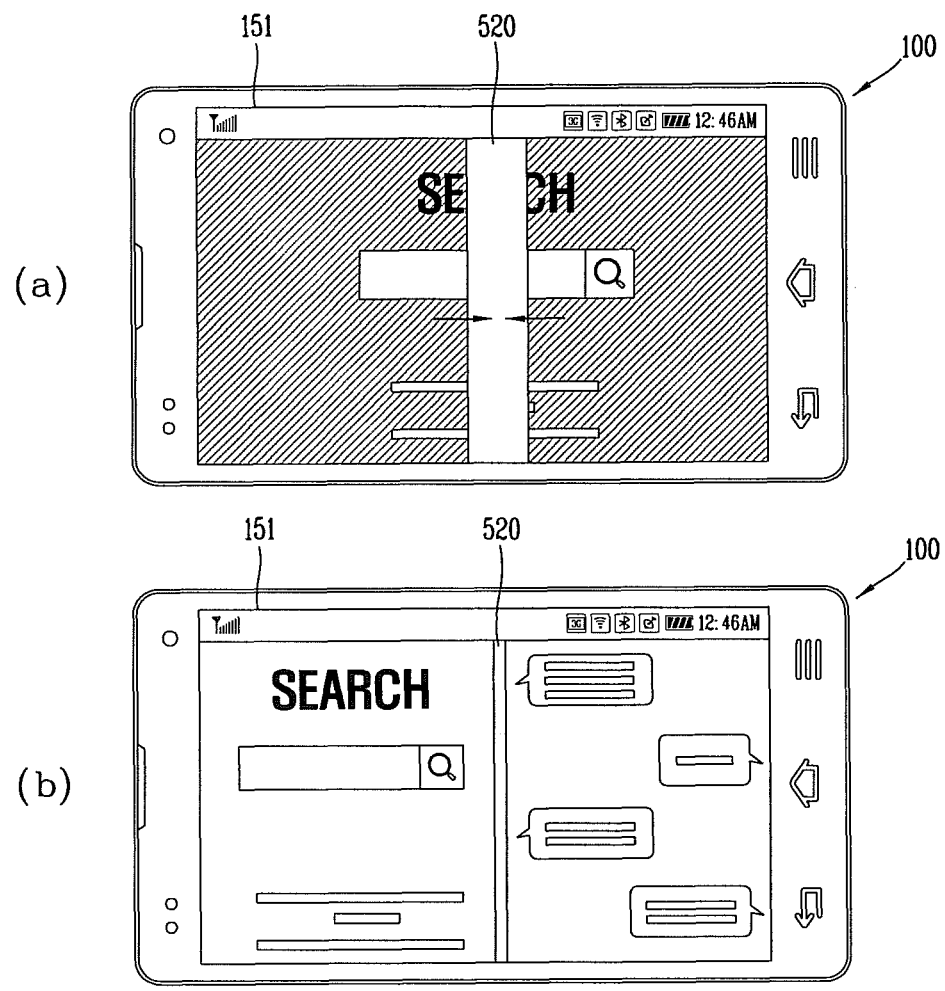

FIGS. 5C(a) to 5C(c) and FIGS. 5D(a) and 5D(b) are diagrams illustrating embodiments of a user interface in the division mode with the mobile terminal 100 in FIGS. 5A(a) to 5A(c) and FIGS. 5B(a) and 5B(b) being rotated.

The bar indicating a state of the mobile terminal 100, the application being executed, and the list of the multiple applications are displayed in a rotated state, compared to the case in FIGS. 5A(a) to 5A(c) and FIGS. 5B(a) and 5B(b). Then, the list region 520 is generated in such a manner as to spread out in the leftward and rightward directions of the screen 151. That is, a basic division method is the same as that in in FIGS. 5A(a) to 5A(c) and FIGS. 5B(a) and 5B(b).

The user interface to be described below referring to the accompanying drawings is executed also in the rotated state of the mobile terminal 100 as illustrated in FIGS. 5C(a) to 5C(c) and FIGS. 5D(a) and 5D(b).

On the other hand, the user can provide the input for entering the division mode in a state in which the division mode is not supported. The state in which the division mode is not supported means a home screen state in which the application being execution is not present, or a top menu state. Alternatively, the state in which the division mode is not supported may be a state in which an application that is set in advance in such a manner that the application cannot be executed on the divisional screen region is being executed.

Figure 6A:
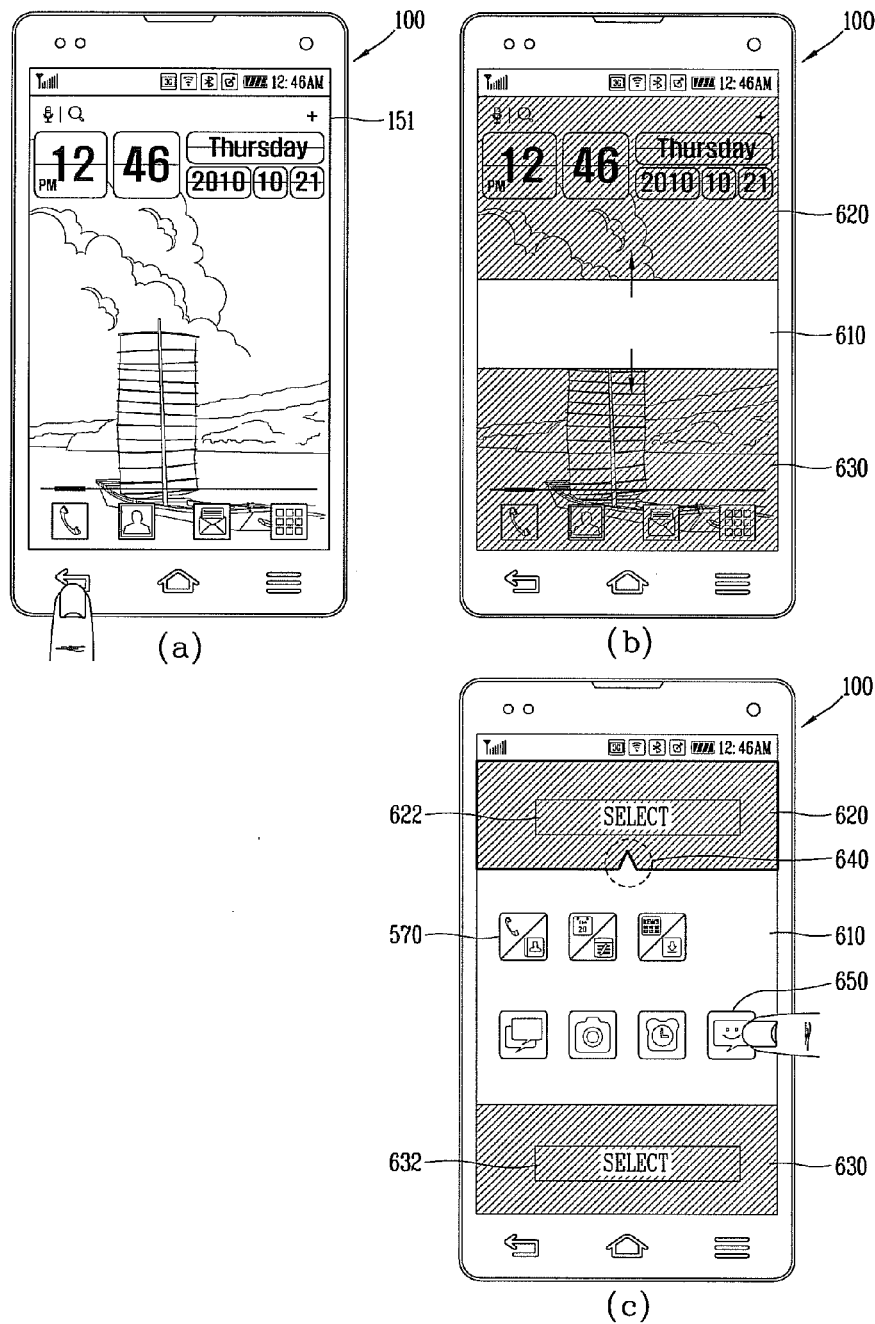
FIGS. 6A(a) to 6A(c) and FIGS. 6B(a) to 6B(c) are diagrams illustrating embodiments of the user interface that is provided when an input for entering the division mode is received in a home screen.
Figure 6B:
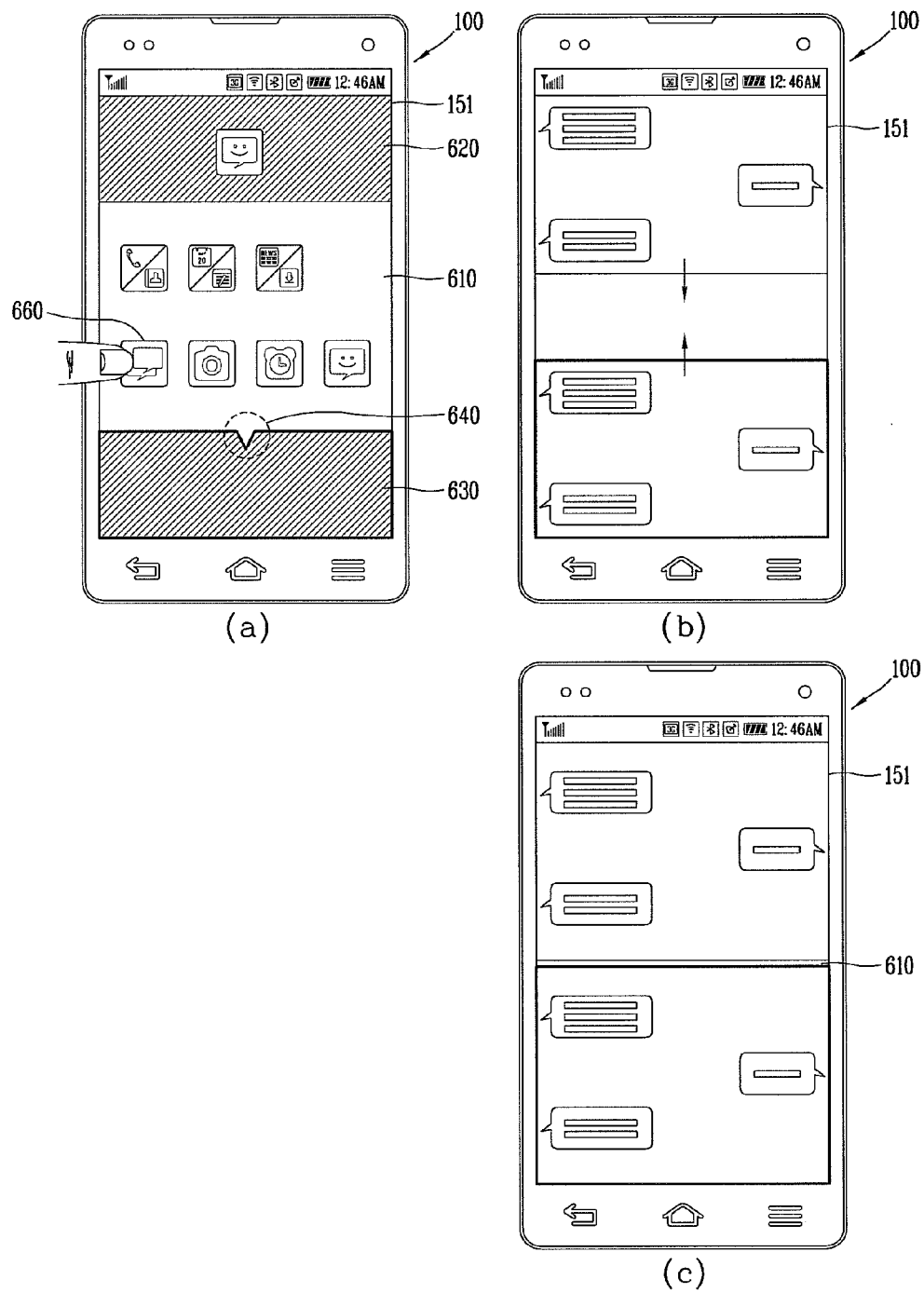

FIGS. 6A(a) to 6A(c) and FIGS. 6B(a) to 6B(c) are diagrams illustrating embodiments of the user interface that is provided when the input for entering the division mode is received in a home screen.

Referring to FIG. 6A(a), the input for entering the division mode is received in a state of the home screen.

Referring to FIG. 6A(b), a list region 610 is generated in such a manner as to spread out in the upward and downward directions of the screen 151. Accordingly, first and second screen regions 620 and 630 are generated.

Referring to FIG. 6A(c), the list region 610 includes the list of the multiple applications and an indicator 640.

An icon corresponding to the application to be executed on the divisional screen region is not output because the application being executed is not present, compared to the case in FIG. 5A(c).

As an embodiment, message pop-up windows 622 and 632 for selecting the application are output to the divisional screen regions, respectively. Alternatively, only the home screen is output in a dimmed state.

In addition, the indicator 640 is output as an arrow that points to the first screen region 620, and the user can touches on a first icon 650 corresponding to the first application in order to select the first application.

Referring to FIG. 6B(a), the indicator, the icon, or the like that indicates the selected first application is output to the first screen region 620.

Then, according to the user's selection of the application to be executed on the first screen region 620, the indicator 640 on the list region 610 is converted into an arrow that points to the second screen region 630.

Subsequently, the user can touch on a second icon 660 corresponding to the second application to be executed on the second screen region 630 in order to select the second application.

Referring to FIG. 6B(b), the first application is executed on the first screen region 620, and the second application is executed on the second screen region 630. Then, the list region 610 gradually decreases in size as opposed to the process of generating the list 610 in FIG. 6A(b).

At this point, the list region 610 decreases in size if the applications being executed are present on the first and second screen regions 620 and 630, respectively.

As another embodiment, the user can decrease a size of the list region 610 by pushing on a specific key. Accordingly, a state like one in FIG. 6B(a) is maintained before inputting a control command that decreases the size of the list region 610.

As a result, the user can change the application being executed on the divisional screen region by selecting the application included in the list region 610 in the same manner as described above.

Referring FIG. 6B(c), the list region 610 gradually decreases in size and then converts to the shape of a bar. Then, the second screen region 630 on which the second application that is selected immediately before dividing the screen is executed is selected as the focus region and is displayed with the frame of the second screen region 630 being indicated by the bold line.

FIGS. 7A to 7D is diagrams illustrating an embodiment of the user interface that is provided when the input for entering the division mode is received in a state of the screen division.

Figure 7:
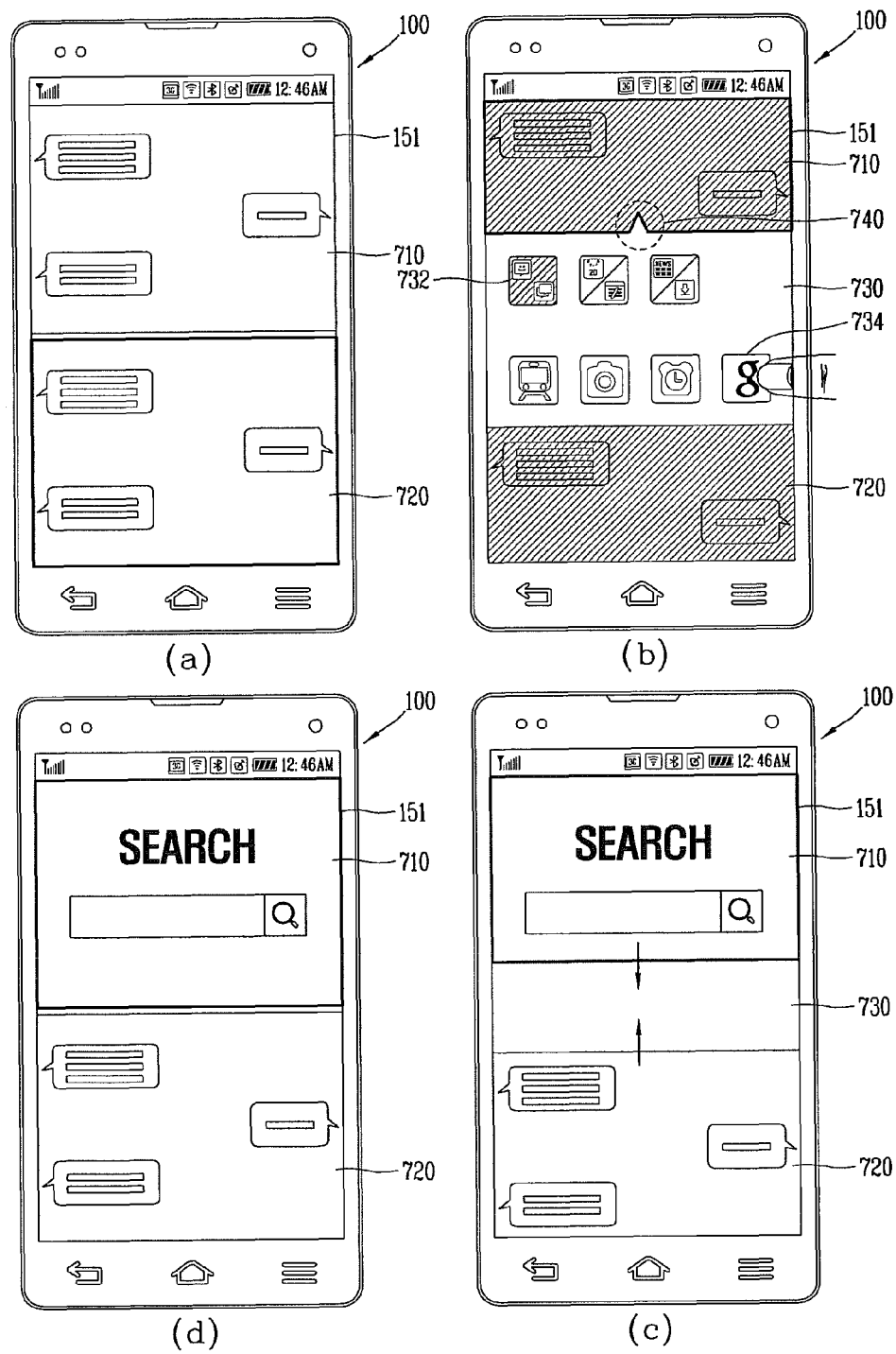
FIGS. 7A to 7D is diagrams illustrating an embodiment of the user interface that is provided when the input for entering the division mode is received in a state of the screen division.

Referring to FIG. 7A, the user can provide the input for entering the division mode while executing the first and second applications on first and second screen regions 710 and 720, respectively.

Referring to FIG. 7B, a list region 730 is generated that includes an indicator 740 that points to a first screen region 710.

At this point, among icons corresponding to the application included in the list region 730, an icon 732 corresponding to the first and second applications is set as not being selectable. For example, the icon 732 is output in a state in which the touch input is not possible.

At this point, the user can touch on a third icon 734 corresponding to a third application to select the third application.

Referring to FIGS. 7C and 7D, the list region 730 decreases in size, and the third application selected by the user is executed on the first screen region 710 to which the indicator 740 points. As a result, the third application is executed on the first screen region 710, and the second application is executed on the second screen region 720.

Figure 8A:
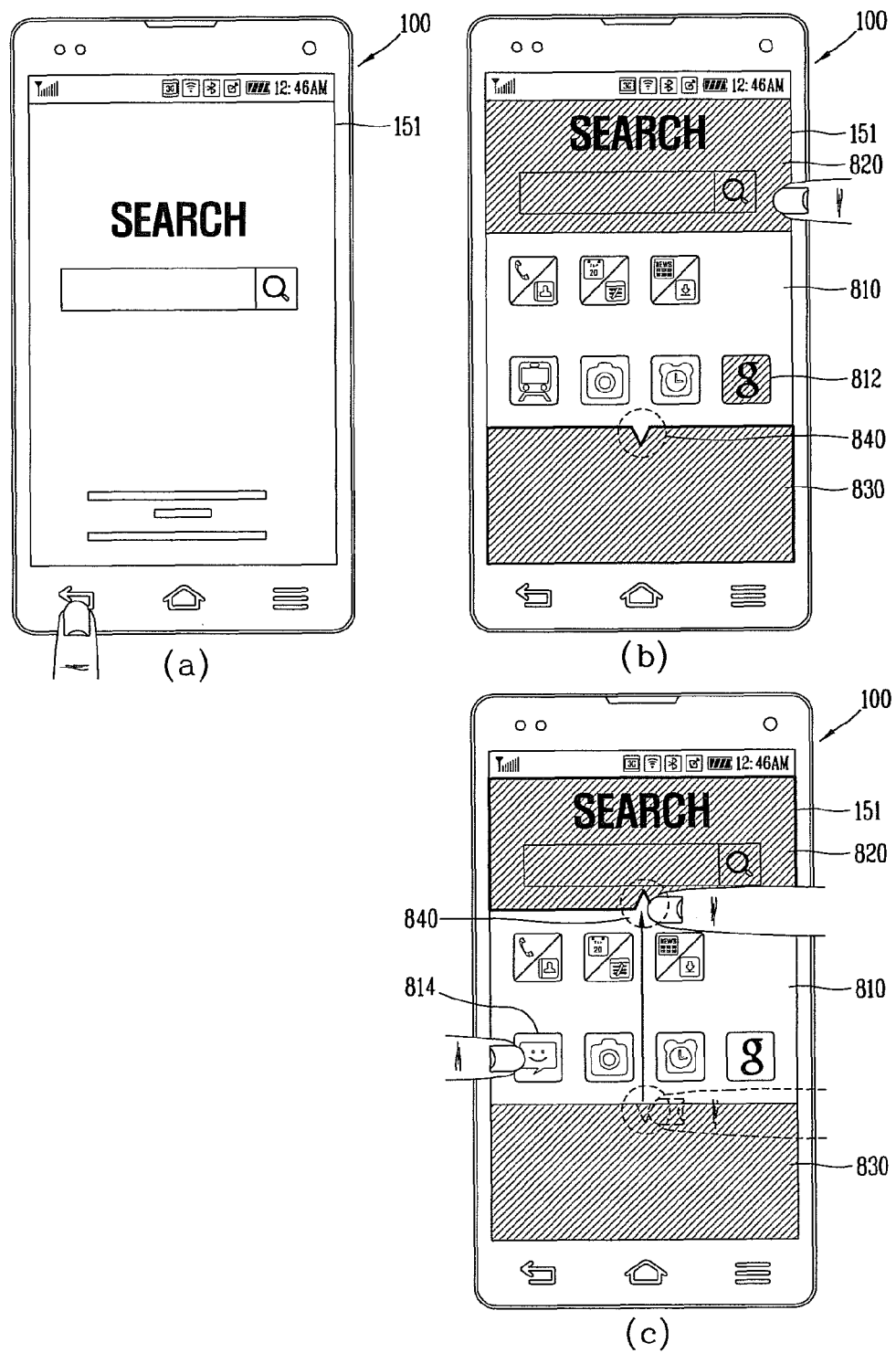
FIGS. 8A(a) to 8A(c) and FIGS. 8B(a) and 8B(b) are diagrams illustrating embodiments of the user interface that is provided when the input for entering the division mode is received while executing an application.
Figure 8B:
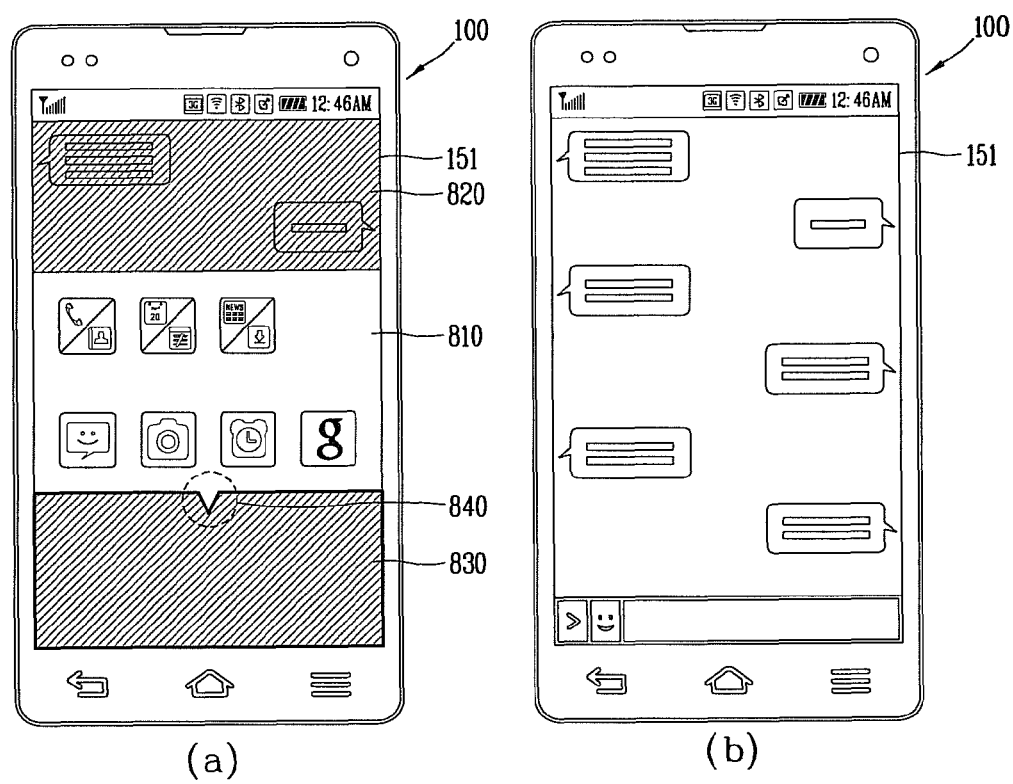

FIGS. 8A(a) to 8A(c) and FIGS. 8B(a) and 8B(b) are diagrams illustrating embodiments of the user interface that is provided when the input for entering the division mode is received while executing the application.

Referring to FIG. 8A(a), the user can provide the input for entering the division mode while executing the first application on the entire screen 151.

Referring to FIG. 8A(b), the generation of a list region 810 leads to the generation of first and second screen regions 820 and 830.

At this point, an icon 812 corresponding to the first application included in the list region 810 is output to a state in which the first application cannot be selected. Then, an indicator 840 is output in such a manner as to point to the second screen region 830 that is in a state where an application is not selected for being executed on the second screen region 830.

In addition, the second screen region 830 to which the indicator 840 points is selected as the focus region. As a result, the frame of the second screen region 830 is indicated by a bold line to show that the second screen region 830 is the focus region.

At this point, the user can change the focus region to the first screen region 820 by touching on the first screen region 820.

Referring to FIG. 8A(c), as a result of the user's touching on the first screen region 820, the focus region is changed to the first screen region 820. Accordingly, the indicator 84 is changed in such a manner as to point to the first screen region 820.

As another embodiment, the user can change the screen region selected as the focus region by changing the direction of the indicator 840.

For example, in FIG. 8A(b), the indicator 840 is changed by touching on the indicator 840 in such a manner as to point to the first screen region 820. Alternatively, as illustrated in FIG. 8A(c), the direction of the indicator 840 is changed by touching on the indicator 840 pointing to the second screen region 830 and then dragging toward the first screen region 820.

As a result, the first screen region 820 is changed to the focus region and thus a border of the first screen region 820 is indicated by a bold line and the indicator 840 points to the first screen region 820.

After changing the focus region, the user can touch on a second icon 814 corresponding to the second application to select the second application.

Referring to FIG. 8B(a), the icon corresponding to the selected second application is output to the first screen region 820. Then, the indicator 840 is changed in such a manner as to point back to the second screen region 830 where the selected application is not present. In this state, the user can push on the BACKSPACE key.

Referring to FIG. 8B(b), the list region 810 disappears by pushing on the BACKSPACE key and the second application is output to the entire screen 151. That is, at this point, control of the division mode is executed by a command that cancels the division mode.

On the other hand, when among the multiple applications included in the list region, the first and second applications are concurrently selected, the first and second applications are executed on the first and second screen regions, respectively.

FIGS. 9A to 9D are diagrams illustrating an embodiment of the user interface that is provided when one icon corresponding to the multiple applications is selected.

Figure 9:
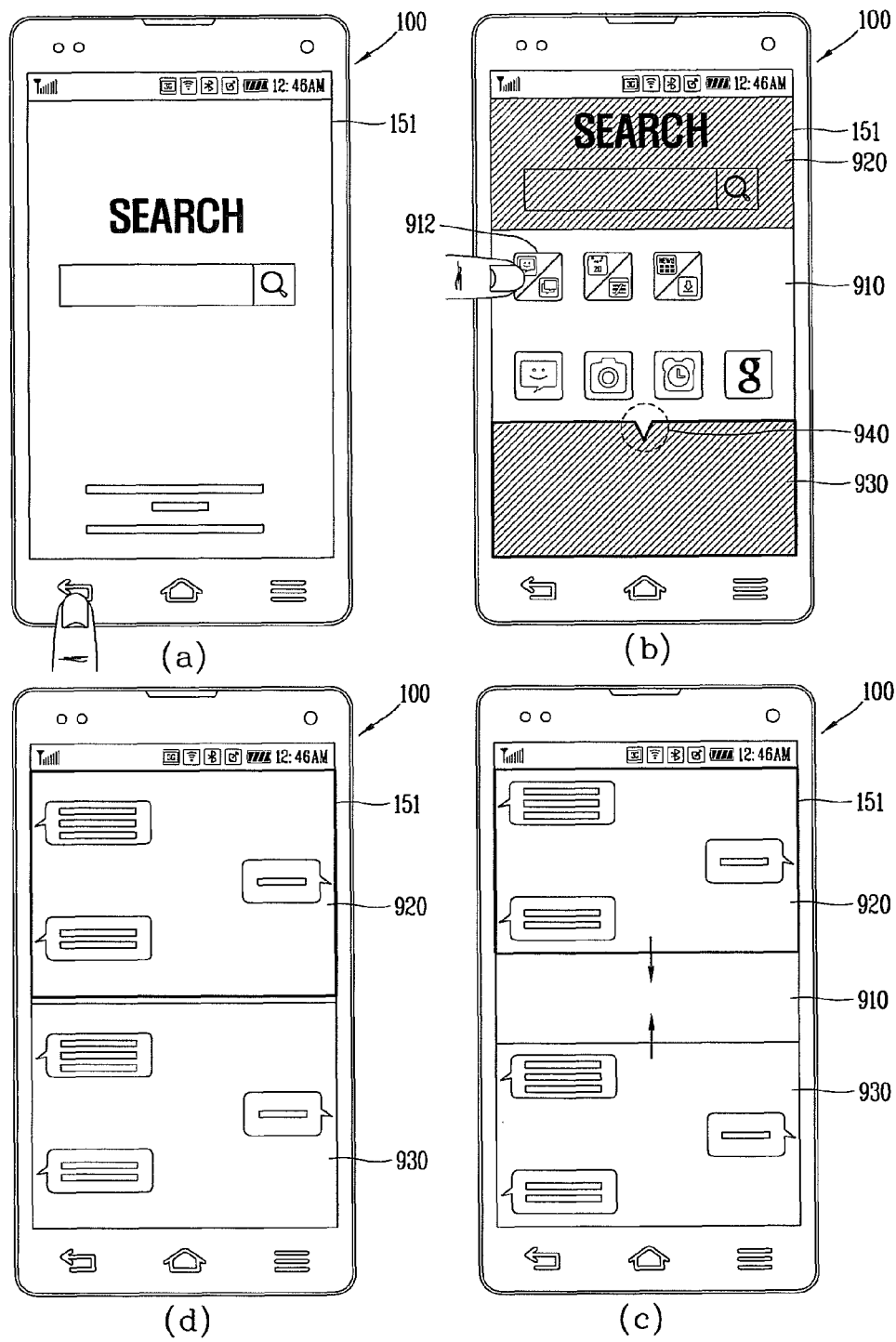
FIGS. 9A to 9D are diagrams illustrating an embodiment of the user interface that is provided when one icon corresponding to the multiple applications is selected.

Referring to FIG. 9A, the user can provide the input for entering the division mode while executing the first application on the entire screen 151.

Referring to FIG. 9B, the generation of a list region 910 leads to the generation of first and second screen regions 920 and 930. In addition, an indicator 940 is output in such a manner as to point to the second region 930 where the application being executed is not present.

Among icons that correspond to the applications in the list region 910, the user can touch on one icon 912 corresponding to the second and third applications to select the second and third applications. At this point, the icon 912 is output in the shape of the second or third application.

As an embodiment, the screen region on which the application is executed is set according to a position of the application displayed on the icon. That is, when the icon is touched on to select the applications, the application displayed to the left is executed on the first screen region, and the application displayed to the right is executed on the second screen region.

As another embodiment, the application displayed on the icon is set by being dragged to the screen region on which the application is expected to be displayed. That is, the left side of the icon is dragged to the second screen region, and thus application displayed to the left in the second screen region is executed. Concurrently, the right side of the icon is dragged to the first screen region, and thus the application displayed to the right is executed on the first screen region.

Referring to FIGS. 9C and 9D, by touching on the icon 912, the second application is executed on the first screen region 920, and the third application are executed on the second screen region 930. That is, if the multiple applications are concurrently selected by touching on one icon, the multiple applications are displayed on the divisional screen regions, respectively.

As another embodiment, by concurrently touching off the multiple icons that correspond to the multiple applications, respectively, the multiple applications are displayed on the divisional screen regions, respectively. That is, the second icon corresponding to the second application and the third icon concurrently the third application are concurrently touched on to select the second application and the third application. As a result, the second application is executed on the first screen region, and the third application is executed on the second screen region.

On the other hand, as described above, when the object included in at least one of the multiple applications in the list region is selected, the application that is executed on at least one of the first and second regions uses the selected object.

Figure 10A:
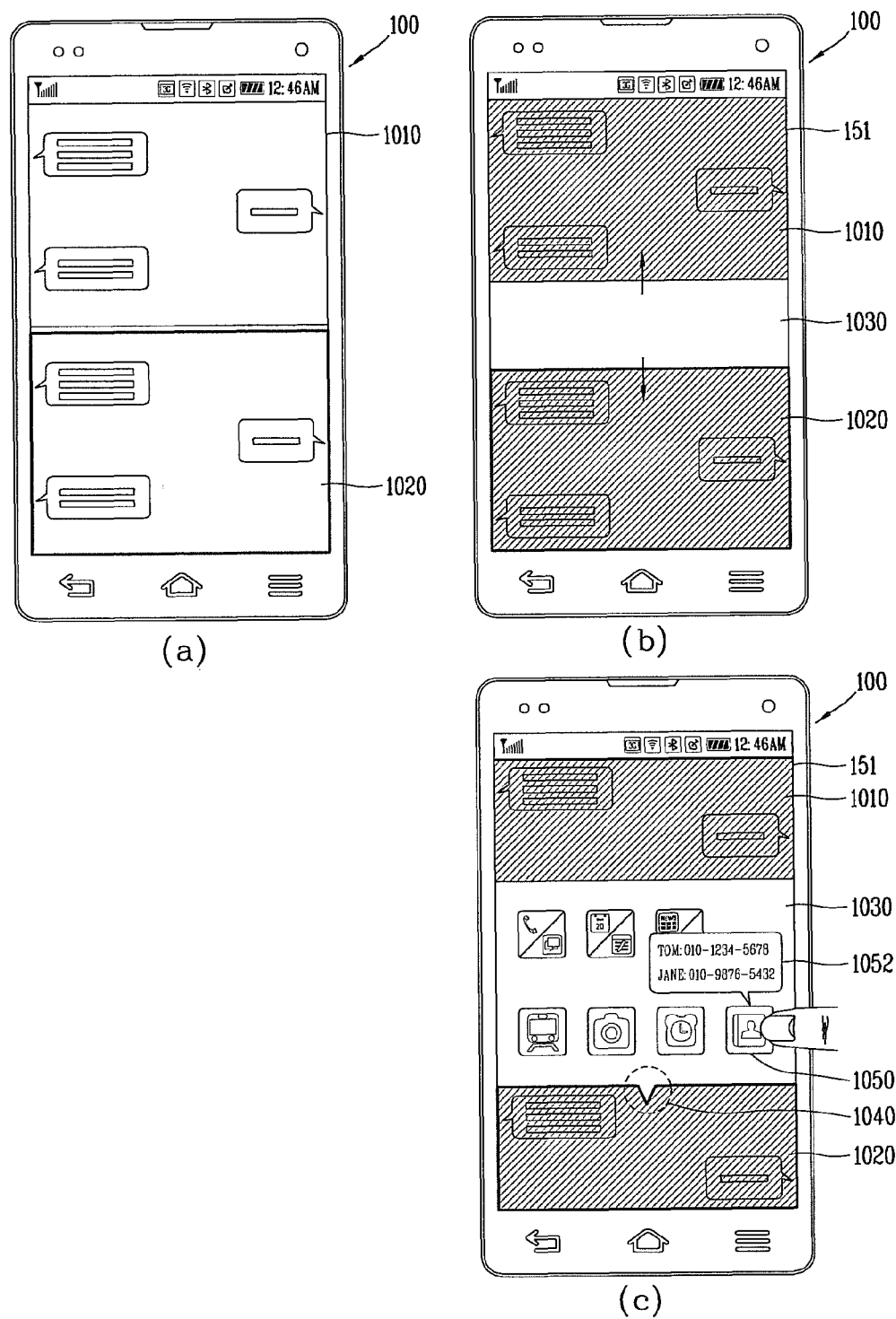
FIGS. 10A(a) to 10D(c) are diagram illustrating embodiments of the user interface that relates to an object included in the application on a list region.

FIGS. 10A(a) to 10D(c) are diagram illustrating embodiments of the user interface that relates to the object included in the application on the list region.

Referring to FIG. 10A(a), if the first and second applications are executed on first and second screen regions 1010 and 1020, respectively, the user can provide the input for entering the division mode by applying the long push to the BACKSPACE key.

Referring to FIGS. A(b) to A(c), the list region 1030 is generated in such a manner as to spread out upward and downward. At this point, the icon corresponding to the previously-executed application is output to the first and second screen regions 1010 and 1020, or the previously-executed screen is output along with the effect of dimming an image.

In addition, the list region 1030 includes an icon corresponding to the multiple applications and an indicator 1040.

Specifically, the multiple applications included in the list region 1030 are differently selected according to the first and second applications being currently executed on the first and second screen regions 1010 and 1020, and thus are output.

As an embodiment, if the first and second applications are a messenger application, applications, including objects, such as a photograph, contact information, and a moving image that are frequently transmitted, are included in the list region 1030.

In addition, the indicator 1040 is output as an arrow pointing to the second screen region 1020, the focus region. Then, when the user applies the long touch to a third icon 1050 corresponding to the third application, a pop-up window 1052 is output that shown a list of the objects included the third application.

As an embodiment, the long touch is applied to an icon 1050a corresponding to a contact information application, a contact information list 1052 that is stored is spread out.

Figure 10B:
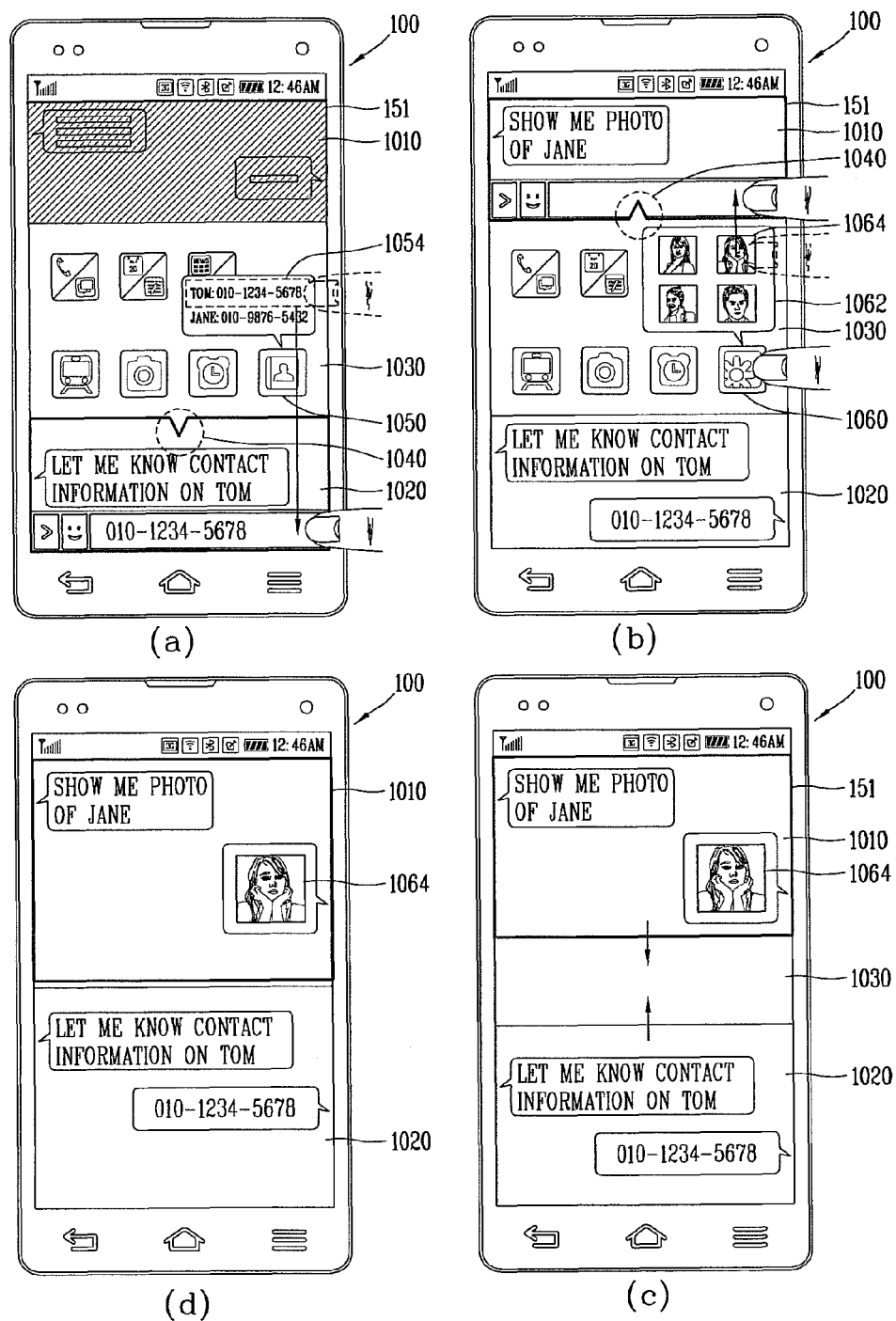

Referring to FIG. 10B(a), when the user selects the object included in the application, the second application, which is executed on the second screen region 1020 to which the indicator 1040 points, uses the selected object.

As an embodiment, when the user touches on the contact information 1054 included in the contact information list 1052 to select the contact information 1054, the second application uses the contact information 1054. That is, the contact information 1054 is copied to a conversation window of the second application, a messenger.

As another embodiment, when the user touches on the contact information 1054 and drags it to the conversation window of the messenger, the contact information 1054 is copied to the conversation window.

Referring to FIG. 10B(b), when the contact information 1054 is copied to the second screen region 1020, the indicator 1040 is changed to an arrow pointing to a first screen region 1010.

In addition, as illustrated in FIG. 10B(a), when the user applies the long touch to an icon 1060 corresponding to a photo album application, an image file list 1062 stored in a photo album application is spread out in the shape of a thumbnail.

When a specific image file 1064 is touched on to be selected from the image file list 1062, the file 1064 is copied to the conversation window of the first application, the messenger. Alternatively, to copy the image file 1064, the image file 1064 is touched on and is dragged to the messenger window.

Referring to FIGS. 10B(c) and 10B(c), when the object is transmitted to each of the first and second screen regions 1010 and 1020, the list region 1030 gradually decreases in size.

As another embodiment, if the users inputs a control command that decreases a size of the list region 1030 in order to additionally transmit the object, the list region 1030 decreases in size.

Referring to FIG. 10A(c), if the first and second applications are executed on the first and second screen regions 1010 and 1020, respectively, the user can provide the input for entering the division mode by applying the long push to the BACKSPACE key.

For example, the user can provide the input for entering the division mode by applying the long push to the BACKSPACE key while the messenger application is executed on the first screen region 1010, and an email application is executed on the second screen region 1020.

Figure 10C:
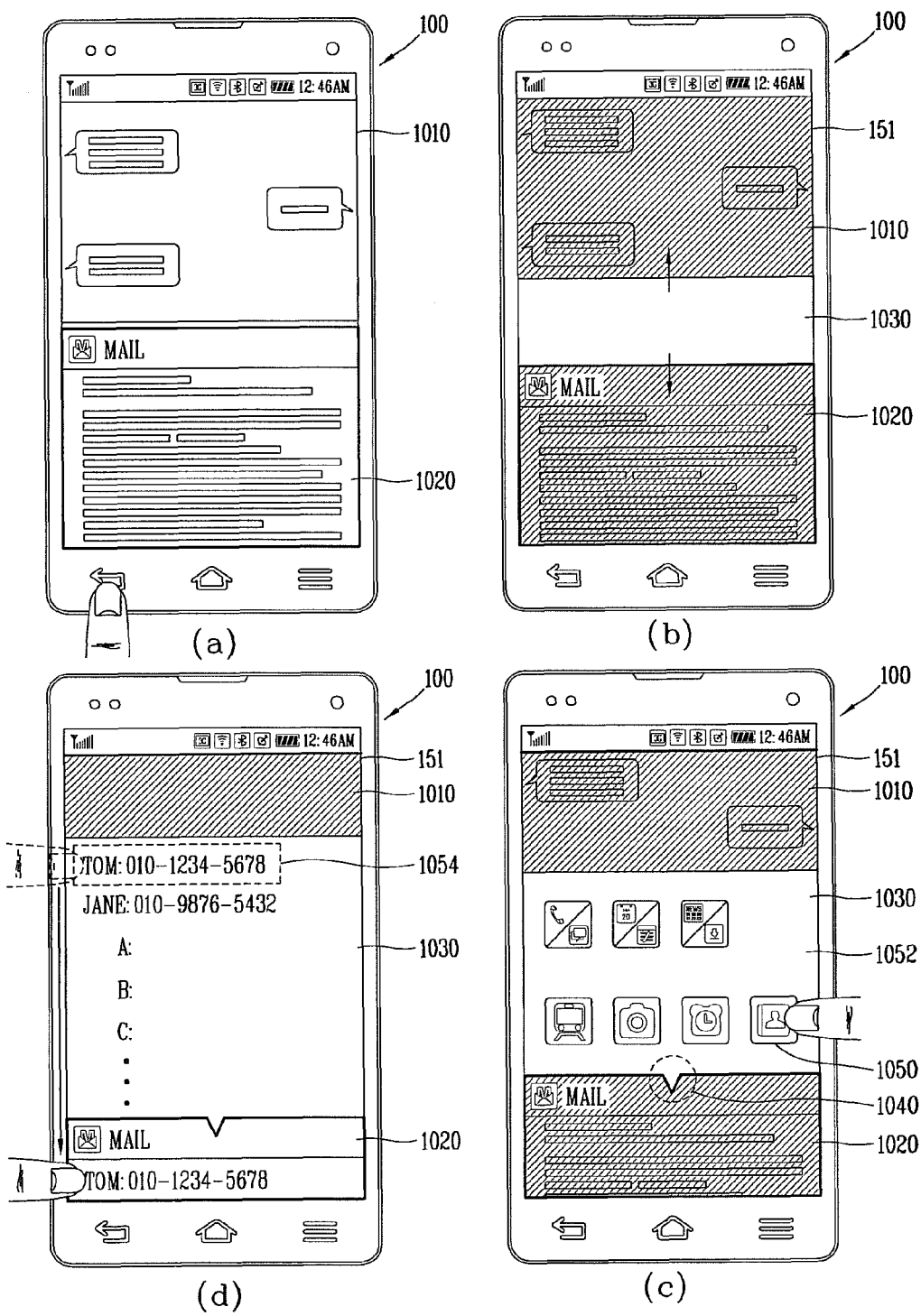

Referring to FIGS. 10C(b) to 10C(c), the list region 1030 is generated in such a manner as to spread out upward and downward, and the list region 1030 includes the icon corresponding to the multiple applications and the indicator 1040.

In addition, the indicator 1040 is output as an arrow pointing to the second screen region 1020, the focus region.

Then, the icon corresponding to the previously-executed application is output to the first and second screen regions 1010 and 1020, or the previously-executed screen is output along with the effect of dimming an image.

At this point, the multiple applications included in the list region 1030 are differently selected according to the first and second applications being currently executed on the first and second screen regions 1010 and 1020, and thus are output.

Specifically, the multiple applications are differently selected according to types of the first and second applications, or the application that is frequently executed along the first and second applications is output. Alternatively, the user can output an application that is set in advance by the user.

For example, if the first application is the messenger application and the second applications is the email application, the applications, including objects, such as a photograph, contact information, and a moving image that are frequently transmitted through the messenger and the email, are included in the list region 1030.

Then, the user can select the third application by applying the long touch to the third icon 1050 corresponding to the third application.

Referring to FIG. 10C(d), the third application is executed on the list region 1030 by applying the long touch to the third icon 1050.

As an embodiment, when the long touch is applied to the icon 1050 corresponding to a contact information application, the contact information application is executed on the list region 1030. That is, the contact information list is executed on the list region 1030, and the icons that are output to the list region 1030 disappear. At this point, the list region 1030 is broadened in order to execute the contact information application.

In addition, when the user selects the object included in the application being executed on the list region 1030, the second application, which is executed on the second screen region 1020 to which the indicator 1040 points, uses the selected object.

As an embodiment, when the user touches on the contact information 1054 included in the contact information application to select the contact information 1054, the second application uses the contact information 1054. That is, the contact information 1054 is copied to the email application.

As another embodiment, when the user drags the contact information 1054 to the second screen region 1020, the contact information 1054 is copied.

Figure 10D:
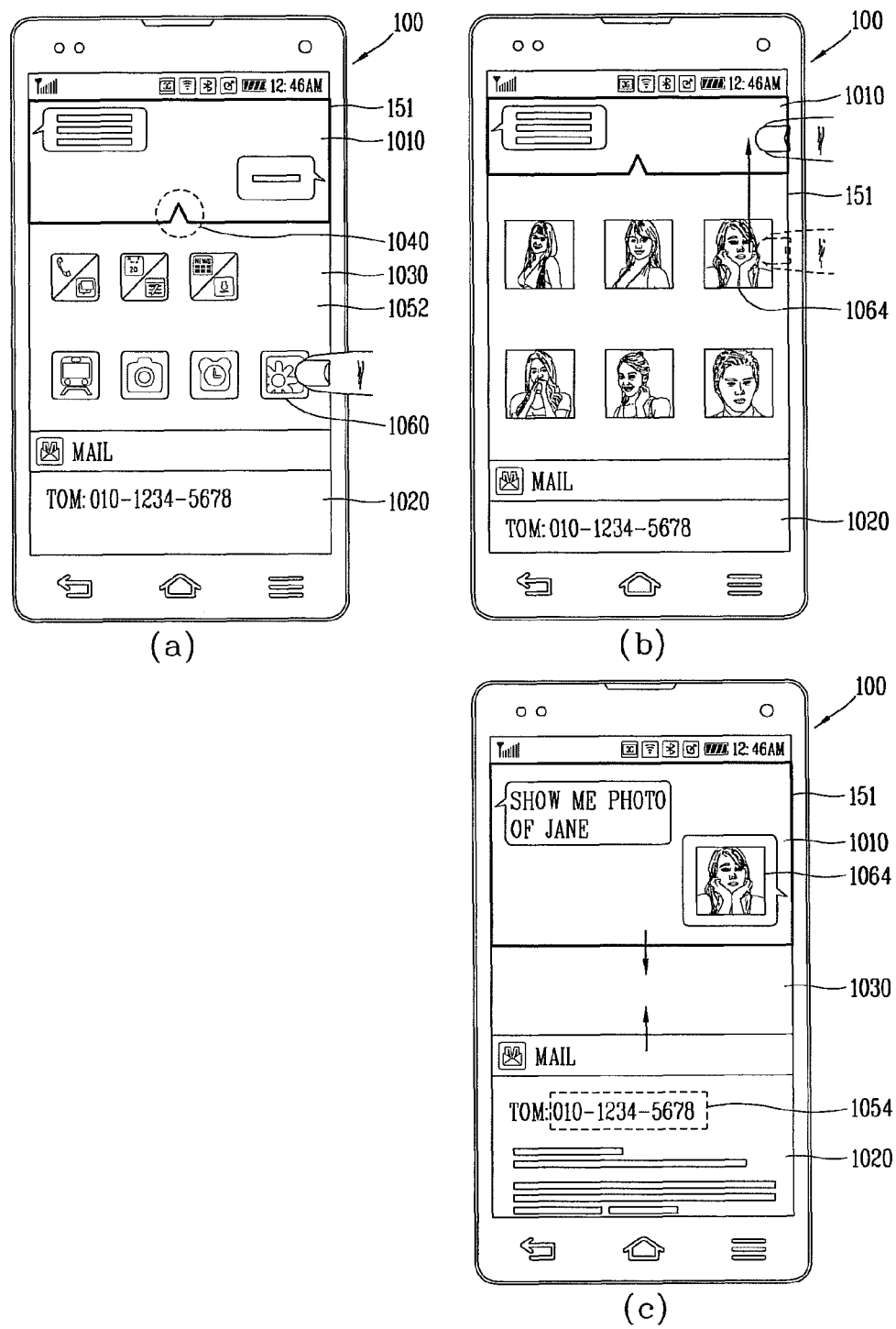
Figure 11:
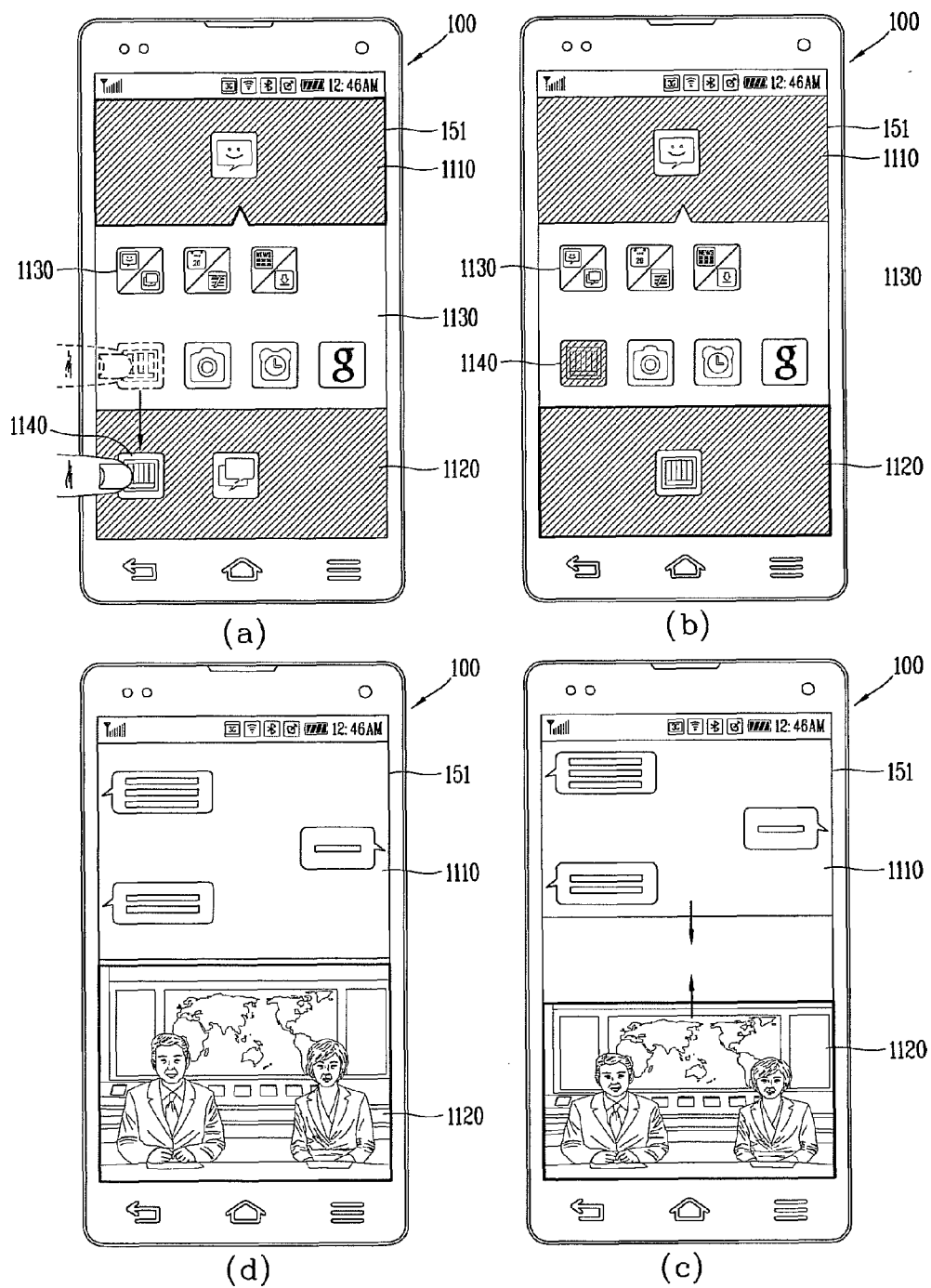
FIGS. 11A to 11D are diagrams illustrating embodiments of the user interface that relates to selection of the icon corresponding to the application included in the list region.
Figure 12:
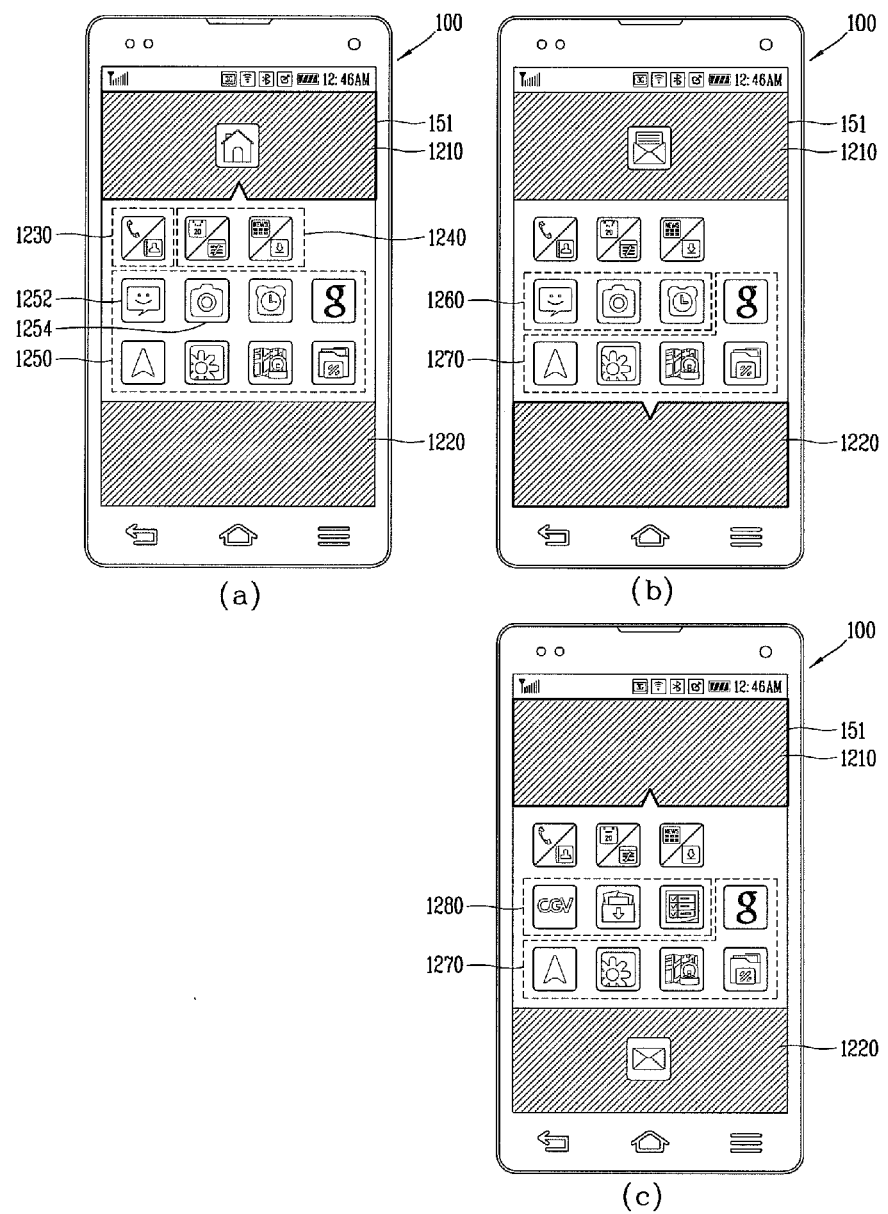
FIGS. 12A to 12C and FIGS. 13A to 13C are diagrams illustrating embodiments of the user interface that relates to arrangement of the icons corresponding to the applications listed in the list region.
Figure 13:
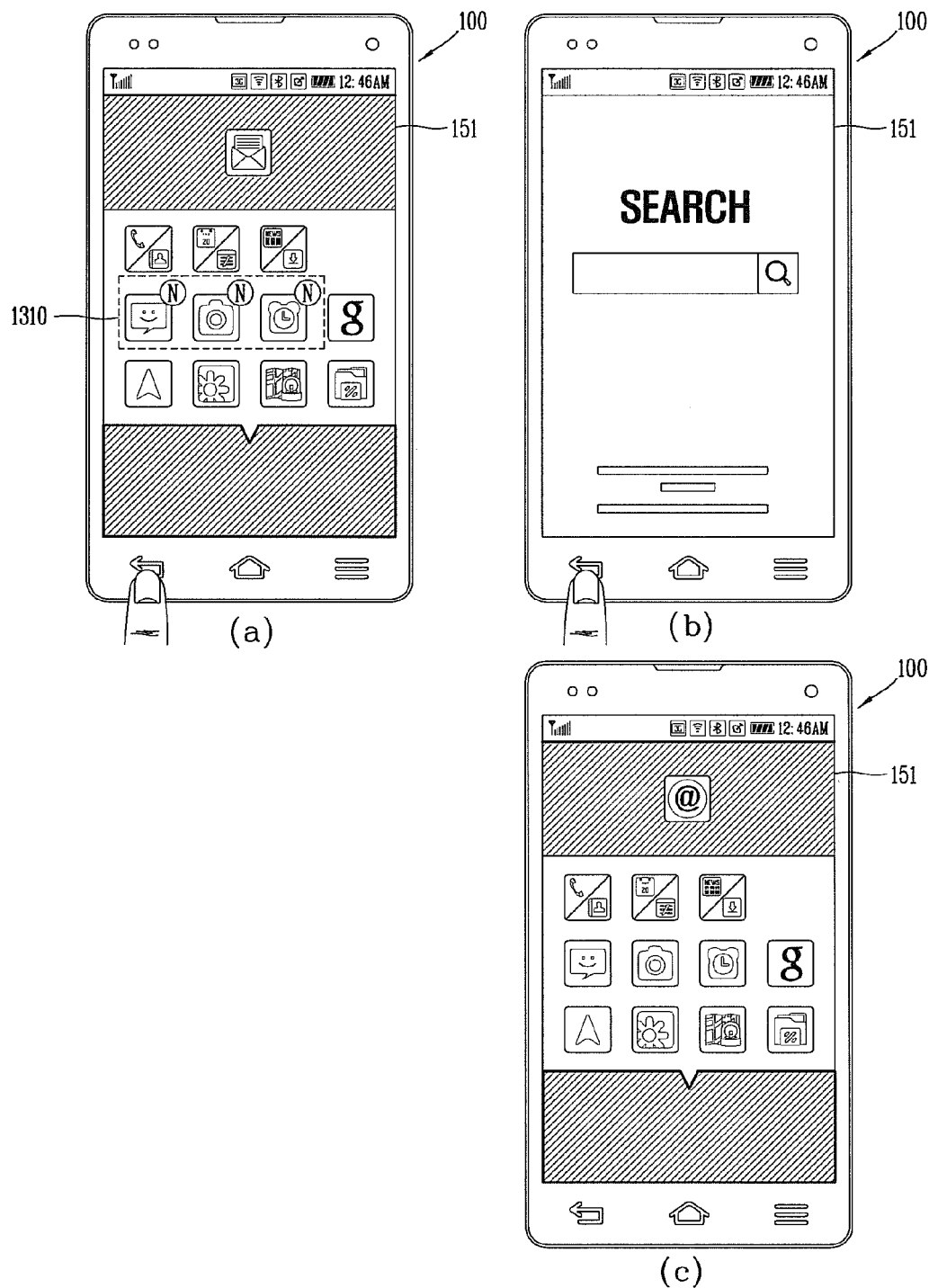
Figure 14:
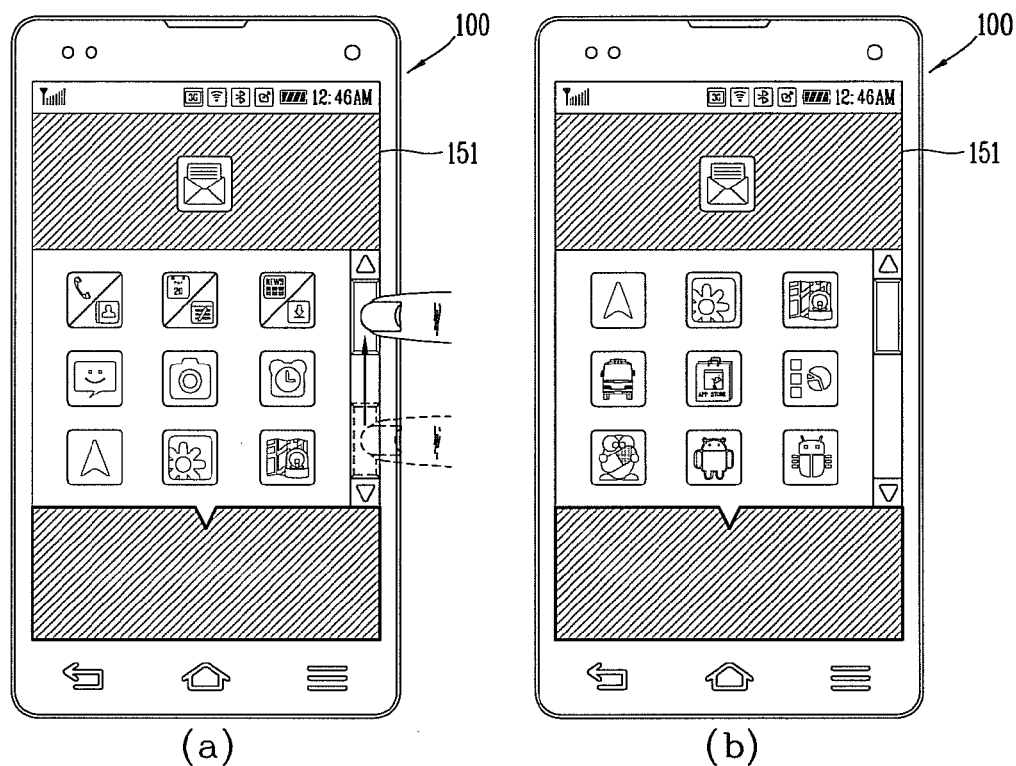
Figure 15:
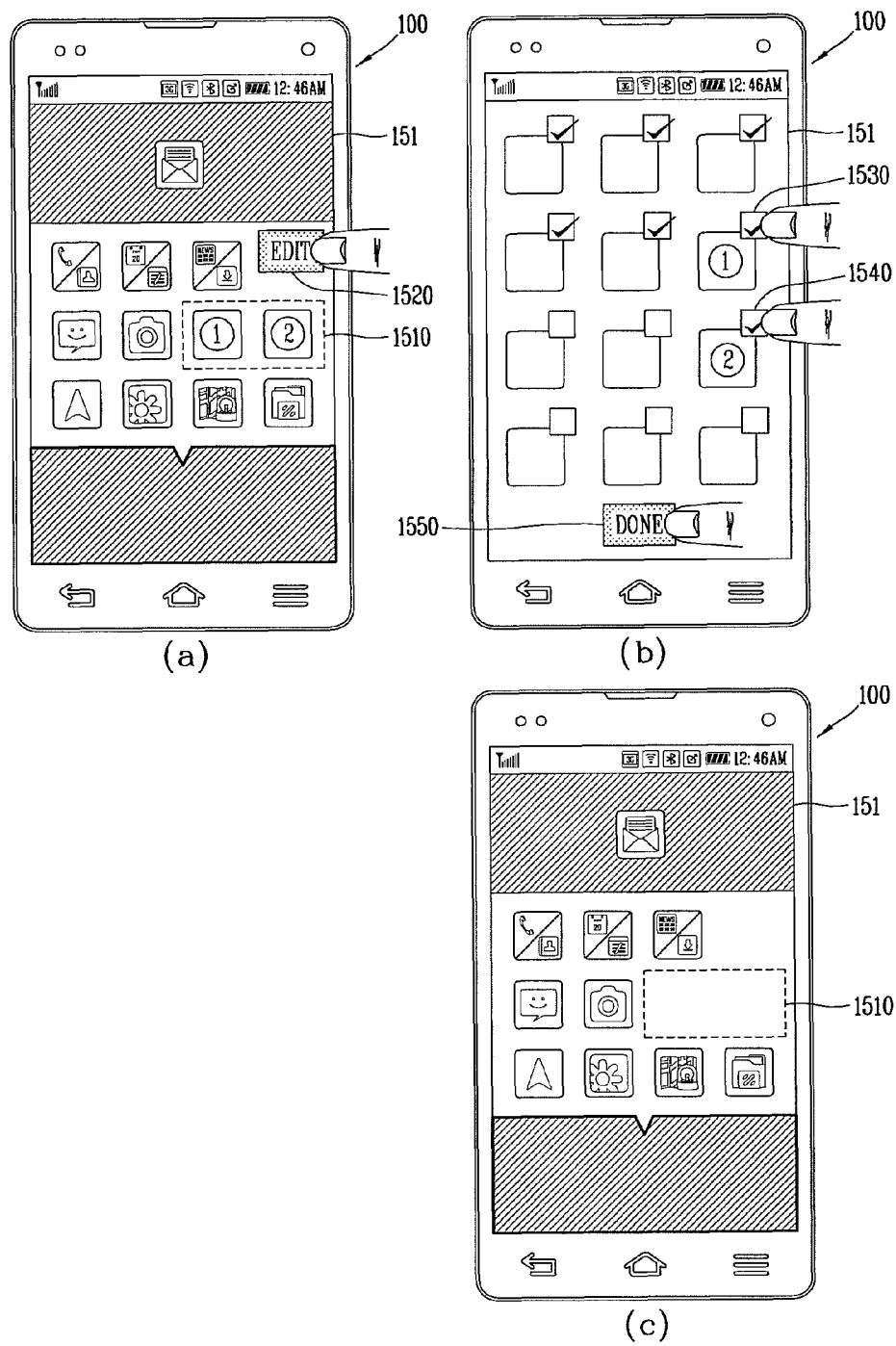
FIGS. 15A to 15C are diagrams illustrating an embodiment of the user interface by which the arrangement of the icons corresponding to the applications included in the list region is adjusted.

Referring to FIG. 10D(a), when the contact information 1054 is copied to the second screen region 1020, the icons for the multiple applications are output back to the list region 1030. At this point, the icons that are to be output are selected in the same manner as in FIG. 10C(c) and are output.

In addition, in FIG. 10C(d), the screen switch to FIG. 10D(a), when the object is transmitted, is automatically made, or is made by the user's applying a specific control command, such as pushing on the BACKSPACE key). At this point, the indicator 1040 is changed to an arrow pointing to the first screen region 1010.

Subsequently, the user can apply the long touch to the icon 1060 corresponding to the photo album application.

Referring to FIG. 10D(b), according to the application by the user of the long touch, the photo album application is executed on the list region 1030. Accordingly, the image files included in the photo album application are output to the list region 1030.

When a specific image file 1064 is touched on to be selected from among the image files, the specific image file 1064 is copied to the conversation window of the first application, the messenger. Alternatively, to copy the image file 1064, the image file 1064 is dragged to the messenger window.

Referring to FIG. 10D(c), when the object is transmitted to each of the first and second screen regions 1010 and 1020, the list region 1030 gradually decreases in size.

As another embodiment, if the users inputs the control command that decreases the size of the list region 1030 in order to additionally transmit the object, the list region 1030 decreases in size.

On the other hand, as illustrated in FIG. 4, the process of selecting the application to be executed on the divisional screen region and the process of selecting the object included in the application are successively performed. In this case, only when the control command that decreases a size of the list region is input, the list region decreases in size.

FIGS. 11A to 15C are diagram illustrating embodiments of the user interface that relates to the application included in the list region.

As described above, when the icon corresponding to the application included in the list region is touched on, the application is executed on the divisional screen region to which the indicator points. Alternatively, when the icon is dragged to the divisional screen region to which the indicator points, the application is executed on the divisional screen region to which the indicator points.

As another embodiment, the user can drag the icon to the screen region to which the indicator does not point, and then execute the application on the screen region to which the icon is dragged.

FIGS. 11A to 11D are diagrams illustrating embodiments of the user interface that relates to the selection of the icon corresponding to the application included in the list region.

Referring to FIG. 11A, the first and second applications are executed on first and second screen regions 1110 and 1120, respectively. At this point, an icon 1130 corresponding to the first and second applications included in the list region is output to a state in which the first and second applications cannot be selected.

The user can drag the icon 1140 corresponding to the third application to a second screen region 1120 to which the indicator does not point.

Referring to FIG. 11(b), the icon indicating the third application is output to the second screen region 1120, and a third icon 1140 is output to an inactive state in which the third application cannot be selected. Then, the icon 1130 corresponding to the first and second applications is output back to a state in which the first and second applications can be selected.

Referring to FIGS. 11(c) and 11(d), the list region gradually decreases in size, and thus the first and third applications are executed on the first screen region 1110 and the second screen region 1120, respectively.

On the other hand, in FIGS. 11A and 11B, when the icon that corresponds to the application that is output to the state where the selection is impossible and is being executed is selected, the existing screen 151 is maintained as is.

In addition, as another embodiment, the icon corresponding to the application being executed also is output to the state where the selection is possible.

On the other hand, as described above, the icon corresponding to the multiple applications and the icon corresponding to one application are output to the list region. The icons are arranged according to order in which the applications indicated by the icons are recently executed and according to the number of times that the applications indicated by the icons are executed.

FIGS. 12A to 12C and FIGS. 13A to 13C are diagrams illustrating embodiments of the user interface that relates to arrangement of the icons corresponding to the applications listed in the list region.

Referring to FIG. 12A, a first icon 1230 corresponding to two applications is set as corresponding to the two applications that are executed the most recently. In addition, second and third icons 1240, each corresponding to two applications also is set as one corresponding to the multiple applications that are recently executed.

Then, icons 1250, each corresponding to one application are arranged in increasing order of the number of times in which the applications are executed. For example, a fourth icon 1252 is set as corresponding to the application that is executed the most frequently, and a fifth icon 254 is set as corresponding to the application that is executed the second most frequently.

In addition, the outputting begins with an icon that corresponds to an application that has the closest relationship with an application to be executed on the divisional screen region. Specifically, the order in which the icons are output is determined based on a kind of application and on how often the application is executed together with the application to be executed.

Referring to FIG. 12B, icons 1260, each corresponding to the application that is executed frequently together with the first application being executed on a first screen region 1210, are preferentially output. Subsequently, icons 1270 are output in increasing order of the number of times that the corresponding application is executed.

Likewise, referring to FIG. 12C, icons 1280, each corresponding to the application that is executed frequently together with the second application being executed on a second screen region 1220, are preferentially output. Subsequently, the icons 1270 are output in increasing order of the number of times that the corresponding application is executed.

On the other hand, an icon corresponding to an application that is recently installed is preferentially output.

Referring to FIGS. 13(a) and 13(b), icons 1310, each corresponding to the application that is installed before generating the list region are preferentially output to the upper end portion of the list region.

Each of icons 1310, which corresponds to the recently-installed application, includes an indicator indicating that the corresponding application is recently installed. For example, each of the icons 1310 includes the N-marked indicator displayed on the upper right end portion.

As described above, as this point, when the user pushes on the BACKSPACE key, returning back to the home screen takes place.

Referring to FIG. 13(c), when the user applies the long push to the BACKSPACE key in order to again enter the division mode, the list region is generated. At this point, the icons that are arranged in the manner as in FIGS. 12A to 12C are again output.

That is, if the division mode is again entered, the indicator indicating that the corresponding application is recently installed is not output, and the icons, each corresponding to the application, are arranged according to the number of times that the corresponding application is executed.

FIGS. 14A and 14B are diagrams illustrating embodiments of the user interface by which the icons corresponding to the applications included in the list region are searched for.

Referring to FIGS. 14A and 14B, the user searches for the multiple icons in the list region by moving upward a scroll bar that is output to the right side of the list region.

As another embodiment, the multiple icons are searched for by flicking the list region to which the icons are output as if a page were turned over.

As another embodiment, each of the applications is output in the shape of a thumbnail, and the user searches for the application by flicking the list region.

FIGS. 15A to 15C are diagrams illustrating an embodiment of the user interface by which the arrangement of the icons corresponding to the applications included in the list region is adjusted.

Referring to FIG. 15A, first and second icons 1510 are output to the list region. At this point, the user enters a list region editing mode by touching on an editing button 1520 included in the list region.

Referring FIG. 15(b), the multiple icons included in the list region are output to the entire screen 151, illustrating a state of the list region editing mode, and.

In addition, each icon includes the indicator indicating whether or not the icon is selected. For example, the indicator is output to the upper end portion of the icon, as a check box indicating whether or not the icon is selected.

As an embodiment, when the user touches on check boxes 1530 and 1540 of the first and second icons to select the first and second icons, marks indicating that the first and second icons are selected are output to the check boxes 1530 and 1540 of the first and second icons, respectively. Subsequently, the user can end the list region editing mode by touching on an editing completion button 1550.

It is apparent from FIG. 15C that first and second icons 1510 selected in the editing mode are not output to the list region. At this point, the first and second icons 1510 are output to the lower portion of the list region and are searched for by applying a scroll input as illustrated in FIGS. 14A and 14B.

That is, in the editing mode, the user can determine the icons to be output to the list region. As an embodiment, the hidden icons are excluded from the list region or are output to the lower portion of the list region in alphabetical order.

On the other hand, an icon through which each of the first and second screen regions is controlled is output to the screen 151.

FIGS. 16A to 16D, FIGS. 17A(a) to 17A(c) and FIGS. 17B(a) and 17B(c) are diagrams illustrating embodiments of the user interface that relates to the icons that are output to the list region.

Figure 16:
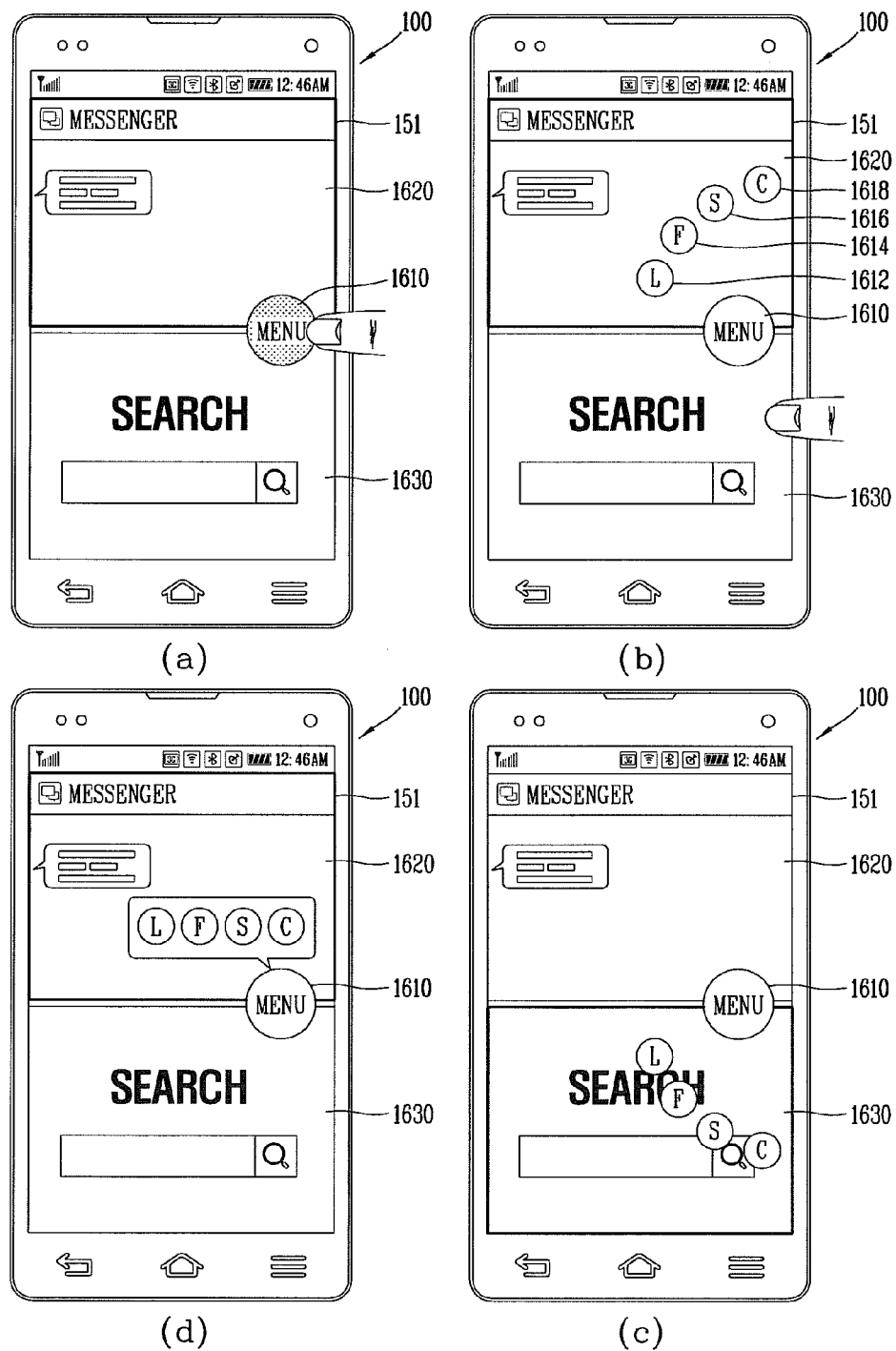
FIGS. 16A to 16D are diagrams illustrating embodiments of the user interface that relates to the icons that are output to the list region.

Referring to FIGS. 16A and 16B, the user can touch on a menu icon 1610 that is output to the list region, to select the corresponding application. As a result, lower-level icons 1612, 1614, 1616, and 1618 of the menu icon 1610 are output along with an animation effect that produces natural changes in screen.

Specifically, a list icon 1612, a full icon 1614, a switch icon 1616 and a close icon 1618 are output to a first screen region 1620, the focus region.

In this state, the user can change the focus region by touching on a second screen region 1630.

Referring to FIG. 16C, the low-level icons 1612, 1614, 1616, and 1618 that are previously output to the first screen region 1620 are output to the second screen region 1630. That is, the lower-level icons 1612, 1614, 1616, and 1618 are spread out on the focus region.

Referring to FIG. 16D, the lower-level icons 1612, 1614, 1616, and 1618 are output to a separate pop-up window that is output to the focus region, illustrating another embodiment in which the lower-level icons 1612, 1614, 1616, and 1618 are output.

When touching back on the menu icon 1610, the lower-level icons 1612, 1614, 1616, and 1618, which are described above, disappear.

As another embodiment, if a control command is not input for a predetermined time, such as touching on the lower-level icons 1612, 1614, 1616, and 1618, the lower-level icons 1612, 1614, 1616, and 1618 that are spread out disappear.

FIGS. 17A(a) to 17A(c) and FIGS. 17B(a) and 17B(b) are diagrams illustrating embodiments of the user interface that is provided when the lower-level icon in FIGS. 16A to 16D is selected.

Referring to FIG. 17A(a), as described above, the lower-level icons 1612, 1614, 1616, and 1618 are output to a first screen region 1710, the focus region.

Referring to FIG. 17A(b), if the user selects the list icon 1612, the list region that includes the indicator pointing to the first screen region 1710.

Referring to FIG. 17A(c), if the user selects the full icon 1614, the first application being executed on the first screen region 1710 is output to the entire screen 151.

Referring to FIG. 17B(a), if the user selects the switch icon 1616, positions of the applications being executed the first screen region 1710 and a second screen region 1720, respectively, are exchanged.

Specifically, the first application being executed on the first screen region 1710 is executed on the second screen region 1720. Then, the second application being executed on the second screen region 1720 is executed on the first screen region 1710. At this point, the second screen region 1720 on which the first application is executed is set as the focus region.

As another embodiment relating to exchanging of the screen regions, if the user applies a long push to a title of the first application executing on the first screen region or to a tap region of the first screen region, the first screen region is dimly displayed and a thumbnail box of the first application floats.

Subsequently, when the user drags the thumbnail box to the second screen region and then releases the dragging, the positions of the first and second screen regions are exchanged. At this point, when the user does not drag the thumbnail on the first screen region and releases the dragging to the first screen region, releases the dragging, the positions of the first and second screen regions are not exchanged.

As another embodiment, the user can exchange the positions of the first and second screen regions by tapping the first and second screen regions and then flicking them upward and downward.

Referring to FIG. 17B(b), if the user selects the close icon 1618, the first screen region 1710, the focus region, returns back to the state that is present before executing the first application.

As an embodiment, if the third application is called while executing the first application, the first application is ended on the first screen region 1710, and the third application is output to the first screen region 1710.

As another embodiment, if a task to be ended is present on the first application, the divisional screen regions are integrated into the entire screen and the second application being executed on the second screen region 1720 is output to the entire screen 151.

On the other hand, the size of the divisional screen region is adjusted according to the user's input. As an embodiment, when the list region decreases in size and converts into the shape of a bar, the sizes of the first and second screen regions are set according to the user's input for adjusting a position of a bar.

In addition, when the first screen region decreases to less than a predetermined threshold size, only the application being executed on the second screen region is output to the entire screen 151. The threshold size is set according to the first application being executed on the first screen region.

For example, if the first application is a moving image application, when the first screen region becomes too small, it is difficult to view the moving image. Therefore, considering this, the threshold size is set in advance.

FIGS. 18A to 18D are diagrams illustrating an embodiment of the user interface by which the size of the divisional screen region is adjusted.

Referring to FIG. 18A, the user can increase a size of a first screen region 1810 by dragging downward a split bar 1830 that constitutes a border between the divisional screen regions. Accordingly, a second screen region 1820 decreases in size.

Referring to FIG. 18B, when the user drags the split bar 1830 and thus the second screen region 1820 decreases to less than a threshold size 1840, the second screen region 1820 is squeezed downward to the extent to which the second screen region 1820 is invisible on the screen 151. As a result, only the first application being executed on the first screen region 1810 is output to the entire screen 151.

At this point, the threshold size 1840 is set in advance according to the second application being executed on the second screen region 1820.

Referring to FIGS. 18C to 18D, only the first application is output to the entire screen 151, but the second application also is being executed. Accordingly, the user can drag the end portion of the entire screen 151 upward in such a manner as to raise the hidden second screen region 1820 up to a point from which the second screen region 1820 is dragged downward.

In addition, since the second screen region 1820, the focus region in FIGS. 18A and 18B, decreases to less than the threshold size, the focus region is changed. That is, the first screen region 1810 is set as the focus region.

Figure 19A:
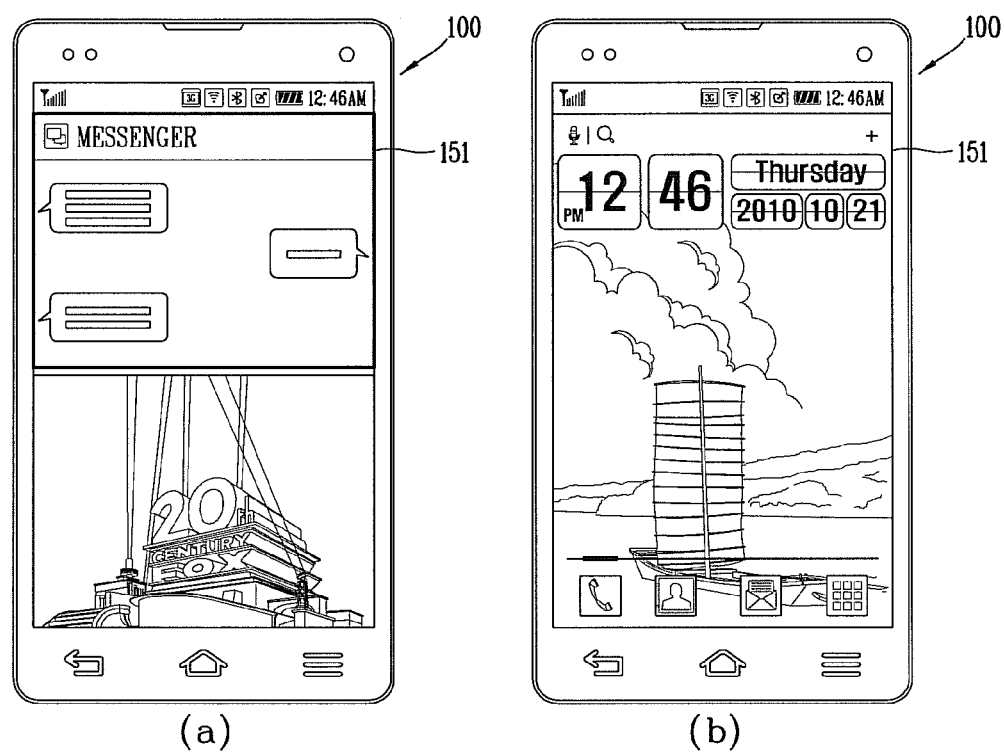
FIGS. 19A(a) to 19C(d) are diagrams illustrating embodiments of the user interface that is provided when a physical key (HOME/BACKSPACE/MENU button) is pushed on in the division mode.

FIGS. 19A(a) to 19C(d) are diagrams illustrating embodiments of the user interface that is provided when a physical key (a HOME/BACKSPACE/MENU button) is pushed on in the division mode.

FIGS. 19A(a) to 19A(d) are diagrams illustrating the embodiment of the user interface that is provided when the HOME button is pushed on in the division mode.

Referring to FIGS. 19A(a) to 19A(d), when the user pushes on the HOME button in the division mode, the division mode is canceled and the switching to the home screen takes place.

On the other hand, if the BACKSPACE button is pushed on in the division mode, the control command that is input through the use of the BACKSPACE button is executed on the focus region.

Figure 19B:
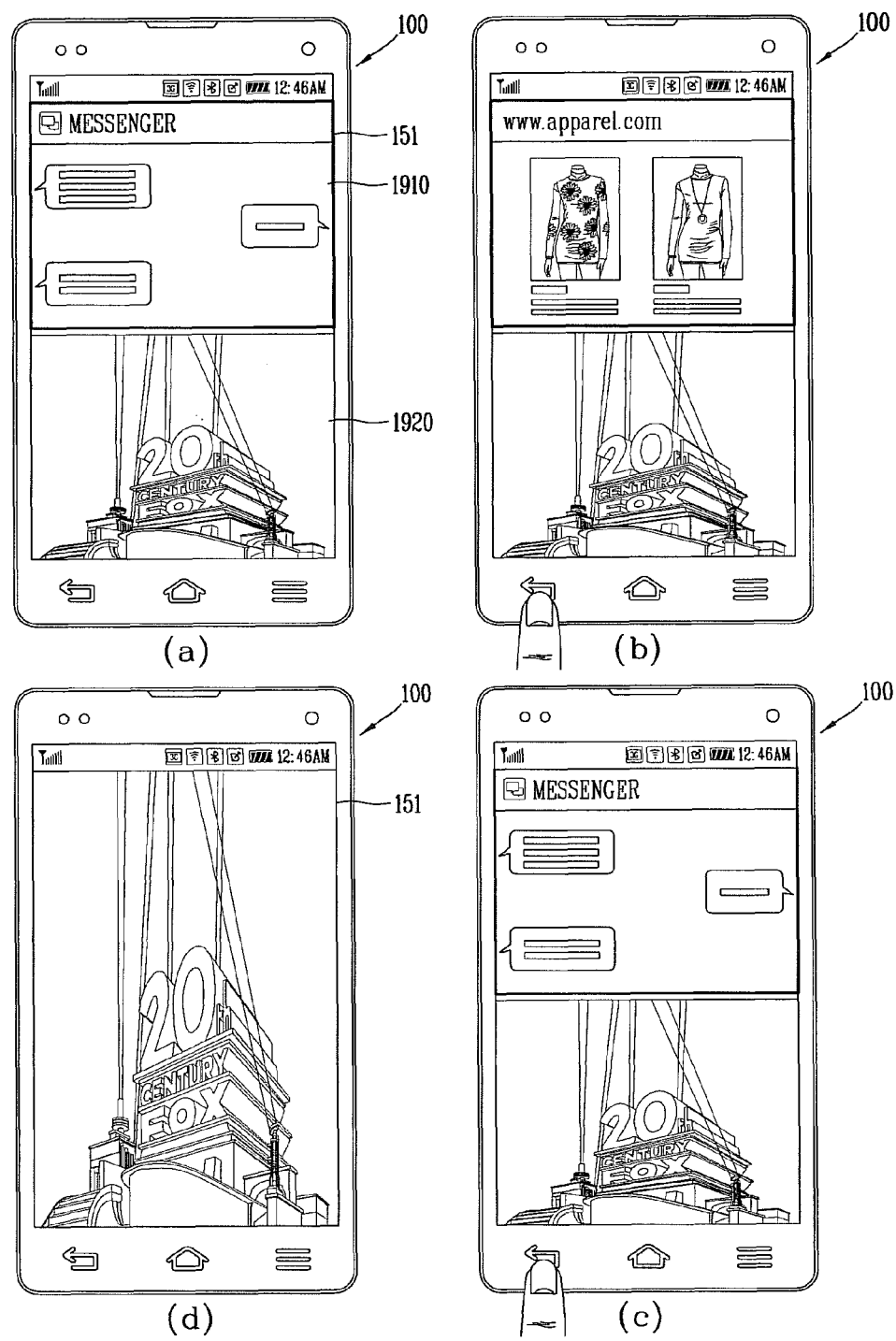

FIGS. 19B(a) to 19B(d) are diagrams illustrating the embodiment of the user interface that is provided when the BACKSPACE button is pushed on in the division mode.

Referring to FIGS. 19B(a) and 19B(b), when the first application being executed on a first screen region 1910 calls the third application, the third application is executed on the first screen region 1910.

Referring to FIG. 19B(c), when the user pushes on the BACKSPACE button as illustrated in FIG. 19B(b), the control command that is input through the use of the BACKSPACE button is executed on the first screen region 1910, the focus region. Specifically, the first application that is previously executed on the first screen region 1910 is output back to the first screen region 1910. That is, the first application returns back to the same state as in FIG. 19B(a).

Referring to FIG. 19B(d), when the user pushes on the BACKSPACE button as illustrated in FIG. 19B(c), the first application is ended, and the division mode is canceled. As a result, the second application being executed on a second screen region 1920 is output to the entire screen 151.

On the other hand, if the MENU button is pushed on in the division mode, a menu relating to the application being executed on the focus region is output. At this point, the menu to be output is output to the focus region or the screen region that is opposite to the focus region.

Figure 19C:
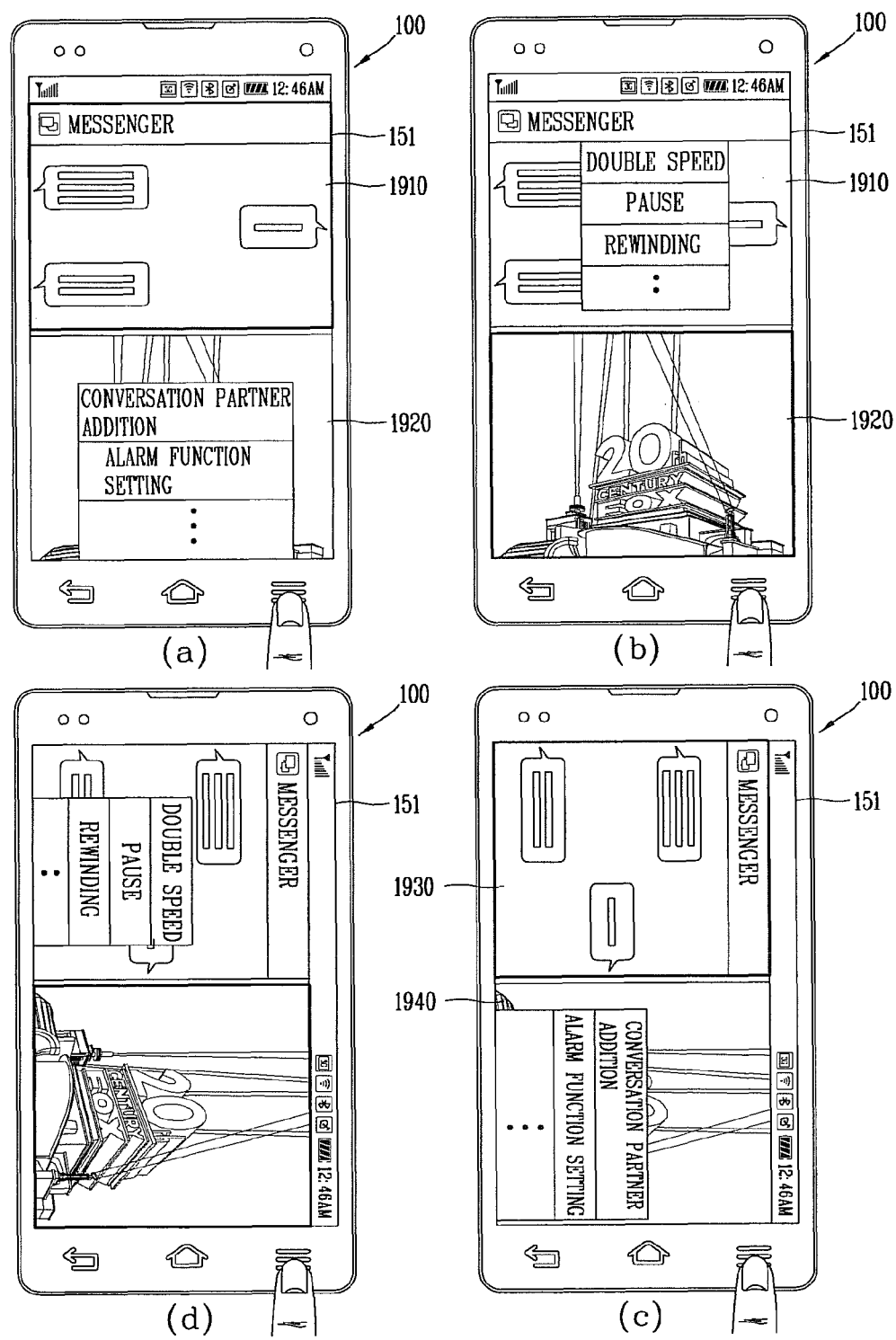

FIGS. 19C(a) to 19C(d) are diagrams illustrating the embodiments of the user interface that is provided when the MENU button is pushed on in the division mode.

Referring to FIG. 19C(a), when the MENU button is pushed on in a state where the focus region is the first screen region 1910, the menu relating to the messenger application being executed on the focus region is output to the second screen region 1920. At this point, the menu includes addition of a conversation partner, setting of an alarm function, and others that relate to the messenger application.

Referring to FIG. 19C(b), when the MENU button is pushed on in a state where the focus region is the second screen region 1920, the menu relating to the moving image being executed on the focus region is output to the first screen region 1910. At this point, the menu includes double speed, pause, rewinding, and others.

FIGS. 19C(c) and 19C(d) are diagrams illustrating the embodiment of the user interface that is provided when the MENU button is pushed on in the division mode with the mobile terminal 100 being rotated.

The control command that is input through the use of the MENU button is executed in the same manner as described above referring to FIGS. 19C(a) and 19C(d), with the contents of the output being rotated.

As another embodiment, when the flicking input is applied to the second screen region in a case where the first screen region is the focus region, the control command that is input through the use of the flicking is executed on the second screen region. That is, the control command that is applied to each of the screen regions is executed on the corresponding screen region.

On the other hand, when in a case where the first application is executed on the entire screen of the display unit 151 and the second application is executed on a floating screen that is output in such a manner as to overlap the entire screen on which the first application is executed, the floating screen is dragged to one region of the entire screen, which is set in advance, the entire screen is divided into the first and second screen regions, and the first and second applications are executed on the first and second screen regions, respectively.

Figure 20A:
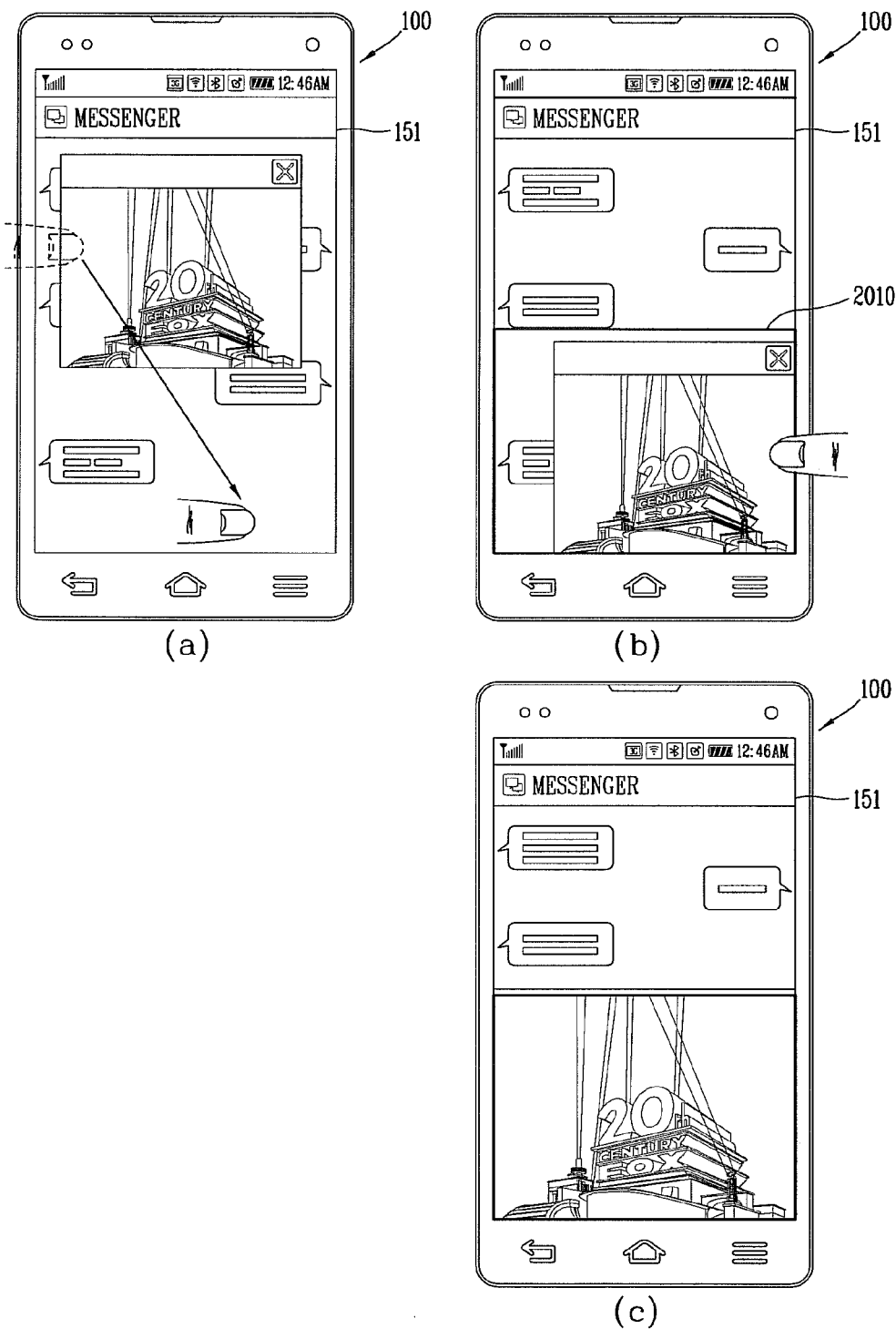
FIGS. 20A(a) to 20E(b) are diagrams illustrating embodiments of the user interface by which the division mode is entered in a state where a floating screen is output.

FIGS. 20A(a) to 20E(b) are diagrams illustrating embodiments of the user interface by which the division mode is entered in a state where the floating screen is output.

Referring to FIG. 20A(a), the messenger application is executed on the entire screen 151, and the moving image is executed on the floating screen. At this point, the user can drag the floating screen to the lower end portion of the entire screen 151.

Referring to FIG. 20A(b), when the floating screen is dragged, a guide region 2010 is output that preliminarily displays the screen region to which to output the floating screen at the time of the screen division.

Referring to FIG. 20A(c), the moving image being executed on the floating screen is output to the guide region 2010 that is output.

As another embodiment, the command that triggers the entering of the division mode is input in a state where the multiple floating screens are output to the entire screen 151.

Figure 20B:
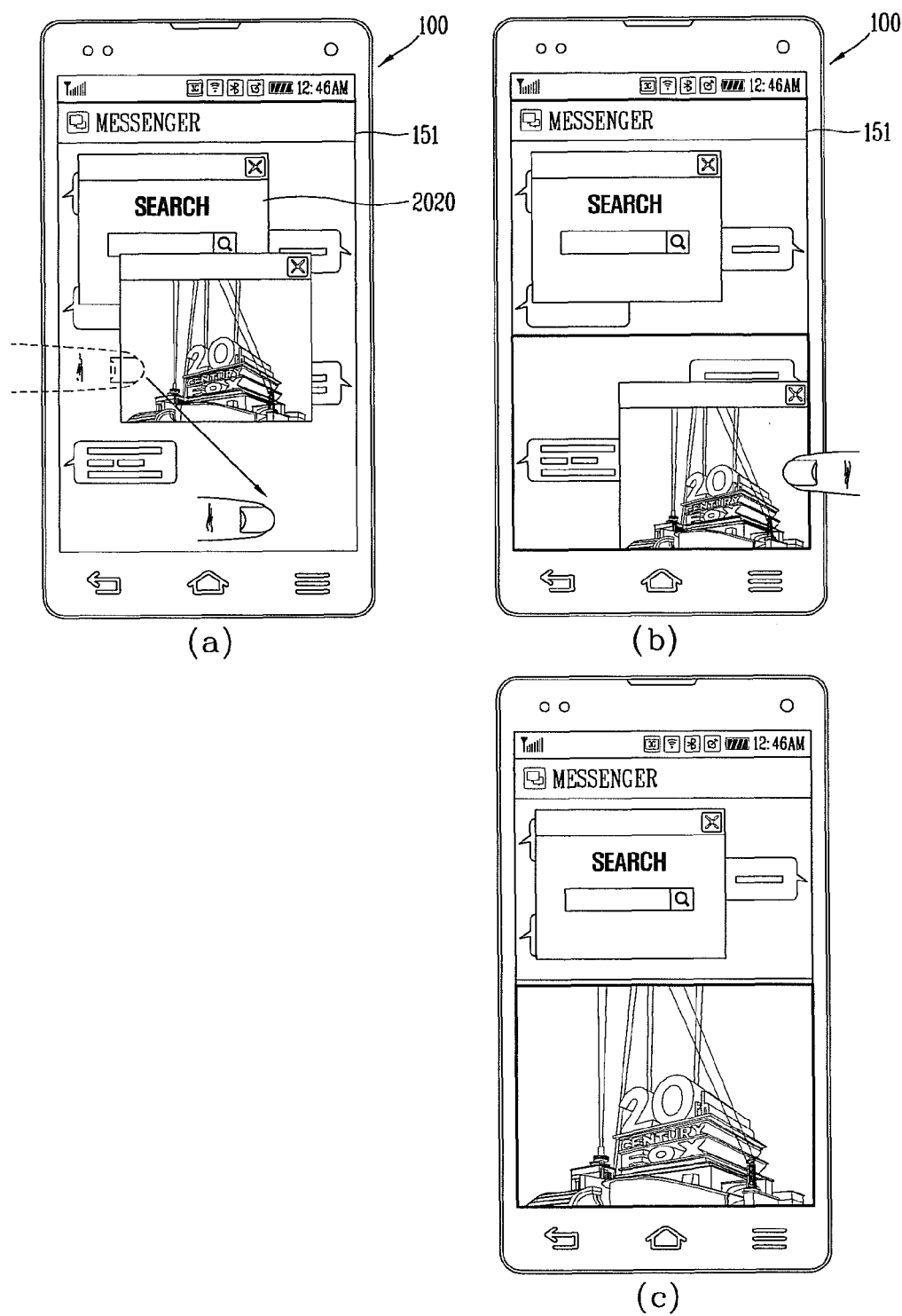

FIGS. 20B(a) to 20B(c) are diagrams illustrating a case in which the drag input for entering the division mode, described above, is applied in a state where the two floating screens are output.

At this point, a floating screen 2020 to which the drag input is not applied maintains a floating state as is, and the screen division is made in the same manner as illustrated in FIGS. 20A(a) to 20A(c).

On the other hand, if the floating screen is output in a state where the division mode is not supported, the drag input for entering the division mode, described above, is applied. As a result, the list region is generated, and the application being executed on the floating screen is executed on the divisional screen region where the dragging is ended. Embodiments are described in detail below.

Figure 20C:
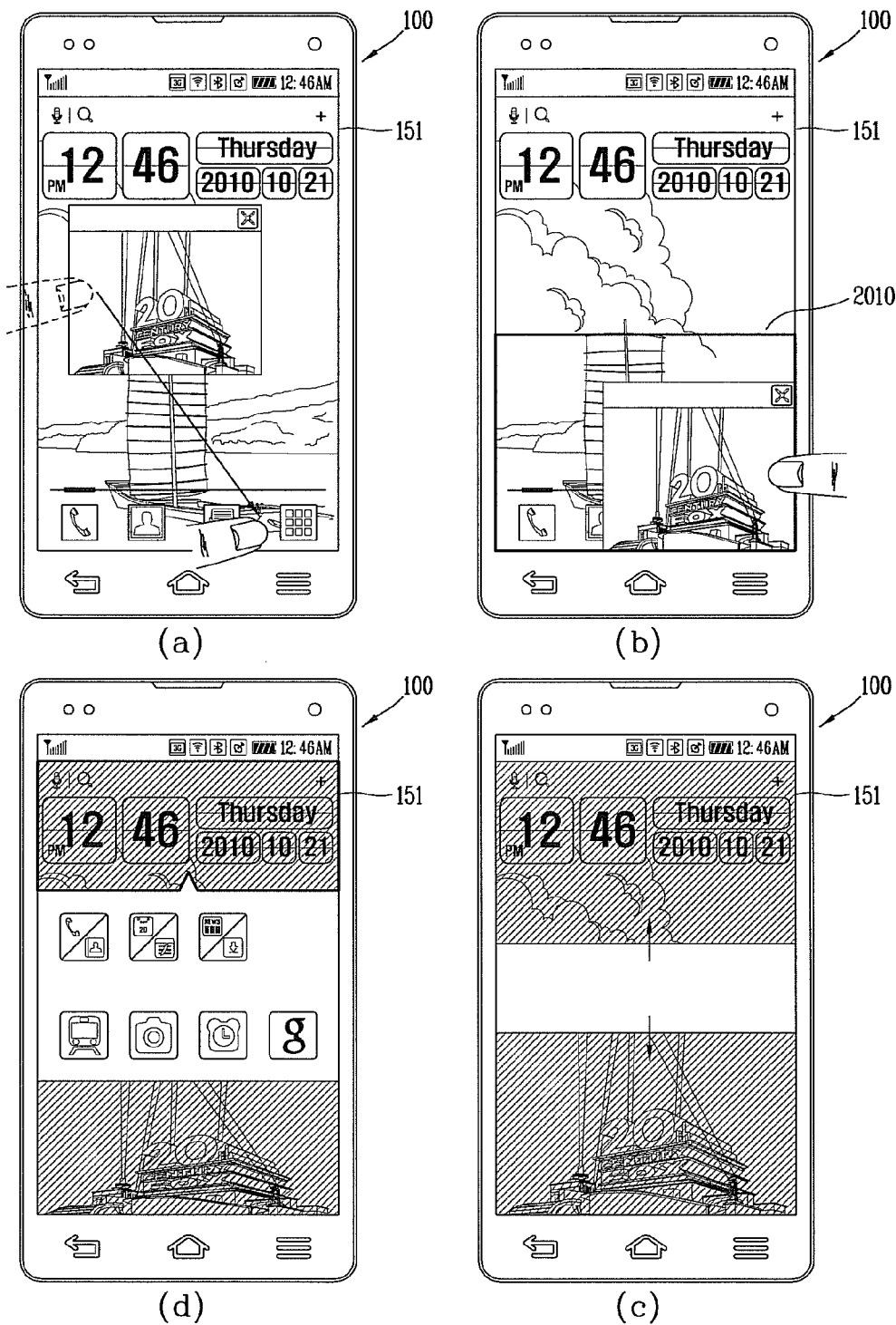

Referring to FIG. 20C(a), the entire screen 151 is in a state of the home screen, and the moving image is executed on the floating screen. At this point, the user can drag the floating screen up to the lower end portion of the entire screen 151.

Referring to FIG. 20C(b), when the floating screen is dragged, the guide region 2010 is output that preliminarily displays the screen region to which to output the floating screen at the time of the screen division.

Referring to FIGS. 20C(c) and 20C(d), the list region is generated, and the screen 151 is divided. In addition, the moving image being executed on the floating screen is output to the divisional screen region that corresponds to the guide region 2010. Then, the divisional region that is opposite to the guide region 2010 is selected as the focus region.

On the other hand, in a state where the floating screen is output, the control command for entering the division mode is input (for example, the user's applying the long push to the BACKSPACE key). Embodiments are described in detail below.

Figure 20D:
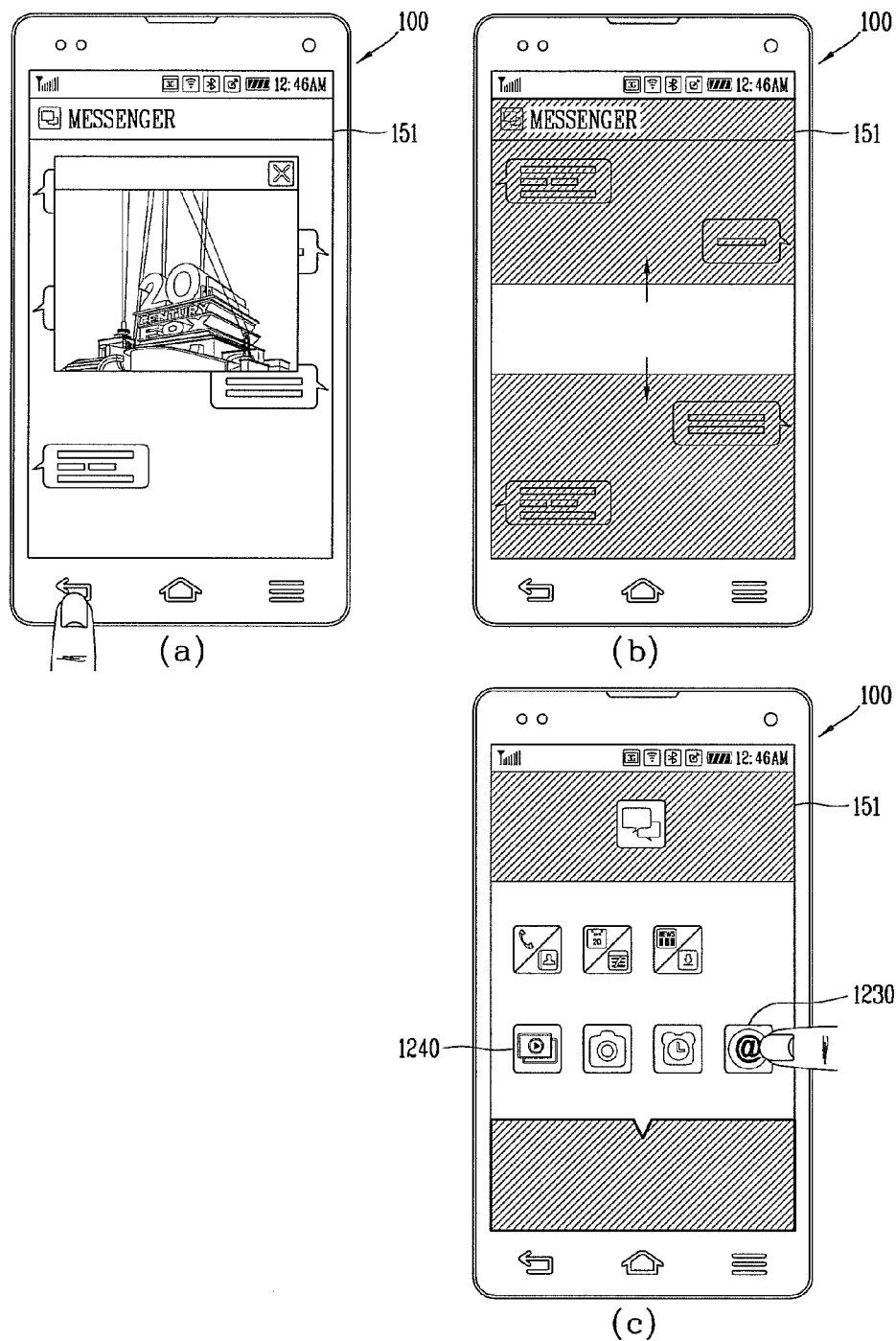

Referring to FIG. 20D(a), the messenger application is executed on the entire screen 151, and the moving image is executed on the floating screen. At this point, the user can enter the division mode by pushing on the long push to the BACKSPACE key.

Referring to FIG. 20D(b), the generation of the list region leads to the division of the screen. At this point, the floating screen is not output in a hidden state, and the messenger application being executed on the entire screen 151 is output along the effect of dimming an image.

Referring to FIG. 20D(c), when the user touches on an icon 1230 corresponding to an Internet application included in the list region to select the Internet application, the Internet application is executed on a second screen region 1260.

Figure 20E:
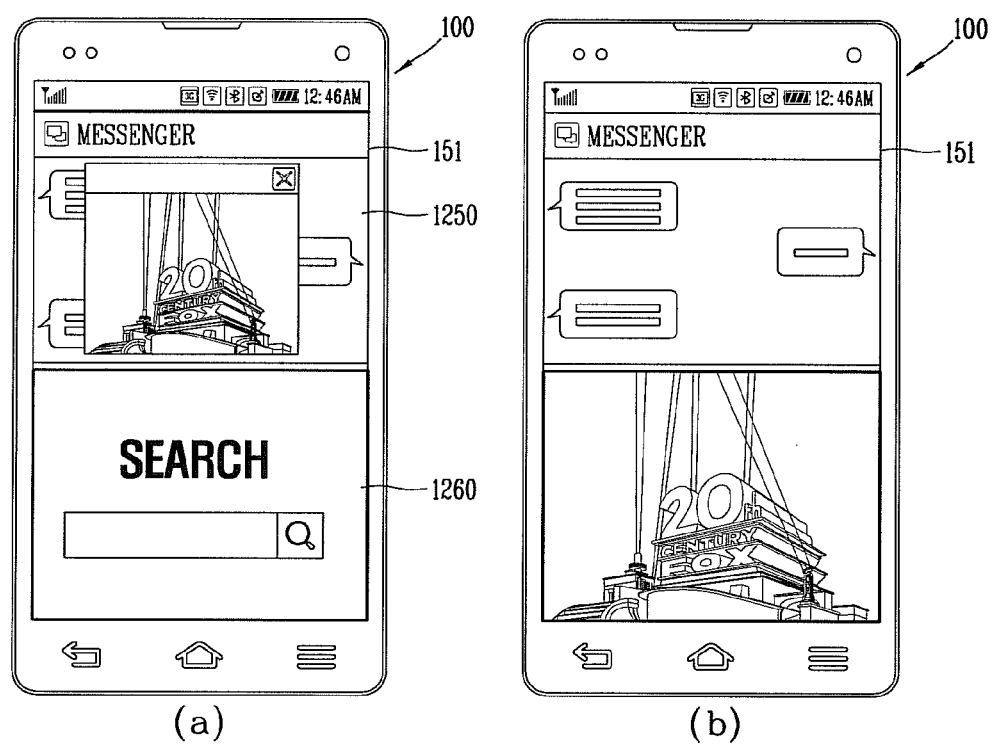

Referring to FIG. 20E(a), the messenger application being executed on the entire screen 151 is executed a first screen region 1250, and the floating screen that is hidden is output to the messenger application.

Referring to FIG. 20D(c), the user touches on an icon 1240 corresponding to the moving image application being executed on the floating screen to select the moving image application, the moving image is executed on a second screen region 1260. Then, the messenger application being executed on the entire screen 151 is executed on the first screen region 1250.

That is, when the icon corresponding to the application being executed on the floating screen is touched on the list region, the floating screen disappears, and the application being executed on the floating screen is output to the divisional screen region.

On the other hand, when a switching-to-floating-screen icon that is output to the second screen region is touched on, the first application is executed on the entire screen of the display unit 151, and the second application is executed to the floating screen that is output in such a manner as to overlap the entire screen on which the floating screen is executed. Embodiments are described in detail below.

Figure 21:
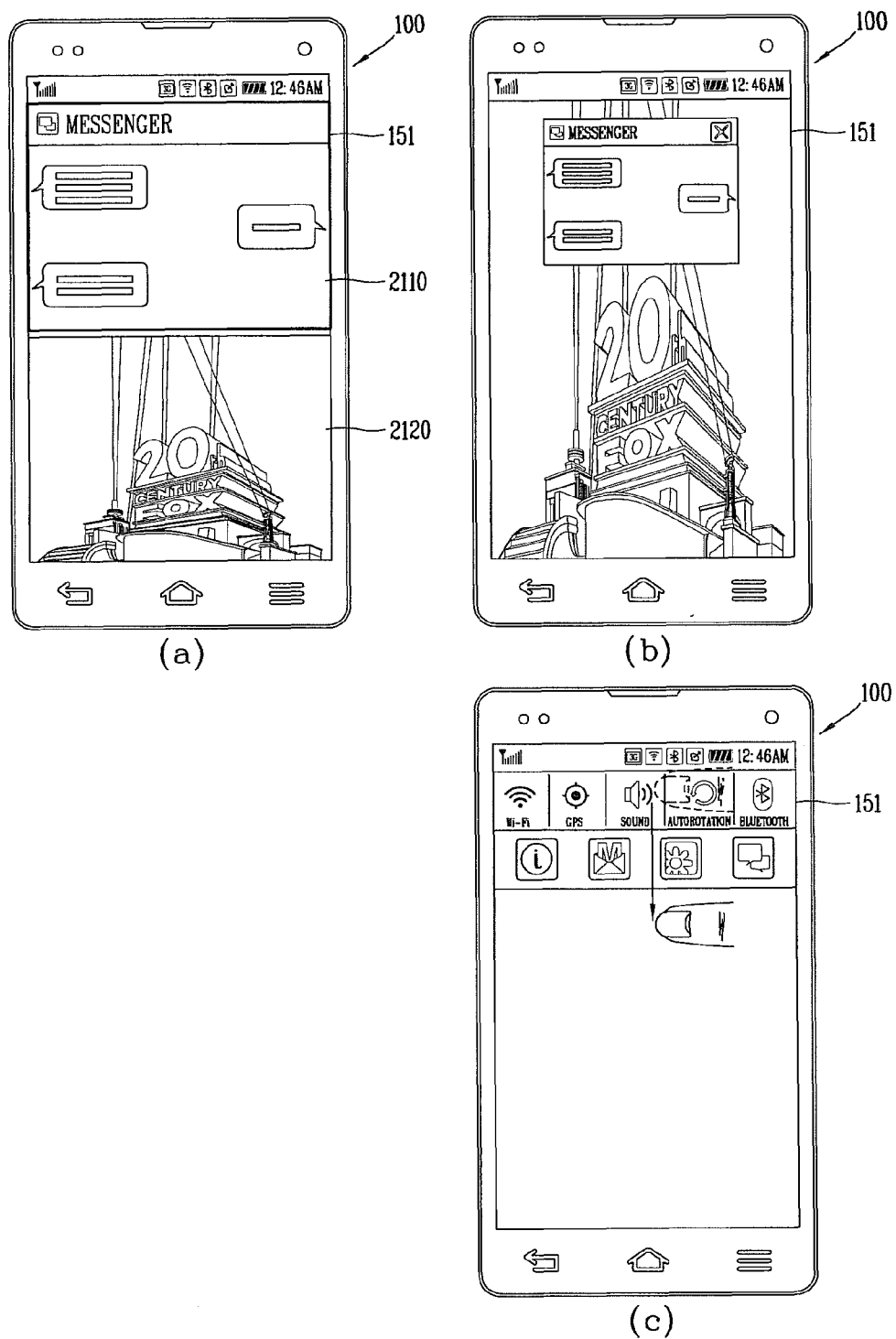
FIGS. 21A to 21C are diagrams illustrating an embodiment of the user interface that relates to switching to the floating screen.

FIGS. 21A to 21C are diagrams illustrating an embodiment of the user interface that relates to the switching to the floating screen.

Referring to FIGS. 21A and 21B, the switching-to-floating-screen icon that is output to a first screen region 2110 is touched on, the division mode is canceled, and the floating screen is output.

Specifically, the first application being executed on the first screen region 2110 is output to the floating screen, and the second application being executed on a second screen region 2120 is output to the entire screen 151.

Referring to FIG. 21C, when the user drags a status bar, a screen showing a status of the mobile terminal 100 is output such as a Wi-Fi connection state or a GPS signal-receiving state. At this point, when the icon corresponding to the first application is touched on to select the first application, the selected first application is executed on the floating screen. That is, the screen 151 is switched to a state as illustrated in FIG. 21B.

As another embodiment relating to this, when the status bar is dragged in a state where the list region is output, the list region disappears.

On the other hand, when the first and second applications are executed on the first and second screen regions, respectively, a captured image obtained by capturing an image of the first screen region wholly or partly is transmitted to the second screen region.

Figure 22A:
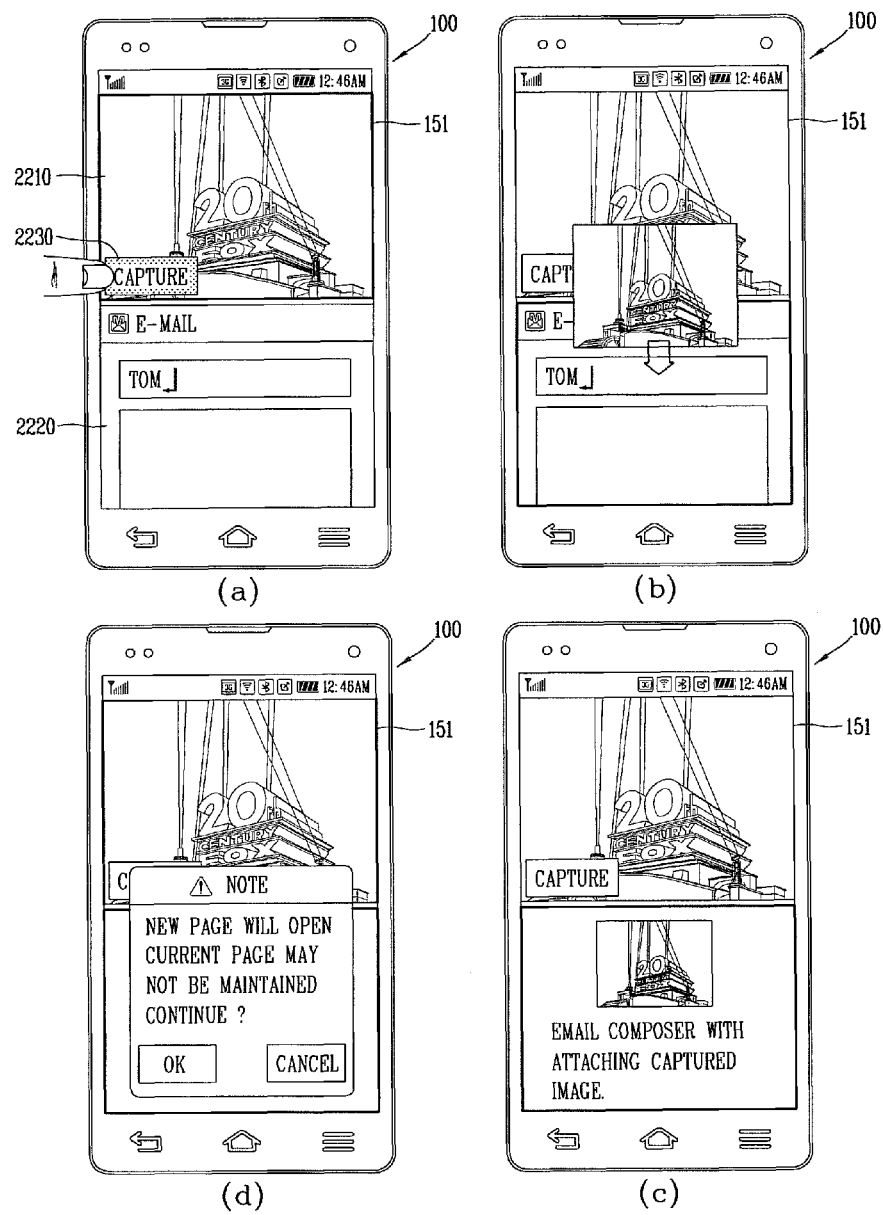
FIGS. 22A(a) to 22C(d) are diagrams illustrating embodiments of the user interface by which a captured image obtained by capturing an image of the divisional screen region is transmitted.

FIGS. 22A(a) to 22C(d) are diagrams illustrating embodiments of the user interface by which the captured image obtained by capturing the image of the divisional screen region is transmitted.

Referring to FIG. 22A(a), a capture icon 2230 is output to a first screen region 2210, the focus region.

As an embodiment, regardless of a type of the first application that is being executed on the first screen region 2210, the focus region, the capture icon 2230 is output when the second application being executed on a second screen region 2220 is an application that can use the captured image.

For example, because if the second application is the email application, the captured image is attached to an email, the capture icon 2230 is output to the first screen region 2210.

Referring to FIG. 22A(b), when the user touches on the capture icon 2230 that is output to the first screen region 2210, a captured image obtained by capturing an image of the screen that is output is generated on the first screen region 2210.

Subsequently, the captured image is transferred to the second screen region 2220 with the natural animation effect occurring. Alternatively, the user can directly transfer the captured image to the second screen region 2220 by dragging the captured image.

At this point, additional information can be transferred along the captured image, and the second screen region 2220 can be changed to the focus region.

Referring to FIGS. 22A(c) and 22A(d), when the second application is the email application, a message window is output that indicates that the captured image is attached to the email.

Figure 22B:
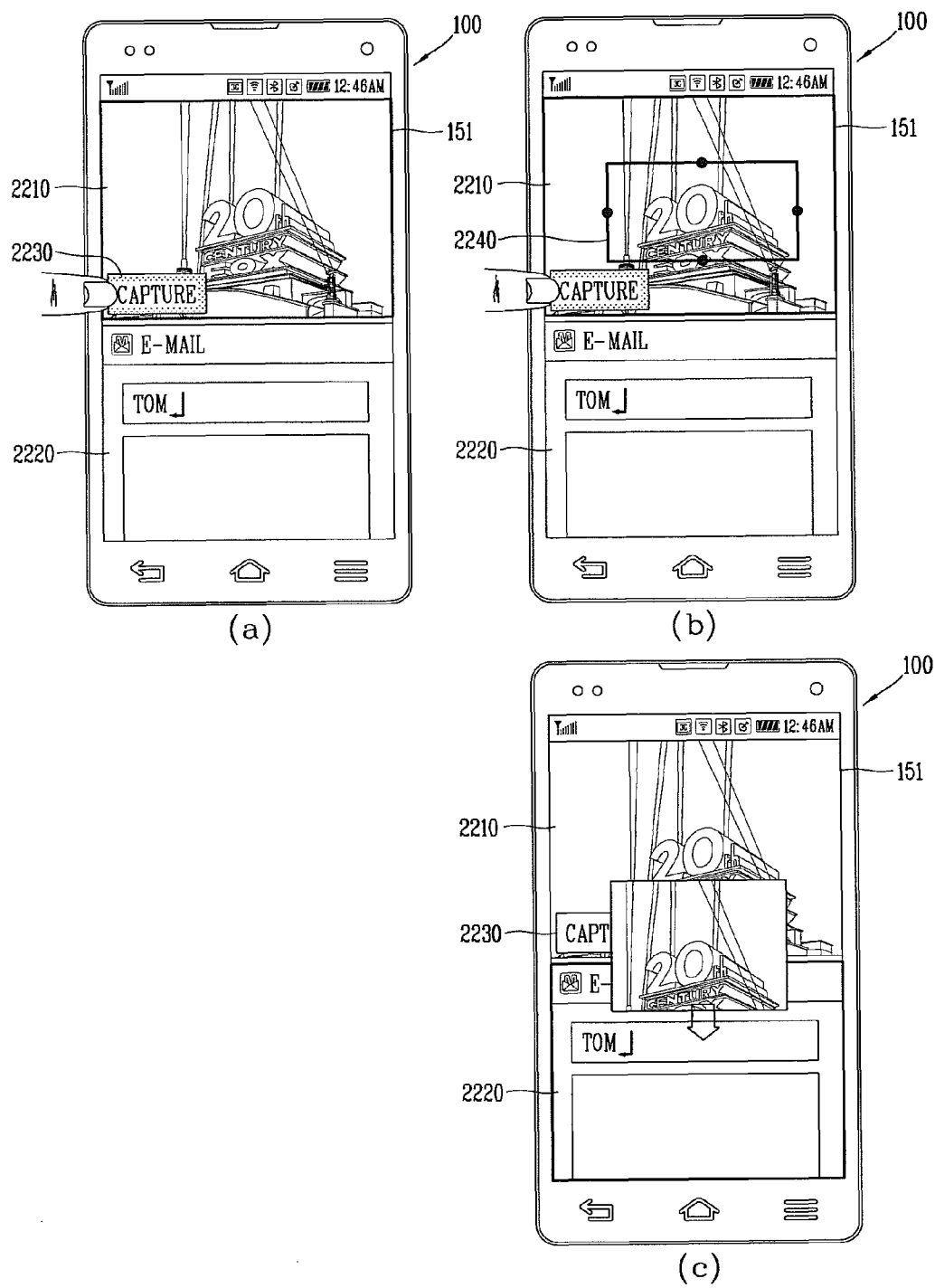

FIGS. 22B(a) to 22B(c) are diagrams illustrating an embodiment of the user interface by which the captured image obtained by wholly or partly capturing the image that is output to the first screen region is transferred.

Referring to FIGS. 22B(a) and 22B(b), the capture icon 2230 is output to the first screen region 2210, the focus region. When the user applies the long touch to the captured icon 2230, a crop tool 2240 for editing an image is output.

Specifically, a desired region of the captured image is set by adjusting a frame of the crop tool 2240 that is output. If the BACKSPACE key is pushed on in a state where the crop tool 2240 is output, the screen returns back to a state as illustrated in FIG. 22B(a).

Referring to FIG. 22B(c), when the user again touches on the capture icon 2230 after setting the region of an image to be captured with the crop tool 2240, the edited captured image is transferred to the second screen region 2220. Subsequently, the steps as illustrated in FIGS. 22A(c) and 22A(d) follow.

Figure 22C:
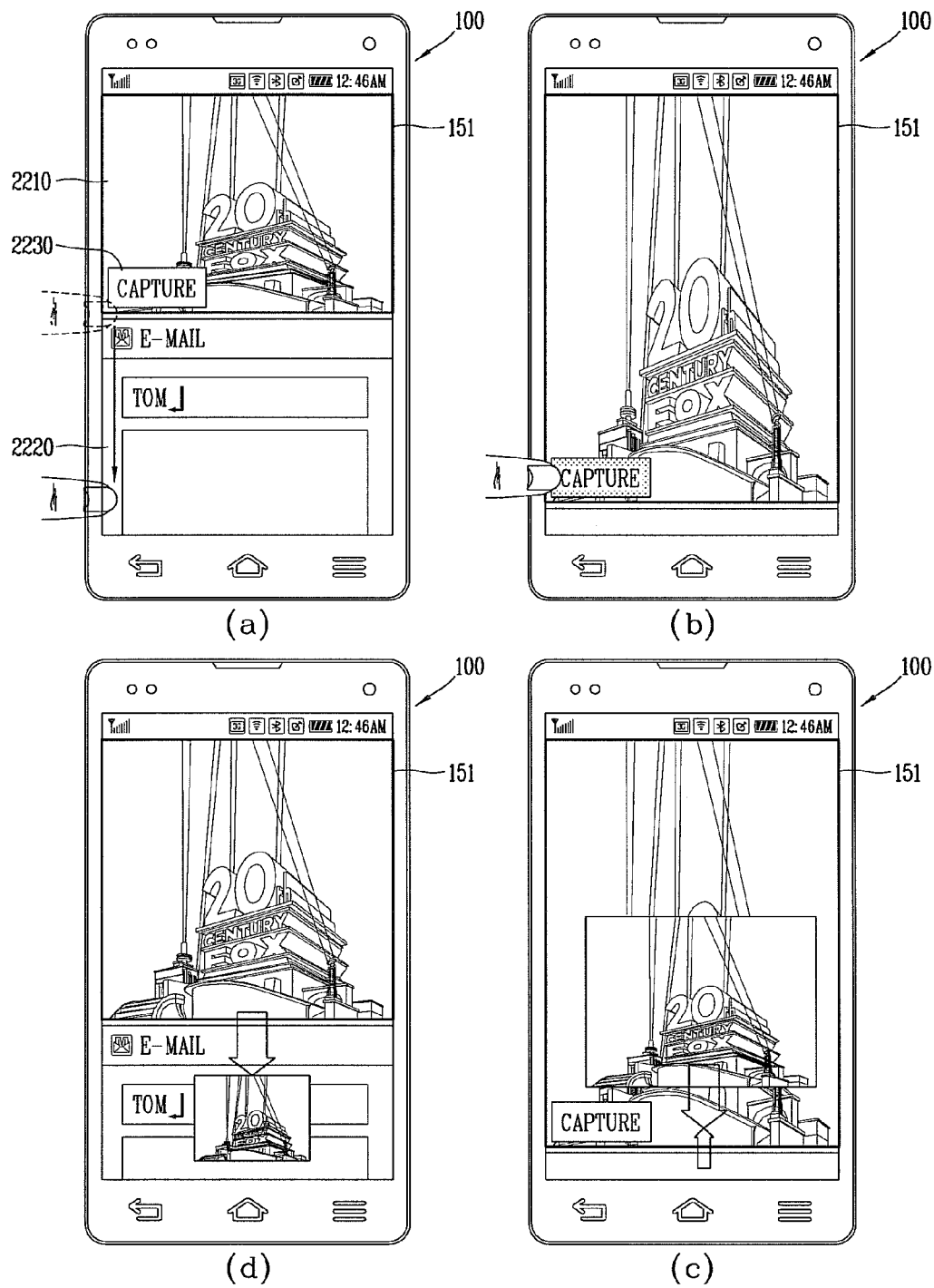

FIGS. 22C(a) to 22C(d) are diagrams illustrating an embodiment of the user interface that relates to transfer of the captured image and a change in size of the screen region.

Referring to FIGS. 22C(a) and 22C(b), the capture icon 2230 is touched on after increasing the size of the first screen region 2210 by dragging the split bar downward.

Referring to FIGS. 22C(c) and 22C(d), the captured image is transferred to the second screen region 2220. At this point, the narrow second screen region 2220 increases in size according to the transfer of the captured image.

After transferring the captured image, the sizes of the first and second screen regions 2210 and 2220 are returned back to the state as illustrated in FIG. 22C(b).

That is, the narrow screen region is temporarily broadened to receive the captured image and after transferring the captured image, is returned back to its original state.

On the other hand, when the first and second applications are executed on the first and second screen regions, respectively, the object that is output to the first screen region can be transferred to the second screen region. As an embodiment, a text object or a file that is output to the first screen region is transferred to the second screen region by touching on or applying to the text object or the file.

Figure 23A:
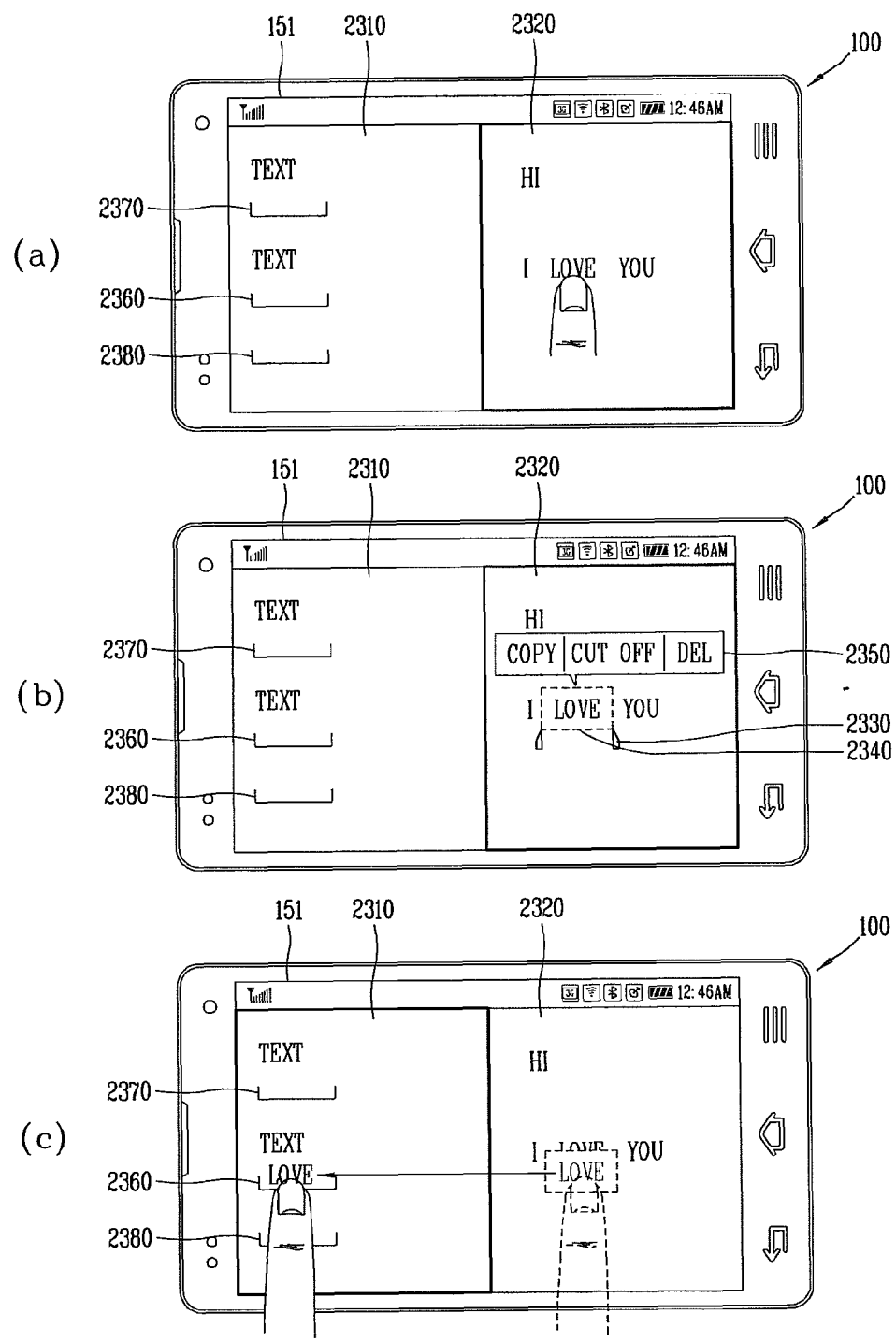
FIGS. 23A(a) to 23C(d) are diagrams illustrating embodiments of the user interface by which the object that is output to a second screen region is transferred to a first screen region.

FIGS. 23A(a) to 23C(d) are diagrams illustrating embodiments of the user interface by which the object that is output to the second screen region is transferred to the first screen region.

Referring to FIG. 23A(a), a text field for inputting text-based data is output to a first screen region 2310, and an application including the text-based data is executed on a second screen region 2320. At this point, the user can apply the long touch to a text object that is output to the second screen region 2320.

Referring to FIG. 23A(b), an icon 2330 that is set by dragging a scope of the text object and icons for editing text objects 2340 that are selected are output a bubble pop-up window 2350.

For example, the icons indicating COPYING, CUTTING, ERASING and others are output. Subsequently, the user can copy the text object 2340 by touching on the icon "COPYING."

Referring to FIG. 23A(c), the user can drag the copied text object 2340 to a text field 2360 that is output to the first screen region 2310.

Figure 23B:
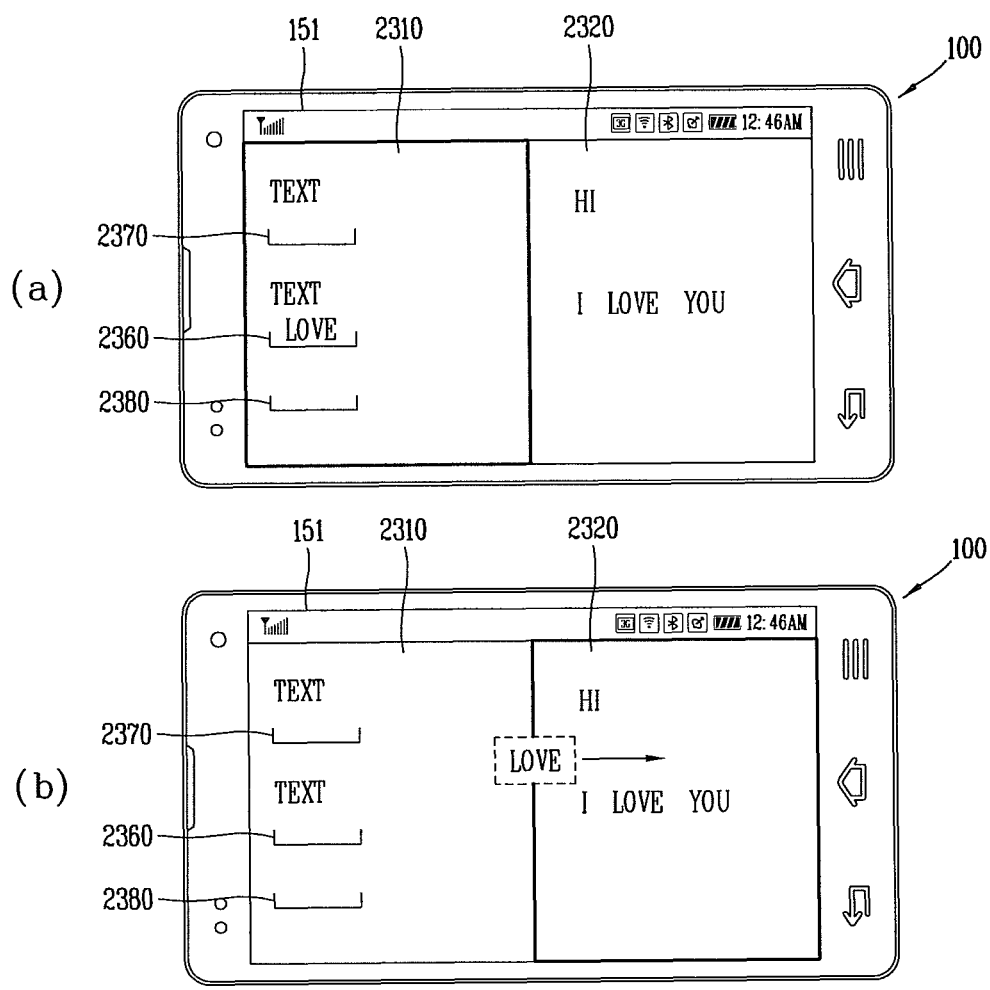

Referring to FIG. 23B(a), the dragged text object 2340 is output to the text field 2360. In addition, the focus region is changed to the first screen region 2310 to which the text object 2340 is transferred.

Referring to FIG. 23B(b), when the user drags the text object 2340 to other than the text field 2360 and text fields 2370 and 2380, the text object 2340 is not transferred to the first screen region 2310. At this point, the text object 2340 is returned back to the second screen region 2320 with the animation effect occurring, and the second screen region 2320 is maintained as the focus region.

Likewise, if the application that does not include the text field is executed on the first screen region 2310, the text object 2340 is returned to the second screen region 2320 with the animation effect occurring, and the second screen region 2320 is maintained as the focus region.

Figure 23C:
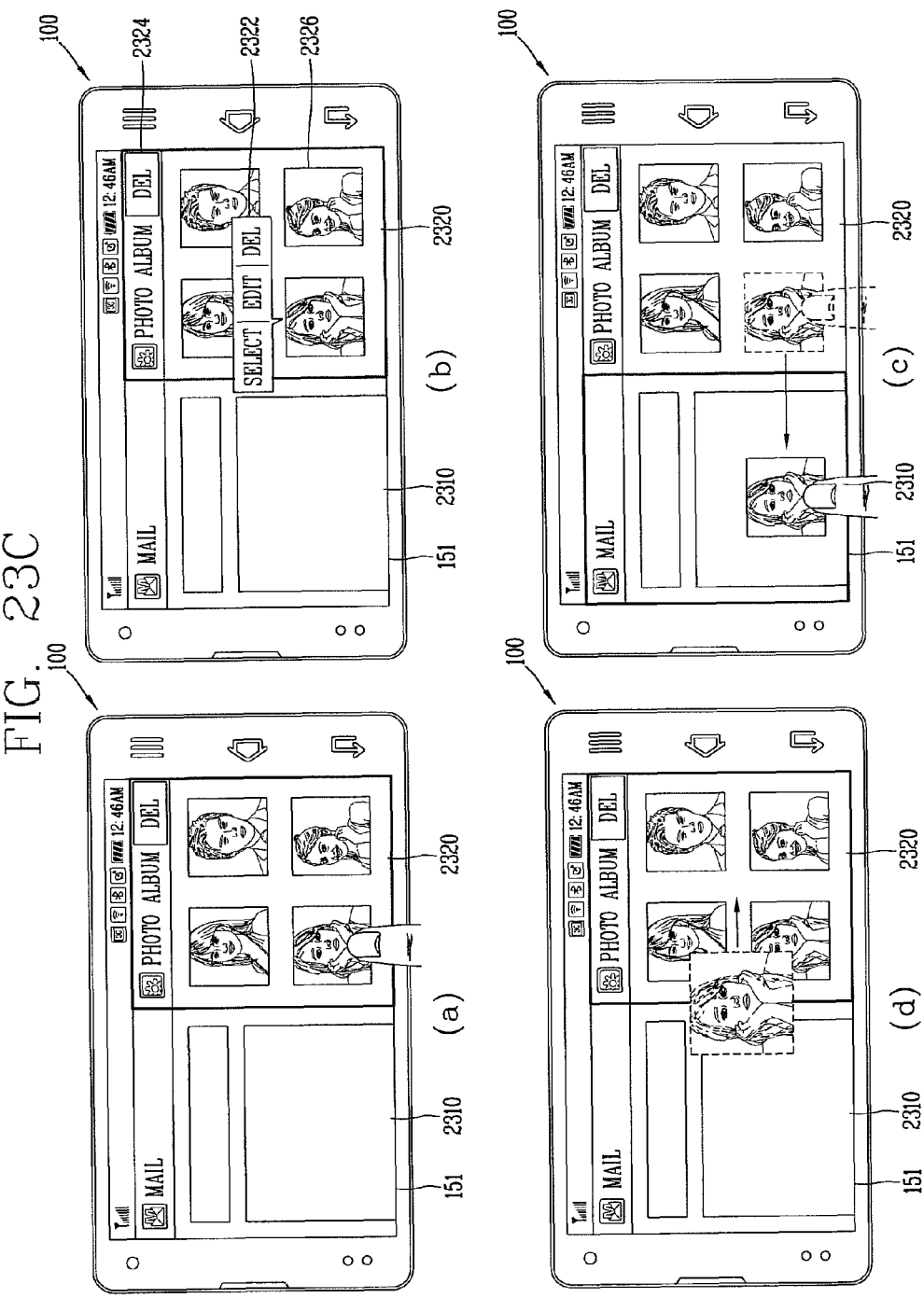

As another embodiment, referring to FIG. 23C(a), the email application in which an image file can be attached to the email is being executed on the first screen region 2310, and the photo album application that includes the image file, output as the thumbnail, is executed on the second screen region 2320. At this point, the user can apply the long touch to a thumbnail of the image file that is output to the second screen region 2320 in order to select the image file that he/she wants to transfer.

Referring to FIG. 23C(b), icons relating to the selected image file are output to a bubble pop-up window 2322.

For example, the icons indicating SELECT, EDIT, DELETE and others are output. Subsequently, the user can touch on the icon "SELECT" to select the image file.

At this point, the bubble pop-up window 2322 is output to below the selected thumbnail. That is, the bubble pop-up window 2322 is output to above or below the thumbnail, considering an area of the region that is to be output according to a position of the thumbnail.

In addition, the bubble pop-up window 2322 disappears by the user's control command. For example, when a second thumbnail 2326 different from the first thumbnail that is output to the bubble pop-up window 2322 is touched on, the bubble pop-up window 2322 disappears with respect to the first thumbnail.

As another embodiment, when an icon 2324 with respect to the photo album application being executed on the second screen region 2320 is touched on or the BACKSPACE key is pushed on, the bubble pop-up window 2322 disappears.

As another embodiment, if the flicking input is performed on the second screen region 2320, the bubble pop-up window 2322 disappears, and the flicking input is applied on the second screen region 2320.

Referring to FIG. 23C(c), the user can drag the thumbnail of the selected image file to the first screen region 2310. As a result, the image file of which the thumbnail is dragged to the email is attached. In addition, the focus region is changed to the first screen region 2310 to which the image file is transferred.

At this point, a process of attaching the transferred image file proceeds according to the application being executed on the first screen region 2310. For example, the process of attaching the transferred image file proceeds with the screen of the application being maintained, or proceeds on a window that is newly output.

Referring to FIG. 23C(d), unless the user drags the thumbnail of the image to within the first screen region 2310, the image file is not transferred to the first screen region 2310. At this point, the thumbnail of the image file is returned back to the second screen region 2320 with the animation effect occurring, and the second screen region 2320 is maintained as the focus region.

Likewise, if the application in which the image file cannot be attached is executed on the first screen region 2310, the thumbnail of the image file is returned to the second screen region 2320 with the animation effect occurring, and the second screen region 2320 is maintained as the focus region.

Then, the text object and an image file object that are selected as illustrated in FIGS. 23A(a) to 23A(c) and FIGS. 23B(a) and 23B(b) are transferred while temporarily increasing a size of the divisional screen region as illustrated in FIGS. 22C(a) to 22C(d).

On the other hand, if the first and second applications are executed on the first and second screen regions, respectively, when the first application calls the third application, the third application is output to the first screen region. Subsequently, when the execution of the third application is finished, the first application is output back to the first screen region.

As another embodiment, all the pop-up windows are output to an uppermost layer of the called screen region.

That is, basically, the first and second applications are independently executed on the screen regions to which they are output, respectively, but a specific operation that is set in advance is performed on the opposite screen region. For example, the operation, such as linking, or pasting, is performed on the opposite screen region.

Figure 24:
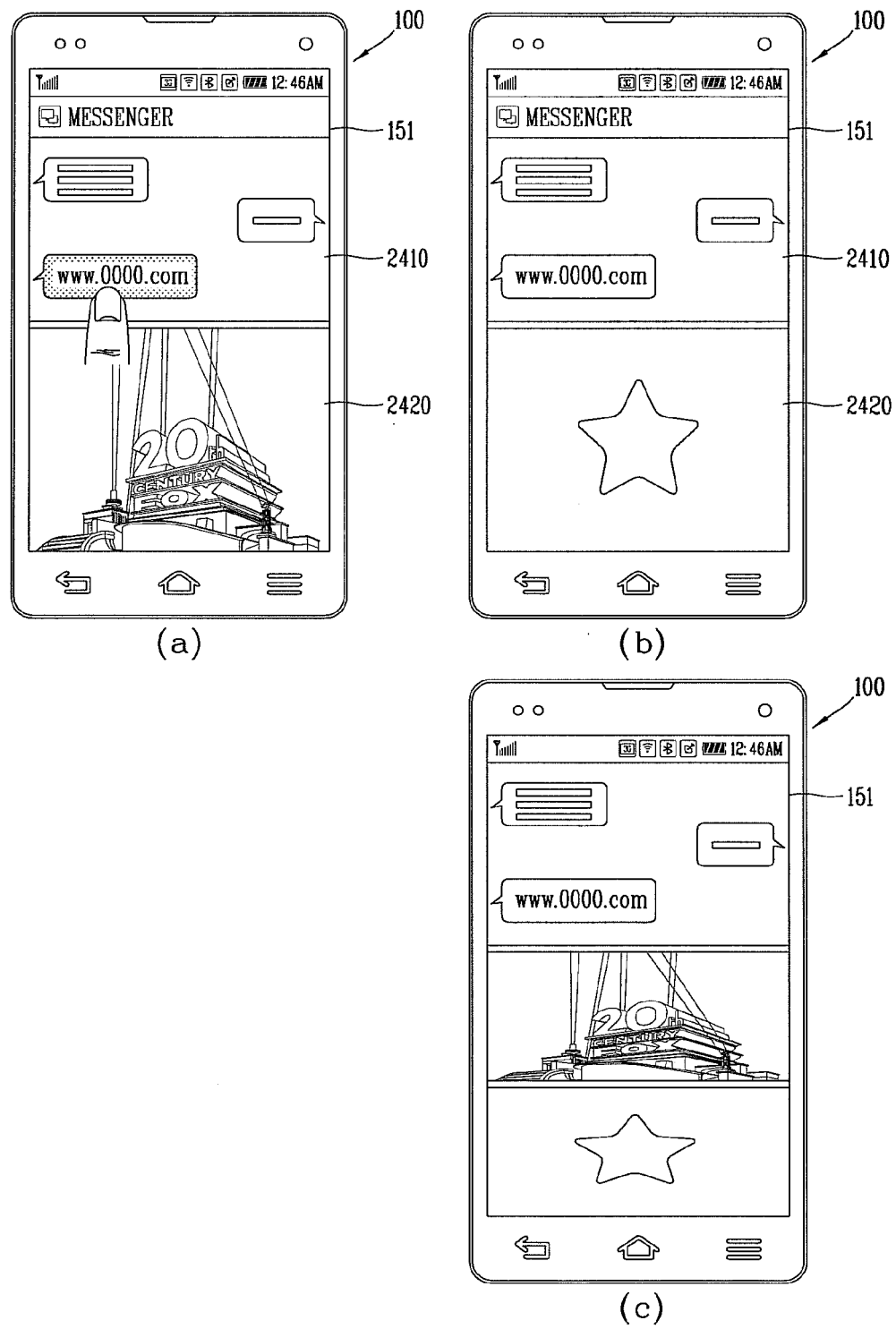
FIGS. 24A to 24C are diagrams illustrating an embodiment of the user interface that is provided when a linked object is selected in the division mode.

FIGS. 24A to 24C are diagrams illustrating an embodiment of the user interface that is provided when the linked object is selected in the division mode.

Referring to FIG. 24A, the first application, the messenger application is executed on a first screen region 2410, and the second application is executed on a second screen region 2420. At this point, the user can click on a link address that is output to the second screen region 2410.

Referring to FIG. 24B, the third application the corresponds to the clicked-on address is output to the second screen region 2420.

As another embodiment, referring to FIG. 24C, the second screen region 2420 is divided, and the second and third applications are output together. As a result, the entire screen 151 is divided into the three screen regions.

In this manner, when the user successively clicks on the link address that is output to the first screen region 2410, an application corresponding to the link address is output to a screen region other than the first screen region 2410, or to a screen region that results from dividing the screen region other than the first screen region 2410.

This is because the user convenience can be improved if at the time of the execution of the application such as the messenger application, the linked or pasted information is identified while at the same time executing the messenger application.

For this purpose, if a specific application that is set in advance is executed such as the messenger application, the division mode is automatically entered according to an input of a specific control command.

As an embodiment, when the linked address is clicked on while executing the messenger application on the entire screen 151, the screen is automatically divided, and the messenger application being executed and the application corresponding to the linked address are output to the divisional screen regions, respectively.

According to the present invention, the multiple applications are concurrently executed on the divisional screen regions, respectively, and the text-based data and the file are exchanged between the multiple applications.

In addition, the list region including the list of the multiple applications that can be executed on the divisional screen regions is output, and the application being executed on each of the divisional screen regions uses the object included in the application on the list region is used.

Then, when executing a specific application that is set in advance, the division mode, the input of a specific control makes possible an automatic switch to the screen division mode.

As a result, the user convenience is improved.

In addition, according to an embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a display device to display a screen to execute an application; and
a controller that, in response to an input to enter a division mode, to generate a list region in such a manner as to spread out upward and downward from a predetermined position of the screen, to divide the screen into a first screen region and a second screen region by the list region, and to execute first and second applications selected from the list region on at least one of the first and second screen regions, respectively,
wherein the list region includes a list of a plurality of applications,
wherein the controller to execute an application selected from among the plurality of applications included in the list displayed on the list region,
wherein in response to selection of an object from the application being executed, at least one of the first and second applications to use the selected object, and
wherein the screen is dimly displayed while the list region is generated and displayed.

2. The mobile terminal of claim 1, wherein the controller to select the plurality of applications included in the list differently depending on the first and second applications.

3. The mobile terminal of claim 1, wherein the list region of the display includes an indicator to indicate one of the first screen region and the second screen region, in which to execute the application included in the list.

4. The mobile terminal of claim 3, wherein the controller to enable the application being executed on the indicated screen region to use the selected object.

5. The mobile terminal of claim 1, wherein when a first application and a second application are concurrently selected, the controller to concurrently execute the first application and the second application on the first screen region and the second screen region, respectively.

6. The mobile terminal of claim 1, wherein when the list region of the display decreases in size and is converted into a bar shape, the controller to set sizes of the first and second screen regions based on an input for adjusting a position of the bar shape.

7. The mobile terminal of claim 1, wherein when a first application is executed on substantially an entire screen of the display, and a second application is executed on a floating screen that is displayed such that the floating screen to overlap the entire screen on which the first application is executed, and the floating screen is dragged to one region of the entire screen, which is set in advance, the controller to divide the entire screen into the first and second screen regions and to execute the first and second applications on the first and second screen regions, respectively.

8. The mobile terminal of claim 7, wherein in response to selection of a switching-to-floating-screen icon displayed on the second screen region, the controller to enable the first application to be executed on the substantially entire screen of the display and to enable the second application to be executed on the floating screen that overlaps the entire screen on which the first application is executed.

9. The mobile terminal of claim 1, wherein the controller to transfer a captured image of the first screen region to the second screen region.

10. The mobile terminal of claim 1, wherein the controller to transfer an object displayed on the first screen region to the second screen region.

11. A method of controlling a mobile terminal, comprising:
receiving an input to enter a division mode that divides a screen of a display device into a plurality of screen regions;
generating a list region in such a manner as to spread out upward and downward from a predetermined position of the screen and dividing the screen into a first screen region and a second screen region by the list region, the list region including a list of a plurality of applications;
executing first and second applications selected from among the plurality of applications included in the list displayed in the list region on at least one of the first and second screen regions; and
executing an application selected from among the plurality of applications included in the list displayed in the list region,
in response to selection of an object from the application being executed, at least one of the first and second applications to use the selected object, and
wherein the screen is dimly displayed while the list region is generated and displayed.

12. The method of claim 11, wherein executing the application selected from among the plurality of applications includes selecting the plurality of applications included in the list differently depending on the first and second applications.

13. The method of claim 11, wherein the list region includes an indicator to indicate one of the first screen region and the second screen region, in which to execute the application included in the list.

14. The method of claim 13, comprising enabling at least one of a first application and a second application by enabling the application being executed on the indicated screen region to use a selected object.

15. The method of claim 11, wherein executing the application includes concurrently executing a first application and a second application on the first screen region and the second screen region, respectively, when the first application and the second application are concurrently selected.

16. The method of claim 11, further comprising:
setting sizes of the first screen region and the second screen region depending on an input to adjust a position of a bar when the list region decreases in size and the list region is provided in a shape of the bar.

17. The method of claim 11, comprising:
in response to selection of a switching-to-floating screen icon, enabling a first application to be executed on the entire screen of the display and enabling a second application to be executed on a floating screen such that the floating screen overlaps the entire screen on which the first application is executed.

18. The method of claim 11, further comprising:
transferring a captured image obtained by capturing at least part of an image of the first screen region to the second screen region.

19. The method of claim 11, further comprising:
transferring an object displayed on the first screen region to the second screen region.

20. A mobile terminal comprising:
a display device to display screen regions on a screen; and
a controller to control the display device to display a first screen region, a second screen region and a list region between the first screen region and the second screen region, and the list region to display a plurality of applications, and the controller to execute a first application selected from among the plurality of applications at the first screen region, and to execute a second application selected from among the plurality of applications at the second screen region,
wherein the controller is configured to:
generate a list region in such a manner as to spread out upward and downward from a predetermined position of the screen,
divide the screen into a first screen region and a second screen region by the list region, and
executing an application selected from among the plurality of applications included in the list displayed in the list region,
in response to selection of an object from the application being executed, at least one of the first and second applications to use the selected object, and
wherein the screen is dimly displayed while the list region is generated and displayed.

21. The mobile terminal of claim 20, wherein the display displays an indicator to identify one of the first screen region and the second screen region, in which to execute the application.

22. The mobile terminal of claim 21, wherein the controller to enable the executed application on the identified screen region to use the selected object.

23. The mobile terminal of claim 20, wherein the controller to change sizes of the first and second screen regions based on an input to adjust the list region.

24. The mobile terminal of claim 20, wherein when the first application is executed on the entire screen of the display and the second application is executed on a floating screen that overlaps the entire screen on which the first application is executed, and the floating screen is dragged, the controller to divide the entire screen into the first and second screen regions and to execute the first and second applications at the first and second screen regions, respectively.

25. The mobile terminal of claim 24, wherein in response to selection of a switching-to-floating-screen icon displayed at the second screen region, the controller to enable the first application to be executed on the entire screen of the display and to enable the second application to be executed on the floating screen that overlaps the entire screen on which the first application is executed.

* * * * *